United States Patent [19]
Yoneda et al.

[11] Patent Number: 5,001,767
[45] Date of Patent: Mar. 19, 1991

[54] IMAGE PROCESSING DEVICE

[75] Inventors: Hitoshi Yoneda; Hironobu Machida, both of Kanagawa; Hiroki Kanno, Lamagawa; Koji Izawa, Kanagawa, all of Japan

[73] Assignee: Kabushiki Kaisha Toshiba, Kanagawa, Japan

[21] Appl. No.: 277,605

[22] Filed: Nov. 29, 1988

[30] Foreign Application Priority Data

| Nov. 30, 1987 | [JP] | Japan | 62-302019 |
| Dec. 24, 1987 | [JP] | Japan | 62-325194 |
| Dec. 24, 1987 | [JP] | Japan | 62-325195 |
| Dec. 25, 1987 | [JP] | Japan | 62-327482 |
| Dec. 28, 1987 | [JP] | Japan | 62-330181 |
| Dec. 29, 1987 | [JP] | Japan | 62-335033 |

[51] Int. Cl.$^5$ ............................................. G06K 9/38
[52] U.S. Cl. ........................... 382/50; 358/453; 358/462; 358/466; 382/53
[58] Field of Search ............... 382/22, 50, 53, 54; 358/450, 453, 462, 467, 455, 465, 466, 448, 443

[56] References Cited

U.S. PATENT DOCUMENTS

| 4,447,830 | 5/1984 | Stoffel | 358/462 |
| 4,547,811 | 10/1985 | Ochi et al. | 358/466 |
| 4,577,235 | 3/1986 | Kannapell et al. | 358/462 |
| 4,701,807 | 10/1987 | Ogino | 382/50 |
| 4,709,274 | 11/1987 | Tanioka | 382/50 |
| 4,740,843 | 4/1988 | De Vogel et al. | 358/456 |
| 4,786,976 | 1/1988 | Takao et al. | 382/53 |
| 4,797,945 | 1/1989 | Suzuki et al. | 358/467 |
| 4,856,076 | 8/1989 | Maeda | 382/53 |

FOREIGN PATENT DOCUMENTS 58-3374 10/1983 Japan .

OTHER PUBLICATIONS

English translation abstract of Japanese Patent Application 58-3374.

Primary Examiner—David K. Moore
Assistant Examiner—Joseph Mancuso
Attorney, Agent, or Firm—Finnegan, Henderson, Farabow, Garrett and Dunner

[57] ABSTRACT

An image processing device capable of processing images containing poorly contrasted letters and/or bold letters in addition to well contrasted letters and pictures such that both resolutions of letters and tones of pictures can be preserved. The device may includes a circuit to distinguish two level images from non two level images according to image concentration related quantity, and a circuit to distinguish picture images out of non two level images according to another image concentration related quantity. The device may include a circuit to distinguish letters from pictures according to the maximum and the minimum values of the image concentration related quantity. The device may includes a circuit to distinguish letters from pictures according to the maximum and the minimum values of changes in the image concentration related quantity. The device may include a circuit to distinguish letters from pictures according to the square sum average of differences in the image concentration related quantity between neighboring picture elements.

16 Claims, 41 Drawing Sheets

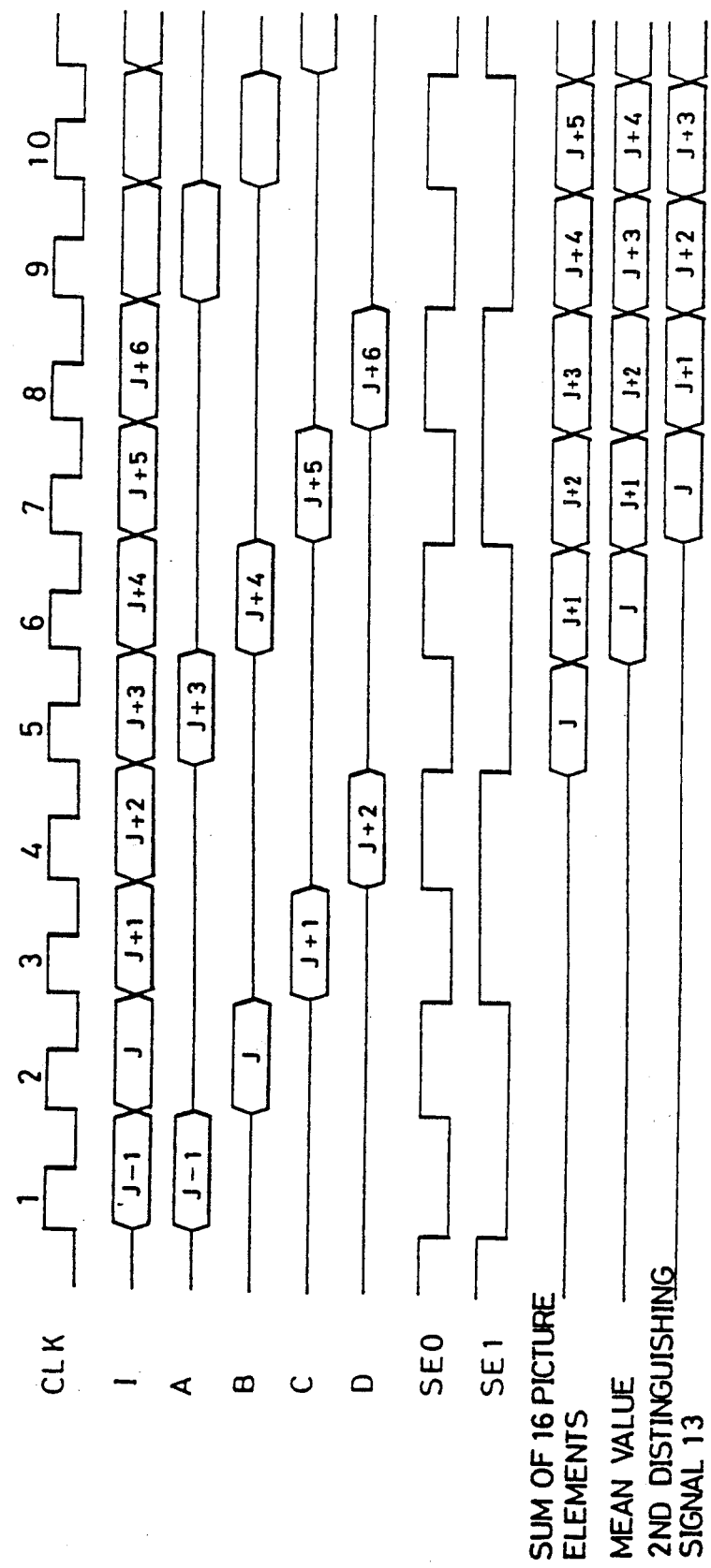

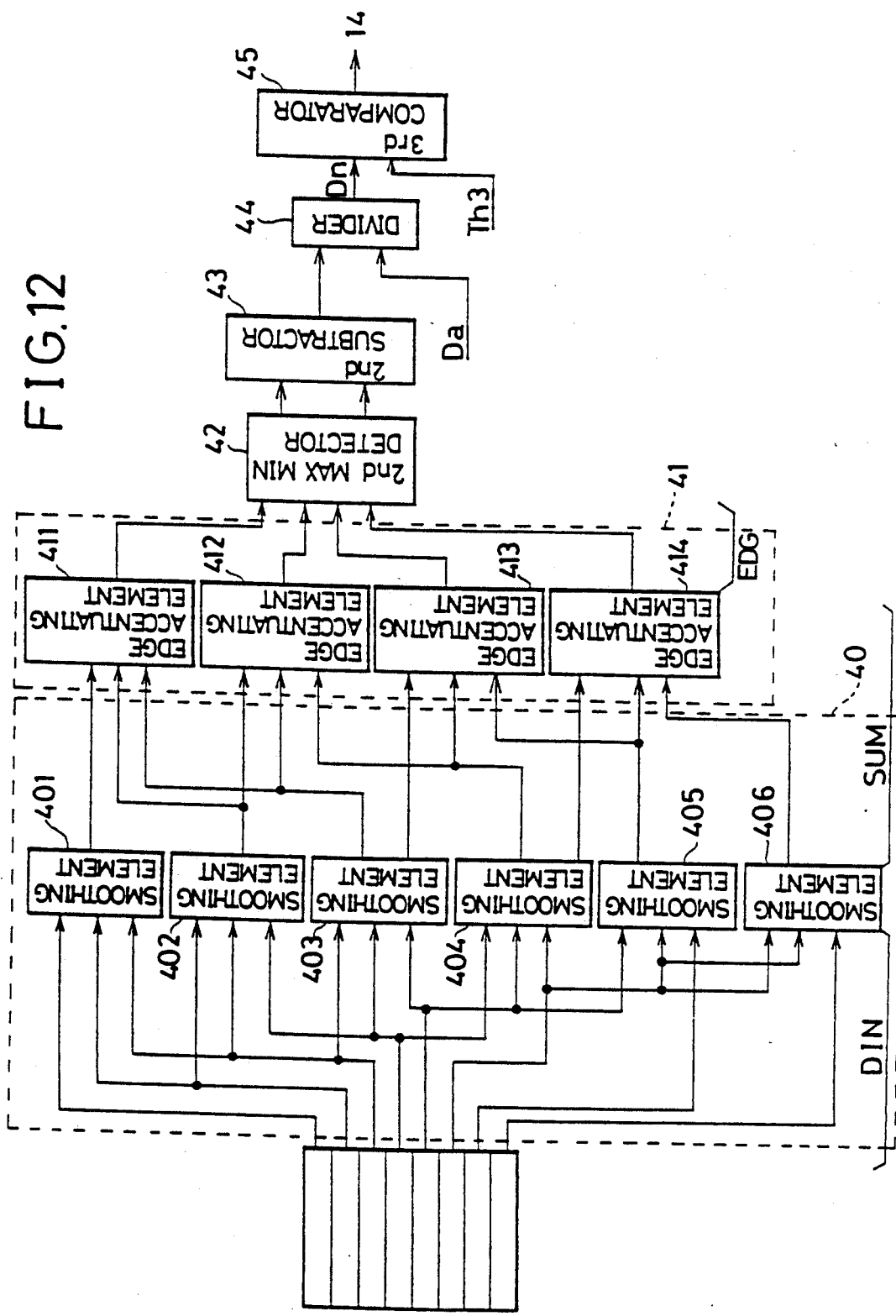

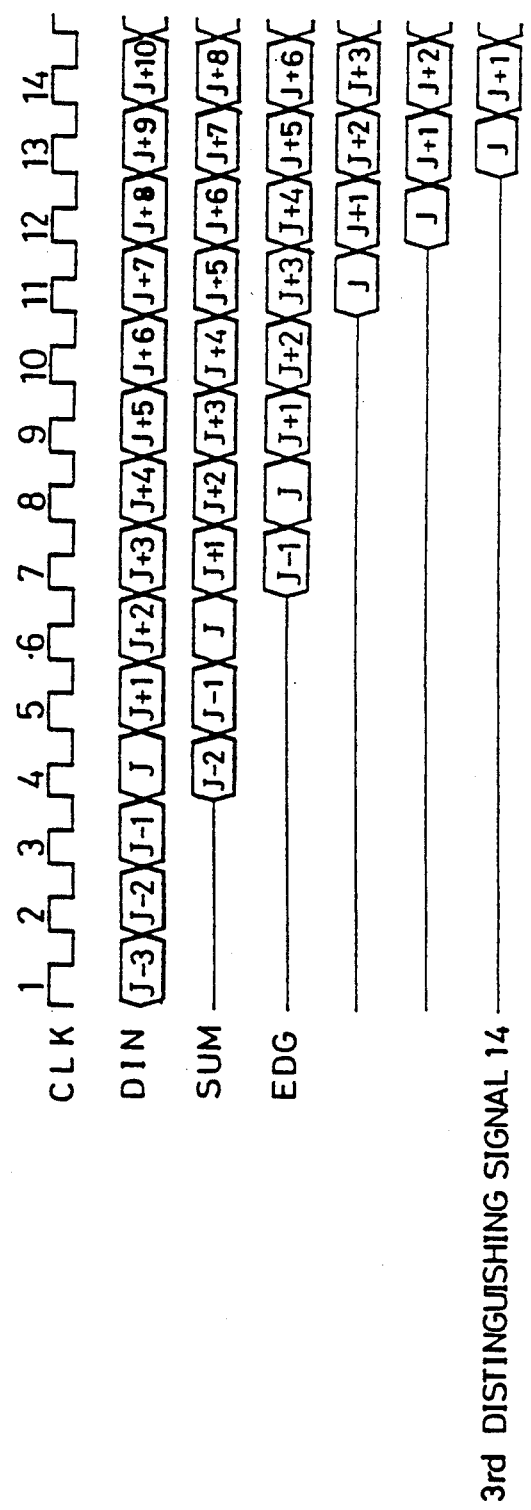

FIG.17

| 1 | 9 | 3 | 11 |
|---|---|---|----|
| 13 | 5 | 15 | 7 |
| 4 | 12 | 2 | 10 |
| 16 | 8 | 14 | 6 |

FIG.20

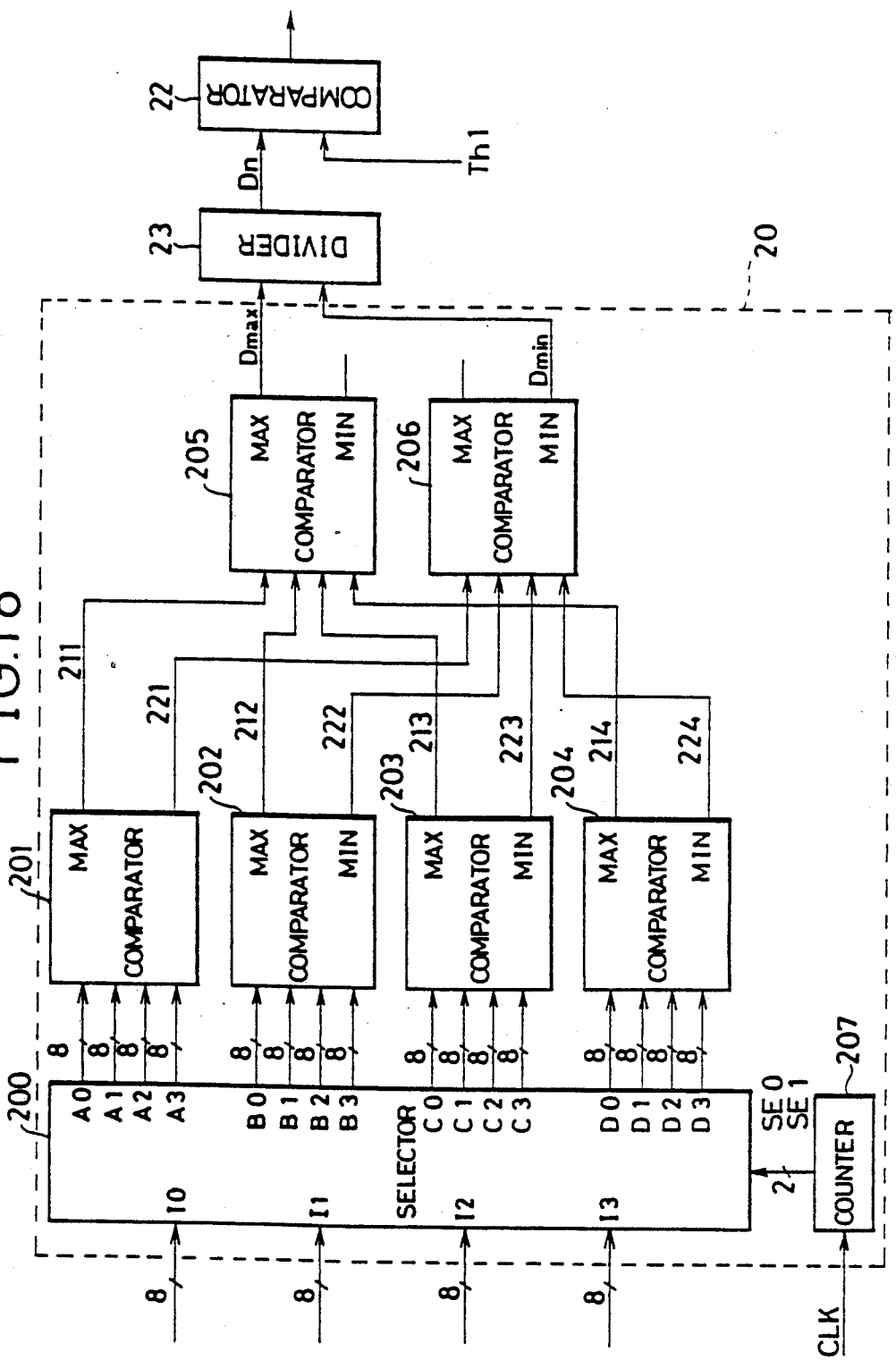

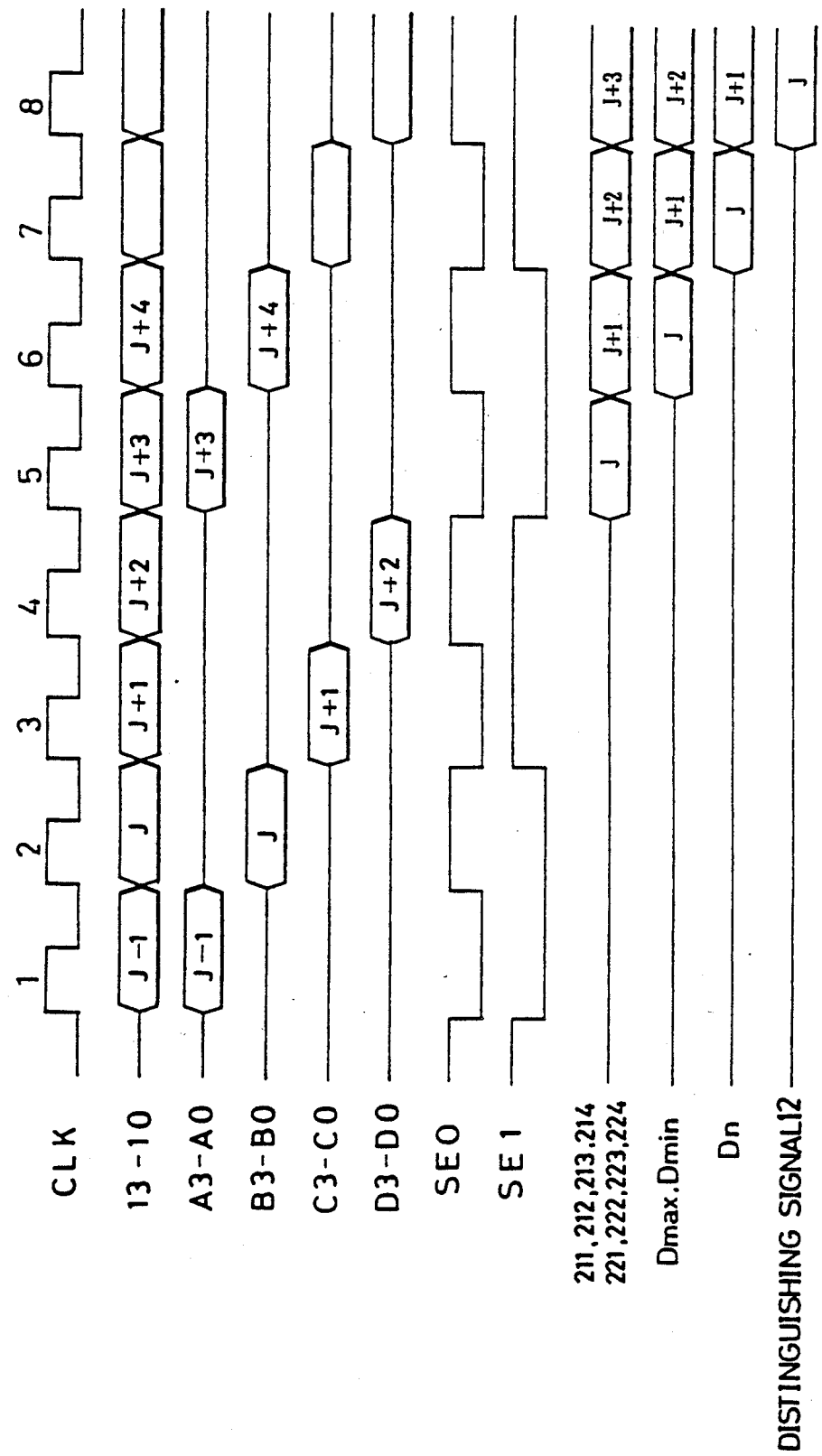

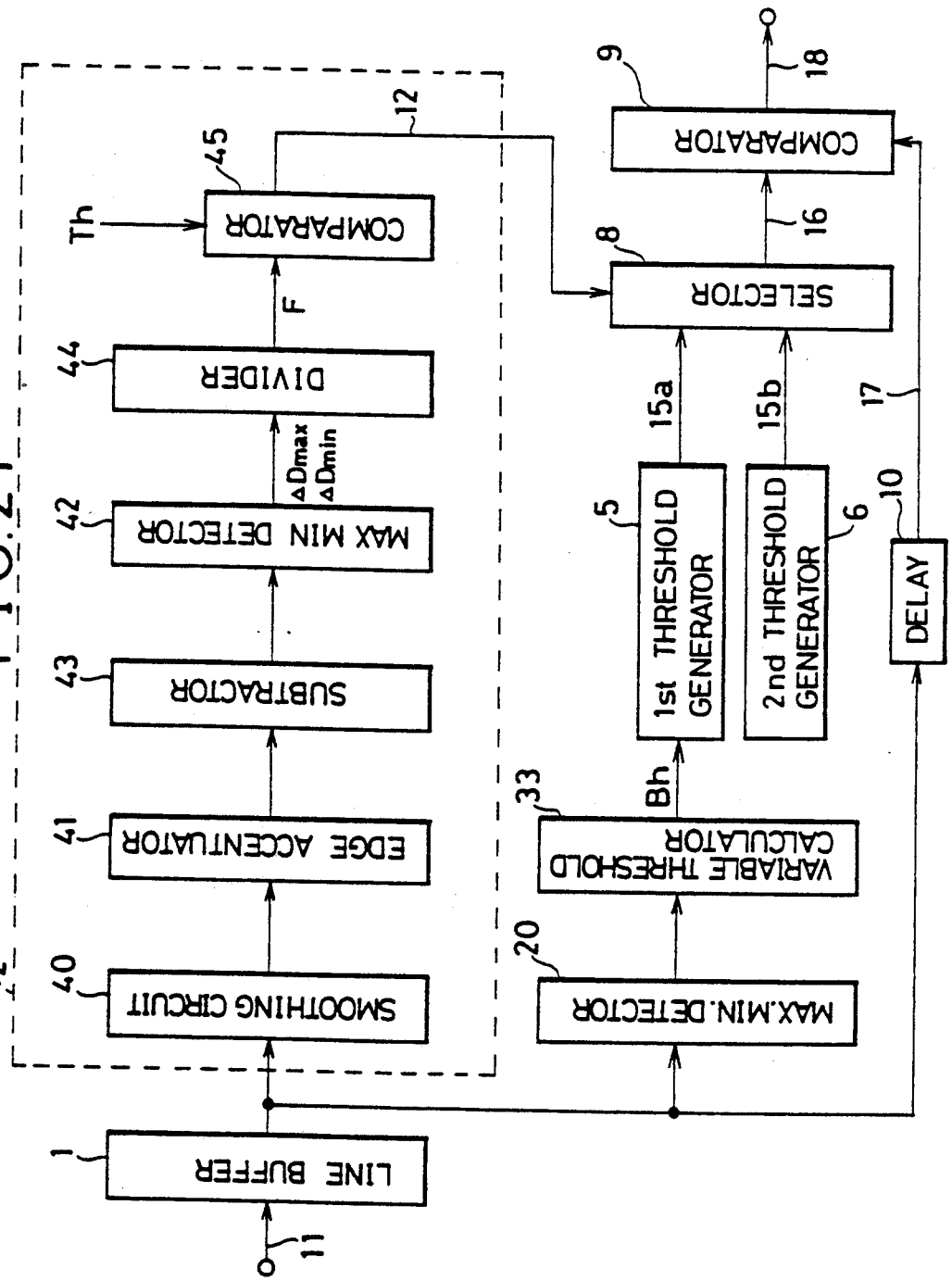

IMAGE PROCESSING DEVICE

BACKGROUND OF THE INVENTION

1. Field of the Invention

The present invention relates to an image processing device capable of processing images in accordance with both the resolution of letters and the tone of pictures and, more particularly, to an image processing device capable of processing images including poorly contrasted letters in accordance with the resolution of such letters.

2. Description of the Prior Art

In a conventional image processing device, such as, the one disclosed in Japanese patent application No. 58-3374, a problem exists in that the resolution is considerably reduced for poorly contrasted letter images such as blurred letters. The problem is due to misjudgement of picture images caused by the smallness of the maximum concentration difference in such images.

For example, when a manuscript P consists of a region A containing well contrasted letters and line figures, a region B containing pictures with smooth concentration gradations, and a region C containing poorly contrasted letters, such as blurred letters, as shown in FIG. 1, typical image signal levels in these regions of the manuscript P appear as shown in FIG. 2. The maximum concentration difference ΔDmax within a certain area such as that corresponding to 4×4 matrix formed by 16 picture elements in each of these regions A, B, and C are, in a representation in which the entire range of the concentration is represented by 8 bit (0–255 in decimal, or 0–ff in hexadecimal), ΔDmax=dd-ff (hex) for the region A, ΔDmax=10–40 (hex) for the region B, and ΔDmax =10–40 (hex) for the region C.

Thus, if letters and pictures were distinguished from each other by the following condition;

ΔDmax>Th→letters

ΔDmax≦Th→pictures with the threshold Th equal to 80 (hex), the region A is recognized as letters and the regions B and C are recognized as pictures. As a result, a straightforward binarization with respect to a fixed threshold value is performed in the region A, while a dither process is carried out in the regions B and C, so that the satisfactory results can be obtained with regards to the letters in the region A and the pictures in the region B, but the resolution of the poorly contrasted letters in the region C is considerably reduced because the processing was performed incorrectly.

On the other hand, if the threshold Th was set equal to a smaller value such as 30 (hex) or 10 (hex) so that the poorly contrasted letters in the region C may be identified correctly as letters, then the region B is also identified as letters, and the tone of the pictures in the region B may not be preserved because of this misjudgement.

Thus, according to the prior art image processing device, it is not possible to distinguish the region A of letter and line figure images, the region B of picture images, and the region C of poorly contrasted letter images from each other unambiguously. Consequently, it is not possible to perform image processing in accordance with the particularity of image contained in each region such that both the resolution of letter images and the tone of picture images are respected to a satisfactory degree.

Moreover, according to the prior art image processing device mentioned above, there is another problem is that the image concentration is considerably reduced for bold letter images due to misjudgement of such images as picture images. The problem is caused by the smallness of the maximum concentration difference within the width of such images resulting in appearance of blanking within the width of such images.

For example, when a manuscript P consists of a region A containing well contrasted letters and line figures, a region B containing pictures with smooth concentration gradation, a region C containing poorly contrasted letters such as blurred letters, and a region D containing bold letters with thick widths, as shown in FIG. 3, typical image signal levels in these regions of the manuscript P appear as shown in FIG. 4. The maximum concentration difference ΔDmax within a certain area such as that corresponding to 4×4 matrix formed by 16 picture elements in each of these regions A, B, C, and D are, in a representation in which the entire range of the concentration is represented by 8 bit (0–255 in decimals, or 0–ff in hexadecimal), ΔDmax=dd-ff (hex) for the region A, ΔDmax=10–40 (hex) for the region B, ΔDmax=10–40 (hex) for the region C, and ΔDmax=0–5 (hex) for the region D.

Thus if letters and pictures were distinguished from each other by the following condition:

ΔDmax>Th→letters

ΔDmax≦Th→pictures with the threshold Th equal to 80 (hex), the region A is recognized as letters and the regions B, C, and D are recognized as pictures. As a result, a straightforward binarization with respect to a fixed threshold value is performed in the region A, while a dither process is carried out in the regions B, C, and D, so that the satisfactory results can be obtained with regards to the letters in the region A and the pictures in the regions B but the resolution of the poorly contrasted letters in the region C is considerably reduced and the image concentration of the bold letters in the region D is considerably reduced to produce blankings because the processing was performed incorrectly in such a manner in which the tone is preserved.

On the other hand, if the threshold Th was set equal to a smaller value such as 3 (hex) or 1 (hex) so that the poorly contrasted letters in the region C and the bold letters in the region D may be identified correctly as letters, then the region B is also identified as letters and the tone of the pictures in the region B may not be preserved because of this misjudgement.

Thus, according to the prior art image processing device, it is not possible to distinguish the region A of letter and line figure images, the region B of picture images, the region C of poorly contrasted letter images, and the region D of bold letter images each other unambiguously. Consequently, it is not possible to perform image processing in accordance with the particularity of image contained in each region such that both the resolution of letter images and the tone of picture images are respected to a satisfactory degree.

SUMMARY OF THE INVENTION

It is therefore an object of the present invention to provide an image processing device capable of processing images containing both letters and pictures, in accordance with the particularities of images involved, at each region containing one type of image separately, such that both the resolution of letter images and the tone of picture images are respected to a satisfactory degree.

Another object of the present invention is to provide an image processing device capable of processing images appropriately while preserving the resolution and achieving an improved image quality as well as an improved processing efficiency in various image processings.

According to one aspect of the present invention there is provided an image processing device, comprising: a first means for distinguishing between a first type of images specified by two levels, 0-level and 1-level, and a second type of images not specified by the two levels in accordance with a first knowledge related to the image concentrations in the image information; a second means for distinguishing, among the images distinguished as the second type of images by the first distinguishing means, between letter-like images and picture-like images in accordance with a second knowledge related to the image concentrations in the image information; and means for processing images in accordance with the distinctions made by the first and the second distinguishing means among the images.

According to another aspect of the present invention there is provided an image processing device, comprising means for detecting a maximum value and a minimum value of a knowledge related to the image concentrations in the image information; means for calculating a normalized value from the maximum value and the minimum value detected by the detecting means; means for distinguishing between letter-like images and picture-like images by means of a comparison of the normalized value calculated by the calculating means and a predetermined reference value; and means for processing images in accordance with the distinction made by the distinguishing means among the images.

According to another aspect of the present invention there is provided an image processing device, comprising: difference calculating means for calculating a difference between a maximum value and a minimum value of changes in an information related to the image concentrations in the image information; distance calculating means for calculating a distance between points in the image at which the changes in the information reach the maximum value and the minimum value; ratio calculating means for calculating a ratio of the difference calculated by the difference calculating means and the distance calculated by the distance calculating means; means for distinguishing between letter-like images and picture-like images by means of a comparison of the ratio calculated by the ratio calculating means and a predetermined reference value; and means for processing images in accordance with the distinction made by the distinguishing means among the images.

According to another aspect of the present invention there is provided an image processing device, comprising; square sum average calculating means for calculating a square sum average of differences in an information related to image concentrations in image information between neighboring picture elements; means value calculating means for calculating a mean value of the information related to image concentrations; normalized value calculating means for calculating a normalized value as the square sum average normalized with respect to the mean value; means for distinguishing between letter-like images and picture-like images by means of a comparison of the normalized value calculated by the normalized value calculating means with predetermined reference value; and means for processing images in accordance with the distinction made by the distinguishing means among the images.

Other features and advantages of the present invention will become apparent from the following description taken in conjunction with the accompanying drawings.

BRIEF DESCRIPTION OF THE DRAWINGS

FIG. 11 is a timing chart for the second distinguishing circuit shown in FIG. 10.

FIG. 12 is a detailed block diagram of a third distinguishing circuit of the image processing device shown in FIG. 5.

FIG. 13 is a timing chart for the third distinguishing circuit shown in FIG. 12.

FIG. 17 is an illustration of an example of a dither threshold used in the image processing device shown in FIG. 15.

FIG. 18 is a detail block diagram of a distinguishing circuit of the image processing device shown in FIG. 15.

FIG. 19 is a timing chart for the distinguishing circuit shown in FIG. 18.

FIG. 20 is an illustration of a window of picture elements used in the image processing device shown in FIG. 15.

FIG. 21 is a block diagram of a third embodiment of an image processing device according to the present invention.

DETAILED DESCRIPTION OF THE PREFERRED EMBODIMENTS

Preferred embodiments of the present invention will be described in the following with references to the figures.

Figure 1:
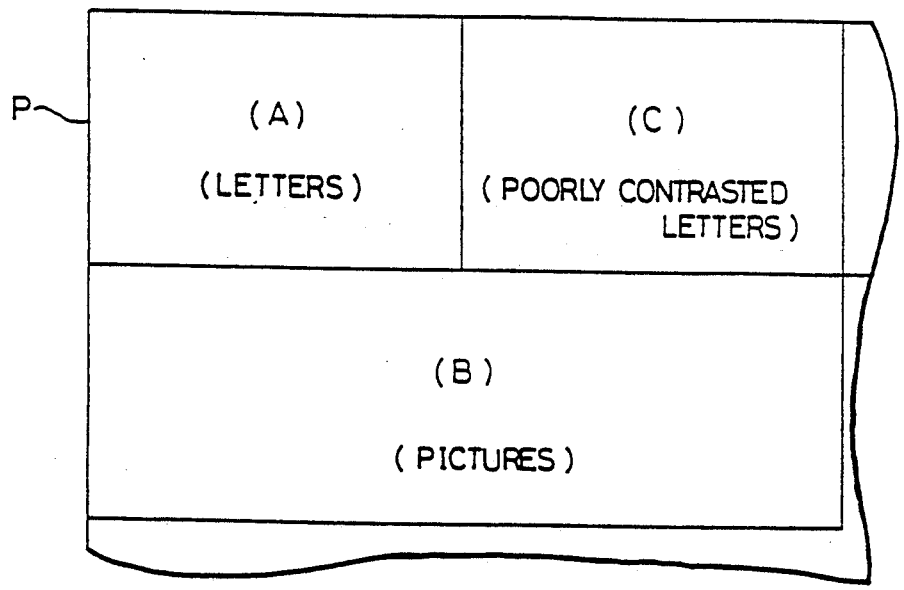
FIG. 1 is an illustration of regions of an image for explaining a prior art image processing.
Figure 2:
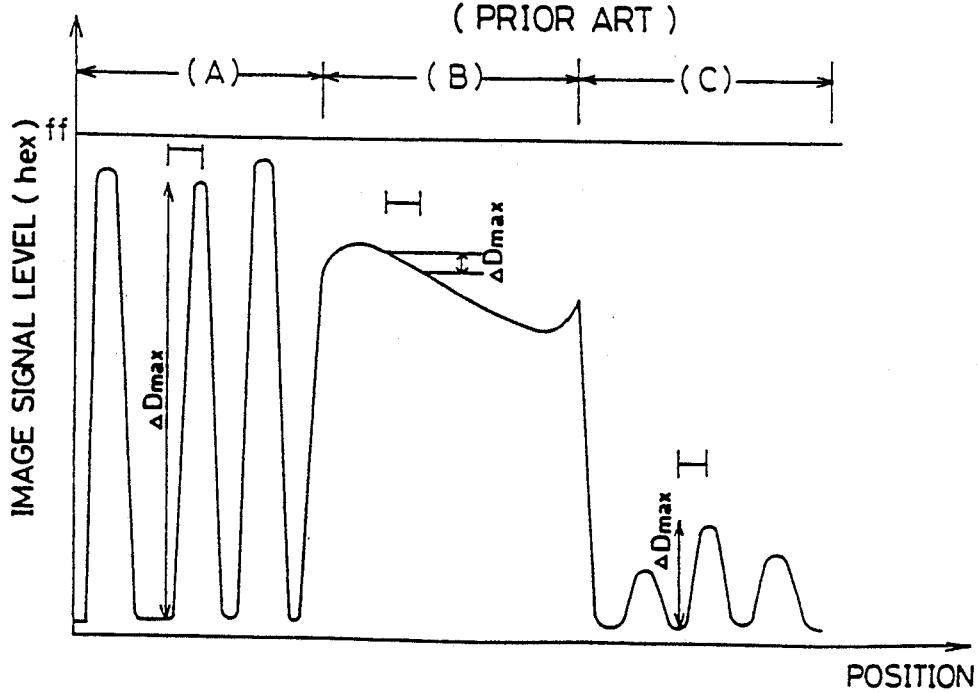
FIG. 2 is a graph of image signal levels in each region shown in FIG. 1 for explaining the prior art image processing.
Figure 3:
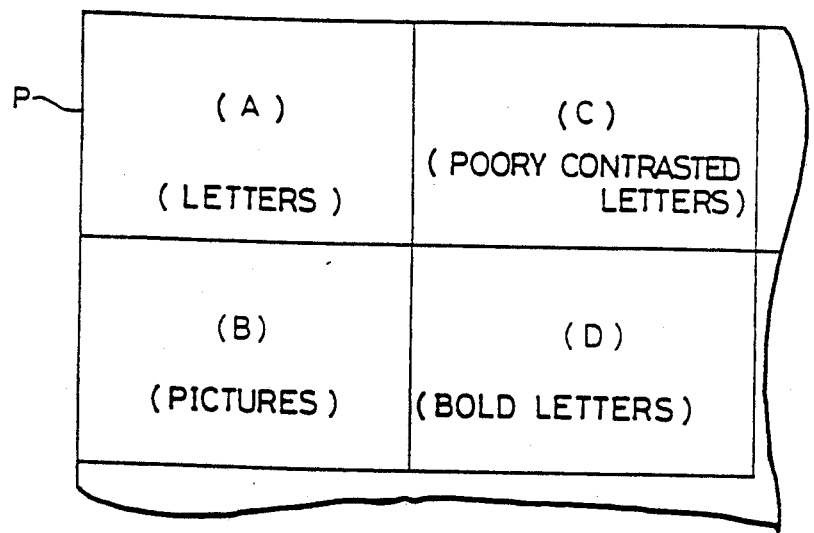
FIG. 3 is another illustration of regions of an image for explaining the prior art image processing.
Figure 4:
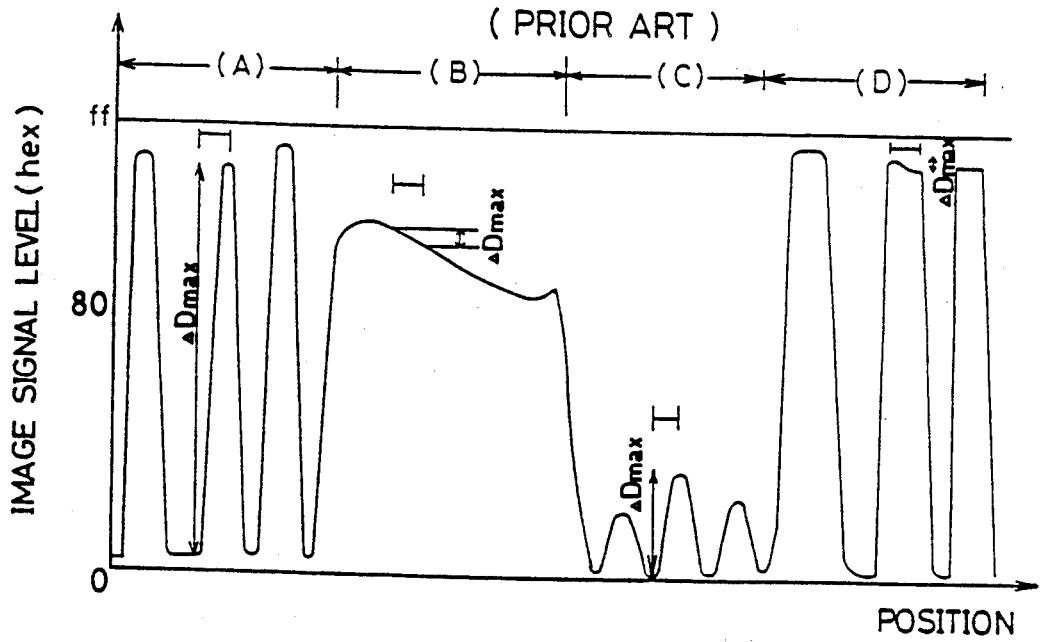
FIG. 4 is another graph of image signal levels in each region shown in FIG. 3 for explaining the prior art image processing.
Figure 5:
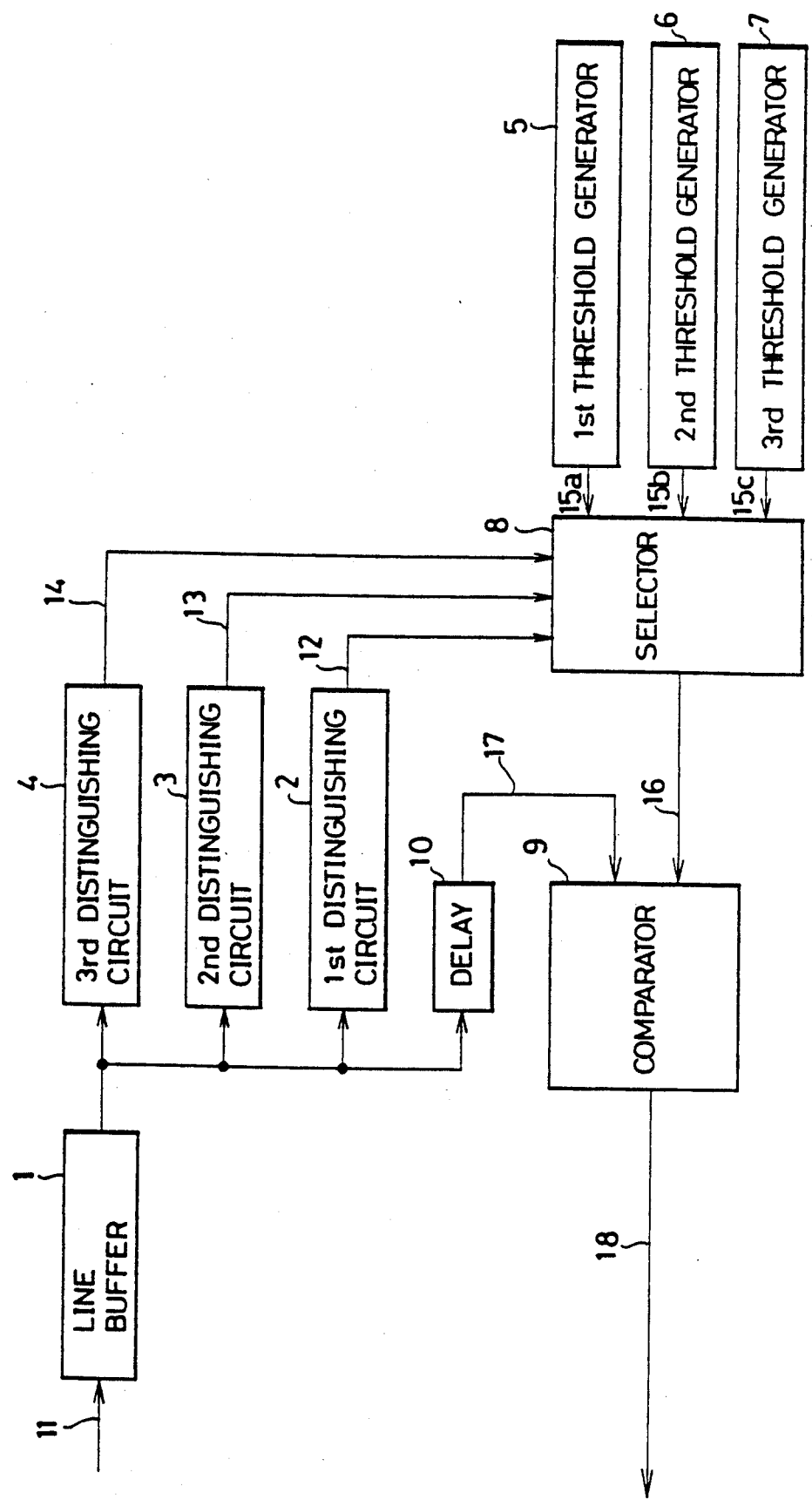
FIG. 5 is a block diagram of one embodiment of an image processing device according to the present invention.

Shown in FIG. 5 is one embodiment of an image processing device according to the present invention. In this image processing device, image signals 11 conveying an 8 bit signal for each picture element read by a scanner including an imaging device, which is not shown, are stored temporarily in a line buffer 1. The image signals stored in the line buffer 1 are then fed to first distinguishing circuit 2, a second distinguishing circuit 3, and a third distinguishing circuit 4 simultaneously by means of a synchronizing clock signal, not shown, as well as to a comparator 9 through a delay 10, which includes a delay memory. The first, second, and third distinguishing circuit 2, 3, and 4, respectively, perform distinguishing operations to be explained in detail below for each image signal corresponding to one picture element, and produce distinguishing signals 12, 13, and 14, respectively, which are subsequently fed to a selector 8 as control signals. Meanwhile a first threshold signal 15$a$, a second threshold signal 15$b$, and a third threshold signal 15$c$ are also fed to the selector 8 by a first threshold generator 5, a second threshold generator 6, and a third threshold generator 7, respectively. The selector 8 selects the most appropriate one from the first, the second, and the third threshold signals 15$a$, 15$b$, and 15$c$ in accordance with the first, the second, and the third distinguishing signals 12, 13, and 14 in a manner to be explained in detail below, and feeds this selected threshold signal 16 to the comparator 9. The comparator 9 compares the selected threshold signal 16 and the image signal 17 for the picture element fed through the delay 10, and produces an output signal 18 which is either '1' when the signal level of the image signal 17 is greater than that of the selected threshold signal 16, or '0' when the signal level of the image signal 17 is less than or equal to that of the selected threshold signal 16.

Figure 6:
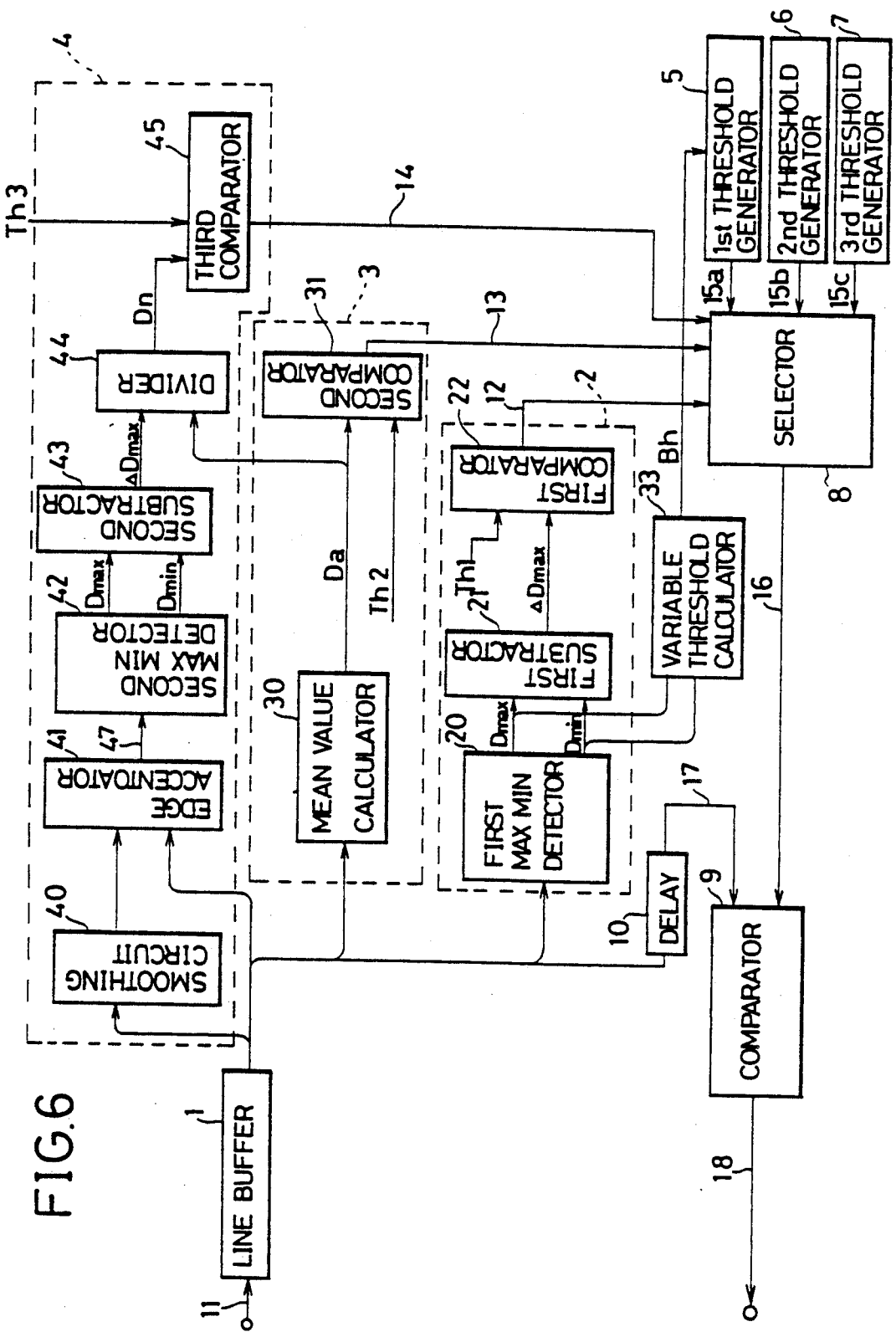
FIG. 6 is a detailed block diagram of the image processing device shown in FIG. 5.

Referring now to FIG. 6, the detail of the first, second, and third distinguishing circuits 2, 3, and 4 will be explained.

The first distinguishing circuit 2 distinguishes an image signal of letters from an image signal of pictures. In this first distinguishing circuit 2, the image signals stored in the line buffer 1 are fed to a first max min detector 20 which detects the maximum image concentration Dmax and the minimum image concentration Dmin from the image concentrations of 16 picture elements within a window of 4×4 matrix form in the image signals. The detected maximum image concentration Dmax and minimum image concentration Dmin are then fed to a first subtractor 21 in which the maximum concentration difference ΔDmax given by the equation:

$$\Delta Dmax = Dmax - Dmin \qquad (1)$$

is calculated. The calculated maximum concentration difference ΔDmax is fed to a first comparator 22 in which it is compared with a first judging threshold Th1 stored in advance in a register not shown. The first comparator 22 produces the first distinguishing signal 12 which is either '1' when the maximum concentration difference ΔDmax is greater than the first judging threshold Th1 indicating that the image signal is of letters, or '0' when the maximum concentration difference ΔDmax is less than or equal to the first judging threshold Th1 indicating that the image signal is of pictures. That is, ΔDmax > Th1 → letters ΔDmax ≦ Th1 → pictures Thus, the first distinguishing circuit 2 determines that the image signal is of letters when the maximum concentration difference ΔDmax, which is a difference between the maximum image concentration Dmax and the minimum image concentration Dmin, is greater than the first judging threshold Th1, and that the image signal is of pictures otherwise.

The second distinguishing circuit 3 distinguishes an image signal of bold letters. In this second distinguishing circuit 3, the image signals stored in the line buffer 1 are fed to a mean value calculator 30 which calculates a mean image concentration Da of the image concentrations of 16 picture elements within the window of 4×4 matrix form in the image signals. The calculated mean image concentration Da is fed to a second comparator 31 in which it is compared with a second judging threshold Th2 stored in advance in another register not shown. The second comparator 22 produces the second distinguishing signal 13 which is either '1' when the means image concentration Da is greater than the second judging threshold Th2 indicating that the image signal is of bold letters, or '0' when the mean image concentration Da is less than or equal to the second judging threshold Th2 indicating that the image signal is not of bold letters. That is, Da > Th2 → bold letters Da ≧ Th2 → not bold letters Thus, the second distinguishing circuit 3 determines that the image signal is of letters when the mean image concentration Da is greater than the second judging threshold Th2, and that the image signal is not of bold letters otherwise.

The third distinguishing circuit 4 distinguishes an image signal of poorly contrasted letters such as blurred letters. In this third distinguishing circuit 4, the image signals stored in the line buffer 1 are fed to a smoothing circuit 40 which supplies image signals with noise components removed to an edge accentuator 41 including Laplacian filters. The edge accentuator 41 produces edge accentuated image signals 47. This edge accentuated image signals 47 are then fed to a second max min detector 42. The second max min detector 42 detects the maximum image concentration Dmax and the minimum image concentration Dmin from image concentrations of 76 picture elements within the window of 4×4 matrix form in the edge accentuated image signals 47. The detected maximum image concentration Dmax and the minimum image concentration Dmin are then fed to a second subtractor 43 which calculates the maximum concentration difference ΔDmax within the window. The calculated maximum concentration difference ΔDmax is fed to a divider 44 in which it is divided by the mean image concentration Da within the window calculated at the mean value calculator 30 to yield a normalized maximum concentration difference ΔDn given by the equation:

$$\Delta Dn = \Delta Dmax/Da \tag{2}$$

The calculated normalized maximum concentration difference ΔDn is fed to a third comparator 45 in which it is compared with a third judging threshold Th3 stored in advance in another register not shown. The third comparator 45 produces a third distinguishing signal 14 which is either '1' when the normalized maximum concentration difference ΔDn is greater than the third judging threshold Th3 indicating that the image signal is of poorly contrasted letters, or '0' when the normalized maximum concentration difference ΔDn is less than or equal to the third judging threshold Th3 indicating that the image signal is not of poorly contrasted letters. That is, ΔDn > Th3 → poorly contrasted letters ΔDn ≦ Th3 → not poorly contrasted letters Thus the third distinguishing circuit 4 determines that the image signal is of poorly contrasted letters when the normalized concentration difference ΔDn is greater than the third judging threshold Th3, and that the image signal is not of poorly contrasted letters otherwise.

Now, the binarization of each image signal identified by means of the distinguishing circuits 2, 3, 4 above as either one of letters, pictures, bold letters, or poorly contrasted letters will be explained.

In FIG. 6, there is provided a variable threshold calculator 33 to which the maximum image concentration Dmax and the minimum image concentration Dmin are fed from the first max min detector 20, and this variable threshold calculator 33 is connected to the first threshold generator 5. The variable threshold calculator 33 calculates a binarization threshold Bh to be used in the straightforward binarization to be performed for the image signal identified as either letters or poorly contrasted letters. Namely, the variable threshold calculator 33 calculates from the maximum image concentration Dmax and the minimum image concentration Dmin within the window detected at the first max min detector 20 the binarization threshold Bh given by the equation:

$$Bh = (Dmax + Dmin)/2 \tag{3}$$

The calculated binarization threshold Bh is fed to the first threshold generator 5 and the first threshold generator 5 feeds the first threshold signal 15a in accordance with this binarization threshold Bh to the selector 8.

Also, the second threshold generator 6 generates a binarization threshold for pictures and feeds this as the second threshold signal 15b to the selector 8. The third threshold generator 7 generates a binarization threshold for bold letters and feeds this as the third threshold signal 15c to the selector 8.

The selector 8 determines the selected threshold signal 16 from the first, second, and third threshold signals 15a, 15b, and 15c using the first, the second, and the third distinguishing signals 12, 13, and 14 as control signals according to the following rule:

| Case | Condition (Type of image) | Selected threshold signal 16 (Type of threshold signal) |
|---|---|---|
| 1 | The 1st distinguishing signal 12 = 1 (Letters) | The 1st threshold signal 15a (straightforward binarization threshold) |
| 2 | The 1st distinguishing signal 12 = 0 and The 2nd distinguishing signal 13 = 1 (Bold letters) | The 3rd threshold signal 15c (Threshold for bold letters) |
| 3 | The 1st distinguishing signal 12 = 0 and The 2nd distinguishing signal 13 = 0 and The 3rd distinguishing signal 14 = 1 (Poorly contrasted letters) | The 1st threshold signal 15a (Straightforward binarization threshold) |
| 4 | The 1st distinguishing signal 12 = 0 and The 2nd distinguishing signal 13 = 0 and The 3rd distinguishing signal 14 = 0 (Picture) | The 2nd threshold signal 15b (Threshold for pictures) |

The comparator 9 compares the selected threshold signal 16 determined above with the image signal 17 for the picture element fed through the delay 10, and produces the output image signal 18, so that it is possible to perform image processing in which the resolution of letters including poorly contrasted letters such as blurred letters and bold letters with thick widths as well as the tone of pictures can be preserved.

Now, detail configurations of the first, the second, and the third distinguishing circuit 2, 3, and 4 will be explained.

Figure 7:
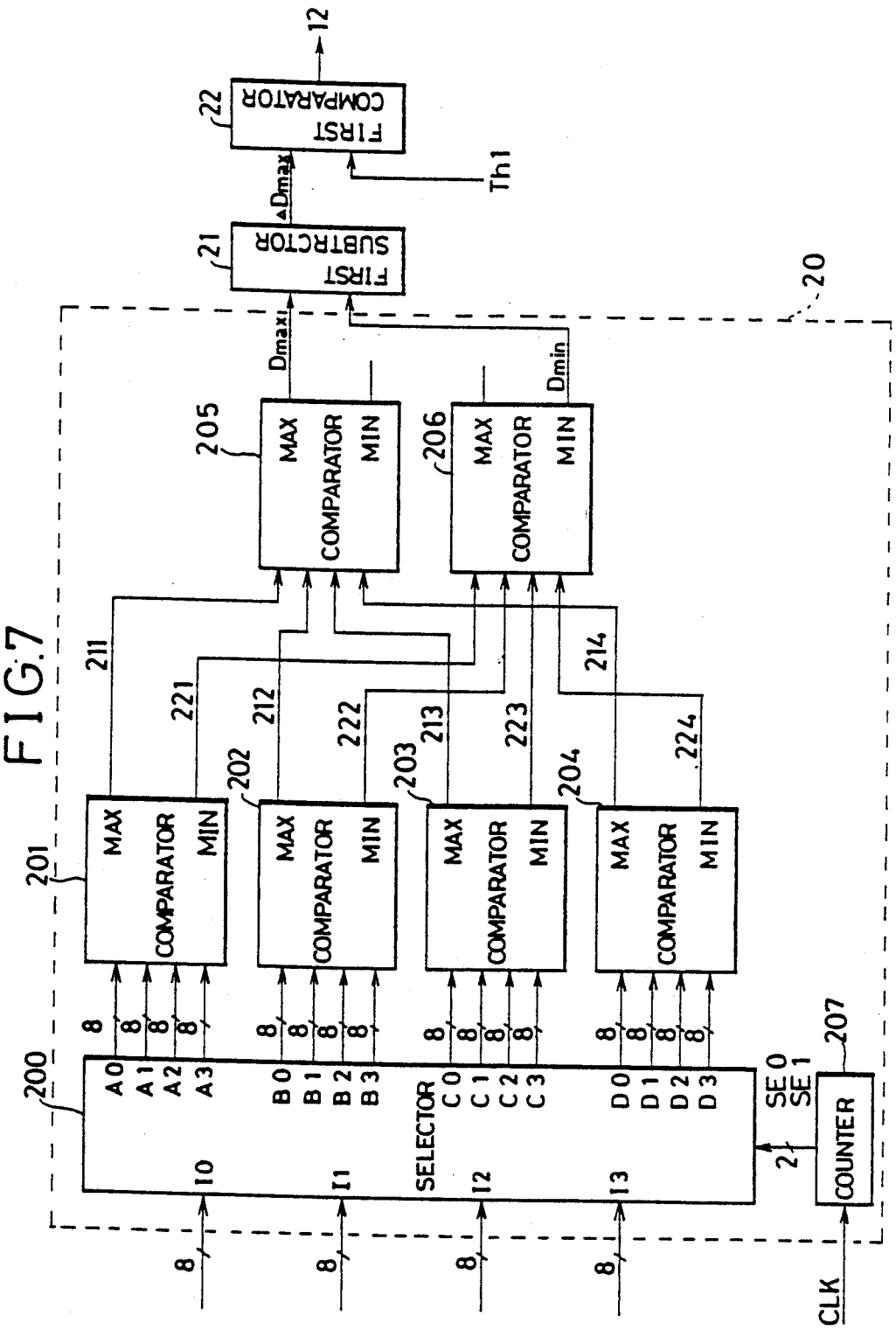
FIG. 7 is a detailed block diagram of a first distinguishing circuit of the image processing device shown in FIG. 5.
Figure 8:
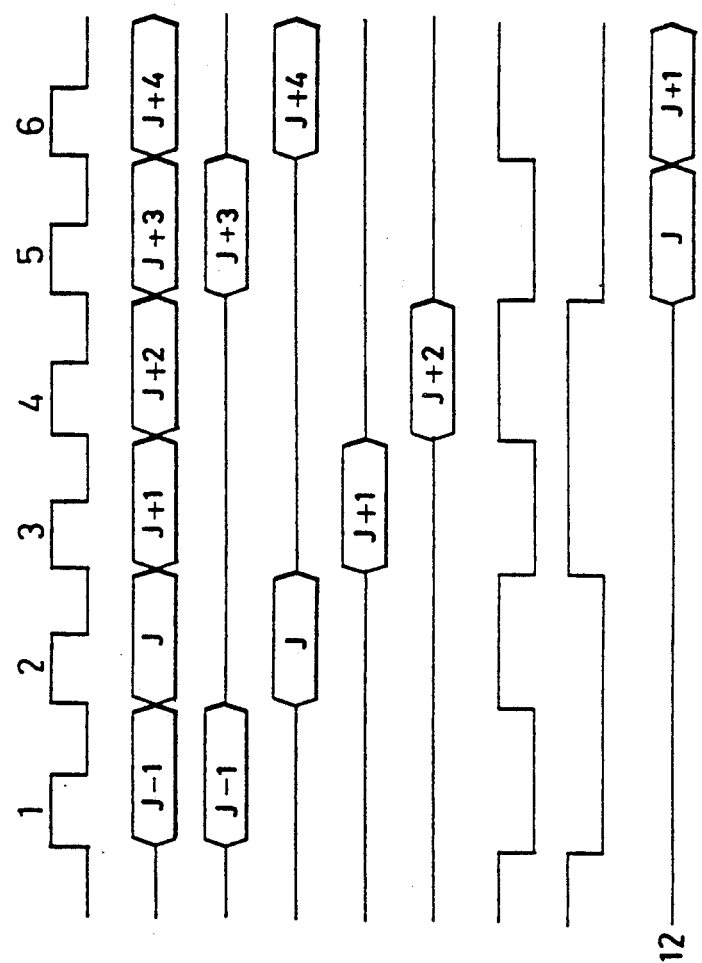
FIG. 8 is a timing chart for the first distinguishing circuit shown in FIG. 7.

FIG. 7 shows a detailed configuration of the first distinguishing circuit 2, and FIG. 8 shows a timing chart for this first distinguishing circuit 2.

Figure 9:
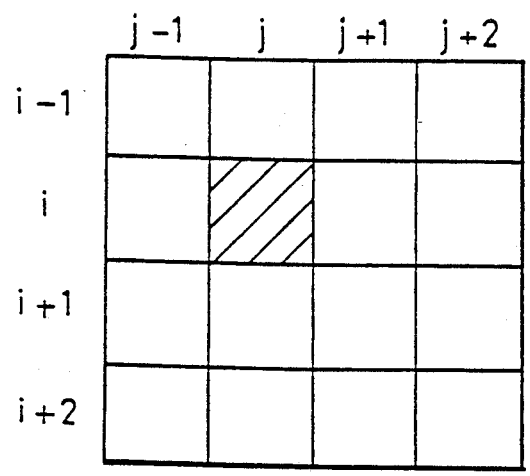
FIG. 9 is an illustration of a window of picture elements used in the image processing device shown in FIG. 5.

In FIG. 7, a selector 200, a counter 207, and comparators 201–206 constitute the first max min detector 20. Image signals containing 8 bit signal per picture element are fed through the selector 200 to the comparators 201, 202, 203, and 204, signals for 4 picture elements at a time synchronized by a clock signal CLK. To be more specific, for 4×4 matrix formed by 16 picture elements shown in FIG. 9, 4 picture elements belonging to each of the (J−1)th, the Jth, the (J+1)th, and the (J+2)th columns are fed to each of the comparators 201, 202, 203, and 204, respectively.

The counter 207 connected to the selector 200 counts the clock signal CLK, and provides its output signals SE0 and SE1 of the form shown in FIG. 8 to the selector 200. The selector 200 distributes the image signals from the line buffer 1 entering at its input ports I0–I3 to one of its output ports A0–A3, B0–B3, C0–C3, and D0–D3 in accordance with the output signals SE0 and SE1 of the counter 207. In FIG. 8, the line CLK shows the clock signal CLK, the line I shows the input signal of the selector 200 at its input ports I0–I3, the lines A, B, C, and D show the output signals of the selector 200 at its output ports A0–A3, B0–B3, C0–C3, and D0–D3, respectively, and the lines SE0 and SE1 shows the output signals SE0 and SE1 of the counter 207.

Each of the comparators 201, 202, 203, and 204 detects the maximum concentrations 211, 212, 213, and 214, respectively, and the minimum concentrations 221, 222, 223, and 224, respectively, of the 4 picture elements of each column. The maximum concentrations 211, 212, 213, and 214 are fed to the comparator 205, while the minimum concentrations 221, 222, 223, and 224 are fed to the comparator 206. The comparator 205 detects the maximum image concentration Dmax from the maximum concentrations 211, 212, 213, and 214 of different columns, and the comparator 206 detects the minimum image concentration Dmin from the minimum concentrations 221, 222, 223, and 224 of different columns.

The maximum image concentration Dmax from the comparator 205 and the minimum image concentration Dmin from the comparator 206 are fed to the first substracter 21 as the output signals of the first max min detector 20 and, as explained before, the first subtracter 21 calculates the maximum concentration difference ΔDmax which is fed to the first comparator 22 in which it is compared with the first judging threshold Th1 to produce the first distinguishing signal 12.

Figure 10:
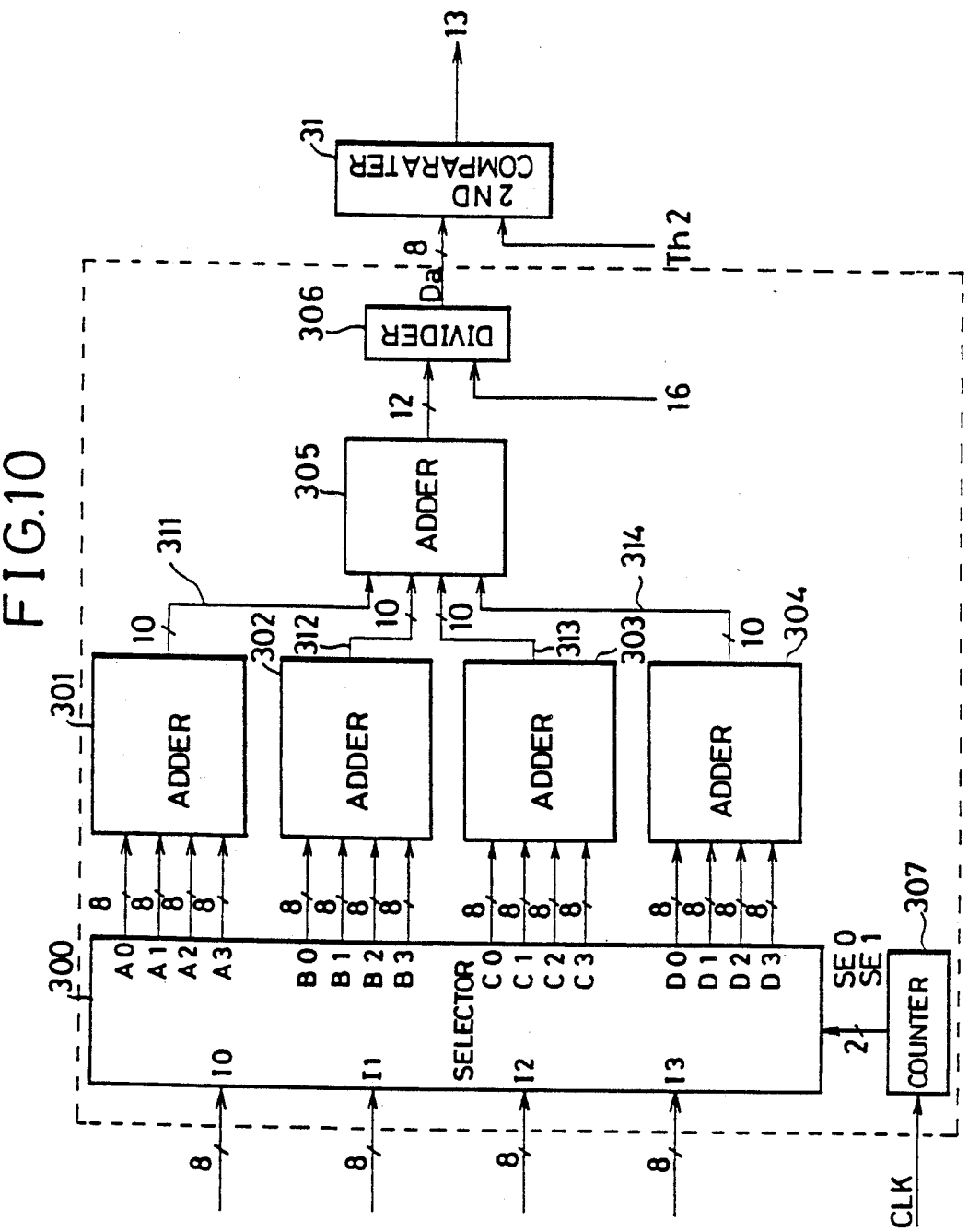
FIG. 10 is a detailed block diagram of a second distinguishing circuit of the image processing device shown in FIG. 5.

FIG. 10 shows a detailed configuration of the second distinguishing circuit 3, and FIG. 11 shows a timing chart for this second distinguishing circuit 3. In FIG. 10, a selector 300, a counter 307, adders 301–305, and a divider 306 constitute the mean value calculator 30, of which the selector 300 and the counter 307 are ones identical in their configurations and functions to the selector 200 and the counter 2078 of FIG. 7. Each of the adders 301, 302, 303, and 304, calculates the sum 311, 312, 313, and 314, respectively, of 4 input signals fed to each of them by the selector 300 and these sums are summed again by the adder 305. The input signals of the adders 301, 302, 303, and 304 are of 8 bit while the output signals of these adders are of 10 bit, and the input signal of the adder 305 is of 10 bit while the output signal of this adder is of 12 bit.

In FIG. 10, the line CLK shows the clock signal, the lines F, A, B, C, and D show the input and output signals of the selector 300, and the lines SE0 and SE1 show the output signals of the counter 307. For the picture element (I, J) of the window shown in FIG. 90, the image signals for the 4 picture elements in the (J−1)th column from the (I−1)th row to the (I+2)th row are fed to the adder 301 at the first clock signal. Similarly, the image signals for the 4 picture elements in the Jth column are fed to the adder 302 at the second clock signal, the image signals for the 4 picture elements in the (J+1)th column are fed to the adder 303 at the third clock signal, and the image signals for the 4 picture elements in the (J+2)th column are fed to the adder 304 at the fourth clock signals. At the fifth clock signal, the sums calculated by the adders 301, 302, 303, and 304 are fed to the adder 305 and the sum of these sums 311, 312, 313, and 314 are calculated. Thus, the adder 305 calculated the sum of all 16 picture elements in the window shown in FIG. 9. This sum of the 16 picture elements is fed to the divider 306 at the sixth clock signal in which it is divided by the total number of the picture element, 76, to yield the mean image concentration Da of the window. This mean image concentration Da is then fed to the second comparator 31 at the seventh clock signal and, as explained before, there it is compared with the second judging signal Th2.

Figure 14:
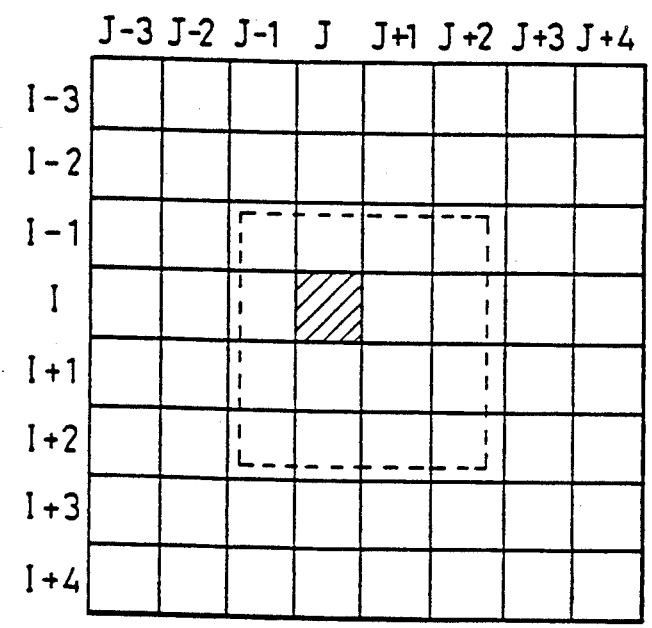
FIG. 14 is an illustration of picture elements relevant to the third distinguishing circuit shown in FIG. 12.

FIG. 12 shows a detail configuration of the third distinguishing circuit 4, and the FIG. 13 shows a timing chart for this third distinguishing circuit 4. In FIG. 12, smoothing elements 401–406 constitute the smoothing circuit 40, and edge accentuating elements 411–414 constitute the edge accentuator 41. In FIG. 13, the line DIN shows the timing for feeding the image signals from the line buffer 1 to the smoothing elements 401–406, so that (J−3) at the first clock signal is the timing at which the image signals of the 8 picture elements in the (J−3)th column from the (I−3)th row to the (I+4)th row shown in FIG. 14 are fed to the smoothing elements 401–406. Also, the line SUM shows the timing for feeding the smoothed image signals from the smoothing elements 401–406 to the edge accentuating elements 411–414, so that (J−2) at the fourth clock signal is the timing at which the smoothed image signals of the 6 picture elements in the (J−2)th column from the (I−2)th row to the (I+3)th row shown in FIG. 14 are fed to the edge accentuating elements 411–414. Also, the line EDG shows the timing for feeding the edge accentuated image signals from the edge accentuating elements 411–414 to the second max min detector 42, so that (J−1) at the seventh clock signal is the timing at which the edge accentuated image signals of the 4 picture elements in the (J−1)th column from the (I−1)th row to the (I+2)th row shown in FIG. 14 are fed to the second max min detector 42. As explained before, the second max min detector 42 detects the maximum image concentration Dmax and the minimum image concentration Dmin of the window, and then the maximum concentration difference ΔDmax is calculated by the second subtracter 43 according to the timing shown in the line FTR. This maximum concentration difference ΔDmax is divided by the mean image concentration Da at the divider 44 according to the timing shown in the line Dn to yield the normalized maximum concentration difference ΔDn, which is compared with the third judging threshold Th3 at the third comparator 45 to produce the third distinguishing signal 14.

Although this embodiment has been described in the above for the window of 4×4 picture element matrix, this choice is completely arbitrary and the present invention is not limited to this choice. Also, the binarization threshold Bh in the above description can be chosen differently, for example, to be the mean image concentration Da within a certain region. In addition, the quantities in the above description can be modified by adding a positive or negative tolerance x, so that, for example, the binarization threshold Bh can be replaced by Bh+x.

Moreover, although in this embodiment the characterizing quantity to distinguish between the letter images and the picture images, namely between the two level images and non two level images, out of the image information as well as the judging thresholds are chosen to be the image signals picked by the scanner, that is, the quantity proportional to the reflectivity of the images, these may be chosen to be the image concentration, that is, the logarithm of the inverse of the reflectivity, or transformed signals in accordance with the human visual characteristics.

As explained above, according to this embodiment, it is possible to perform image processing preserving the resolution even of bold letters or poorly contrasted letters such as blurred letters written in pencil which caused the blanking within the width or the poor resolution in the prior art as they are identified as pictures, and thereby to improve the quality of images as well as the efficiency of the image processing.

In the following, other embodiments of an image processing device according to present invention will be explained in which those elements identical in their functions to those appeared in the previous embodiment will be given the same labels in the figures.

Figure 15:
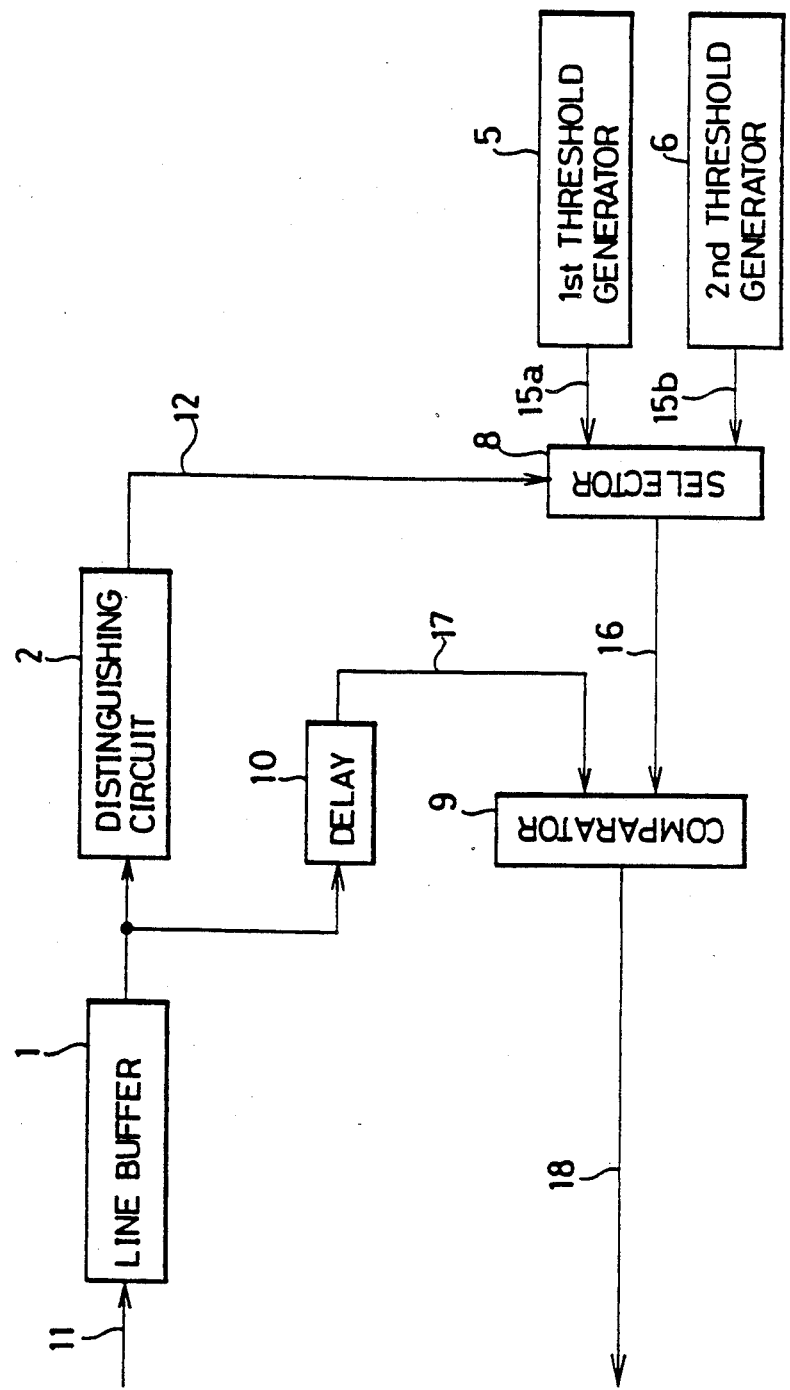
FIG. 15 is a block diagram of a second embodiment of an image processing device according to the present invention.

Referring now to FIG. 15, there is shown the second embodiment of an image processing device according to the present invention.

In FIG. 15, a distinguishing circuit 2 detects maximum and minimum values of image information related to image concentrations such as a maximum image concentration and a minimum image concentration, and calculates a normalized value obtained by normalizing one of the maximum value and the minimum value with respect to the other, and compares this normalized value with a predetermined reference value to distinguish between two level images and non two images of the image information.

Figure 16:
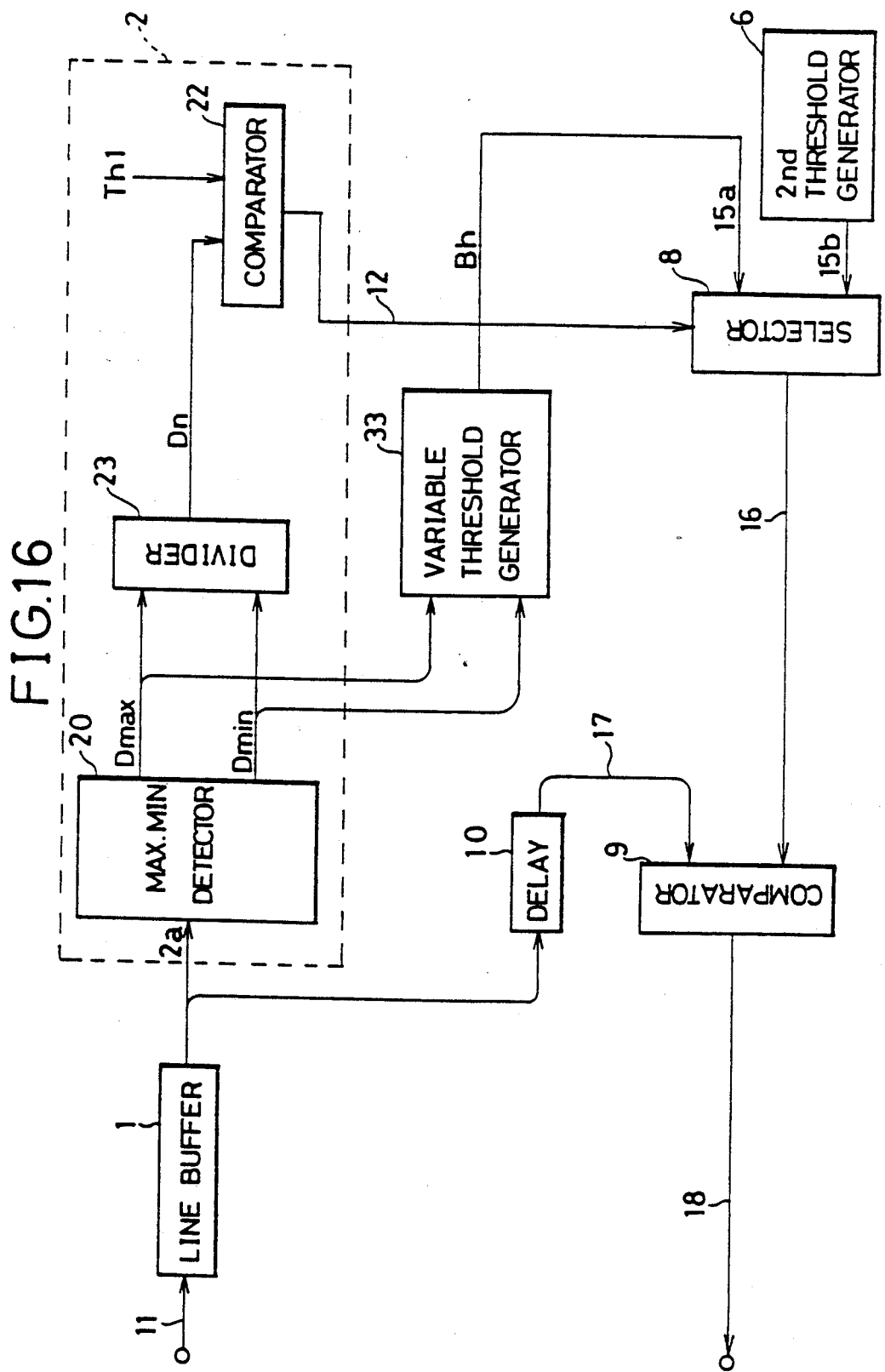
FIG. 16 is a detailed block diagram of the image processing device shown in FIG. 15.

In this image processing device, image signals 11 conveying an 8 bit signal for each picture element read by a scanner including imaging device, which is not shown, are stored temporarily in a line buffer 1. The image signals stored in the line buffer 1 are then fed to a distinguishing circuit 2, by means of a synchronizing clock signal, not shown, as well as to a comparator 9 through a delay 10 including a delay memory. The distinguishing circuit 2 performs a distinguishing operation to be explained in detail below for each image signal corresponding to one picture element, and produces distinguishing signal 12 which is subsequently fed to a selector 8 as a control signal. Meanwhile a first threshold signal 15a and a second threshold signal 15b are also fed to the selector 8 by a first threshold generator 5 and a second threshold generator 6, respectively. The selector 8 selects the most appropriate one from the first and second threshold signals 15a and 15b in accordance with the distinguishing signal 12 in a manner to be explained in detail below, and feeds this selected threshold signal 16 to the comparator 9. The comparator 9 compares the selected threshold signal 16 and the image signal 17 for the picture element fed through the delay 10, and produces an output signal 18 which is either '1' when the signal level of the image signal 17 is greater than that of the selected threshold signal 16, or '0' when the signal level of the image signal 17 is less than or equal to that of the selected threshold signal 16. Referring now to FIG. 16, a detail of the distinguishing circuit 2 will be explained.

The distinguishing circuit 2 distinguishes an image signal of letters from an image signal of pictures. In this distinguishing circuit 2, the image signals stored in the line buffer 1 are fed to a max min detector 20 which detects the maximum image concentration Dmax and the minimum image concentration Dmin from image concentrations of 16 picture elements within a window of 4×4 matrix form in the image signals. The detected maximum image concentration Dmax and minimum image concentration Dmin are then fed to a divider 23 in which a normalized value Dn obtained by normalizing one of the maximum image concentration Dmax and the minimum image concentration Dmin with respect to the other given, for instance, by the equation:

$$Dn = Dmin/Dmax \qquad (4)$$

is calculated. In the equation (4), the minimum image concentration Dmin is divided by the maximum image concentration Dmax to give the normalized value Dn, but inversely the maximum image concentration Dmax divided by the minimum image concentration Dmin may be used. The calculated normalized value Dn is fed to a comparator 22 in which it is compared with a judging threshold Th 1 stored in advance in a register not shown. The comparator 22 produces the distinguishing signal 12 which is either '1' when the normalized value Dn is greater than the judging threshold Th 1 indicating that the image signal is of letters, or '0' when the normalized value Dn is less than or equal to the judging threshold Th 1 indicating that the image signal is of pictures. That is, Dn > Th 1 → letters Dn ≦ Th 1 → pictures Thus, the distinguishing circuit 2 determines that the image signal is of letters when the normalized value Dn obtained from the maximum image concentration Dmax and the minimum image concentration Dmin is greater than the judging threshold Th 1, and that the image signal is of pictures otherwise.

Now, the binarization of each image signal identified by means of the distinguishing circuit 2 above as either one of letters or pictures will be explained.

In FIG. 16, there is provided a variable threshold calculator 33 to which the maximum image concentration Dmax and the minimum image concentration Dmin are fed from the max min detector 20, and the output signal of this variable threshold calculator is fed to the selector 8 as the first threshold signal 15a. The variable threshold calculator 33 calculates a binarization threshold Bh to be used in the straightforward binarization to be performed for the image signal identified as letters. Namely, the variable threshold calculator 33 calculates from the maximum image concentration Dmax and the minimum image concentration Dmin within the window detected at the max min detector 20 the binarization threshold Bh given by the equation:

$$Bh = (Dmax + Dmin)/2 \quad (3)$$

This binarization threshold Bh is the first threshold signal 15a to be fed to the selector 8.

Figures 17, 20:
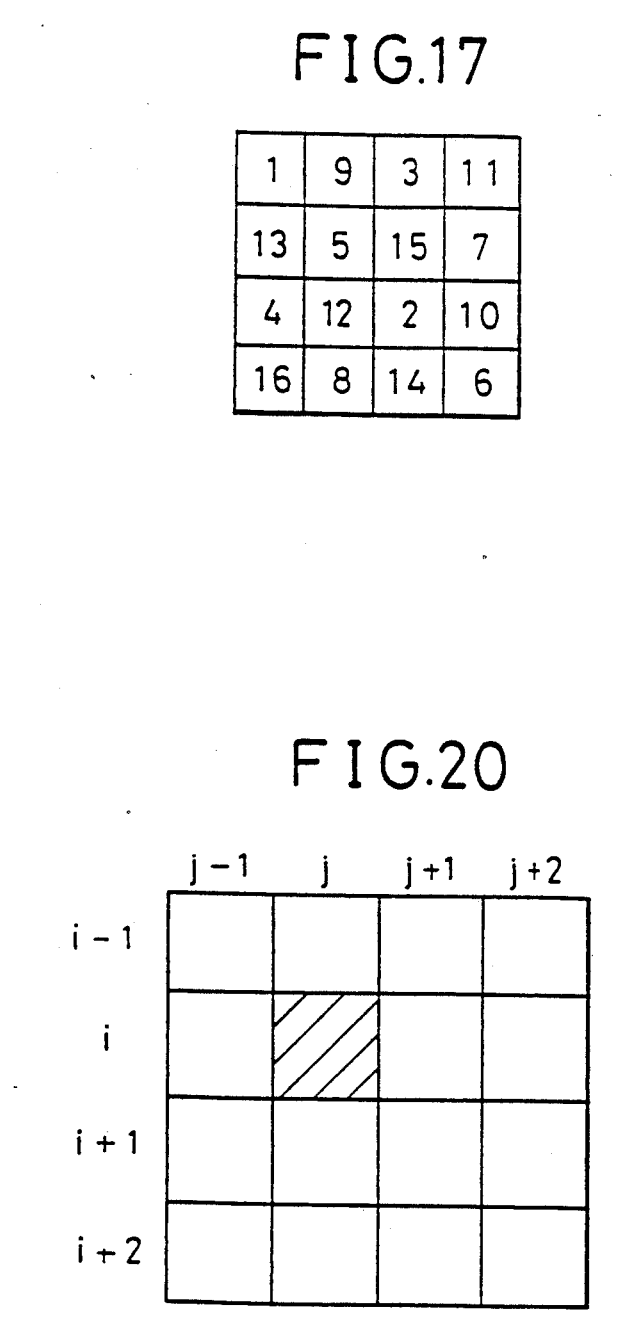

Also, the second threshold generator 6 generates a binarization threshold for pictures and feed a dither threshold shown in FIG. 20 to the selector 8 as the second threshold signal 15b.

The selector 8 determines the selected threshold signal 16 from the first and second threshold signals 15a and 15b using the distinguishing signal 12 as a control signal according to the following rule:

| Case | Condition (Type of image) | Selected threshold signal 16 (Type of threshold signal) |
|---|---|---|
| 1 | The distinguishing signal 12 = 1 (Letters) | The 1st threshold signal 15a (Straightforward binarization threshold) |
| 2 | The distinguishing signal 12 = 0 (Pictures) | The 2nd threshold signal 15b (Threshold for pictures) | and feeds the selected threshold signal 16 to a comparator 9.

The comparator 9 compares the selected threshold signal 16 determined above with the image signal 17 for the picture element fed through the delay 10, and produces the output signal 18, so that it is possible to perform image processing in which the resolution of letters including poorly contrasted letters such as blurred letters as well as the tone of pictures can be preserved.

Now a detail configuration of the distinguishing circuit 2 will be explained.

FIG. 18 shows a detail configuration of the distinguishing circuit 2, and FIG. 19 shows a timing chart for this distinguishing circuit 2. In FIG. 18, a selector 200, a counter 207, and comparators 201-206 constitute the max min detector 20. Image signals containing 8 bit signal per picture element are fed through the selector 200 to the comparators 201, 202, 203, and 204, signals for 4 picture elements at a time synchronized by a clock signal CLK. To be more specific, for 4×4 matrix formed by 16 picture elements shown in FIG. 20, 4 picture elements belonging to each of (J−1)th, Jth, (J+1)th, and (J+2)th columns are fed to each of the comparators 201, 202, 203, and 204, respectively.

The counter 207 connected to the selector 200 counts the clock signal CLK, and provides its output signal SE0 and SE1 of the form shown in FIG. 19 to the selector 200. The selector 200 distributes the image signals from the line buffer 1 entering at its input ports I0-I3 to one of its output ports A0-A3, B0-B3, C0-C3, and D0-D3 in accordance with the output signals SE0 and SE1 of the counter 207. In FIG. 19, the line CLK shows the clock signal CLK, the line I shows the input signal of the selector 200 at its input ports I0-I3, the lines A, B, C, and D shown the output signals of the selector 200 at its output ports A0-A3, B0-B3, C0-C3, and D0-D3, respectively, the lines SE0 and SE1 show the output signals SE0 and SE1 of the counter 207, the lines 211-214 and 221-224 show the output signals indicating the maximum concentration and the minimum concentration of 4 picture elements in each column of the comparators 201-204, respectively, and the lines Dmax and Dmin show the signals indicating the maximum image concentration Dmax and the minimum image concentration Dmin within the window of 16 picture elements.

Each of the comparators 201, 202, 203, and 204 detects the maximum concentrations 211, 212, 213, and 214, respectively, and the minimum concentrations 221, 222, 223, and 224, respectively, of the 4 picture elements of each column. The maximum concentrations 211, 212, 213, and 214 are fed to the comparator 205, while the minimum concentrations 221, 222, 223, and 224 are fed to the comparator 206. The comparator 205 detects the maximum image concentration Dmax within the window from the maximum concentrations 211, 212, 213, and 214 of different columns, and the comparator 206 detects the minimum image concentration Dmin within the window from the minimum concentrations 221, 222, 223 and 224 of different columns.

For the picture element (I, J) of the window shown in FIG. 20, the image signals for the 4 picture elements in the (J−1)th column from the (I−1)th row to the (I+2)th row are fed from the output ports A0-A3 of the selector 200 to the comparator 201 detects the maximum concentration 211 and the minimum concentration 221 of the 4 picture elements. Similarly, the image signals for the 4 picture elements in the Jth column are fed from the output ports B0-B3 of the selector 200 to the comparator 202 at the second clock signal, the image signals for the 4 picture elements in the (J+1)th column are fed from the output ports C0–C3 of the selector 200 to the comparator 203 at the third clock signal, the image signals for the 4 picture elements in the (J+2)th column are fed from the output ports D0–D3 of the selector 200 to the comparator 204 at the fourth clock signal, and the comparators 202, 203, and 204 detect the maximum concentrations 212, 213, and 214, respectively, and the minimum concentrations 222, 223, and 224, respectively, of the 4 picture elements of the Jth, (J+1)th, and (J+2)th columns, respectively. At the fifth clock signal, the maximum concentrations 211–214 are fed to the comparator 205 while the minimum concentrations 221–224 are fed to the comparator 206, and the comparator 205 detects the maximum image concentration Dmax within the window from the maximum concentrations 211–214 while the comparator 206 detects the minimum image concentration Dmin within the window from the minimum concentrations 221–224. At the sixth clock signal, the maximum image concentration Dmax and the minimum image concentration Dmin within the window detected by the comparators 205 and 206 are fed to the divider 23, and the divider 23 calculates the normalized value Dn from the maximum image concentration Dmax and the minimum image concentration Dmin. At the seventh clock signal, the normalized value Dn is fed to the comparator 22, and the comparator 22 compares the normalized value Dn and the judging threshold Th 1, to produce the distinguishing signal 12 at the eighth clock signal.

Although this embodiment has been described in the above for the window of 4×4 picture element matrix, this choice is completely arbitrary and the present invention is not limited to this choice. Also, in this embodiment the image signals are distinguished for one picture element at a time, it can be done for N×N picture elements block at a time, where N is a positive integer greater than 1. Furthermore, the binarization threshold Bh in the above description can be chosen differently, for example, to be the mean image concentration Da within a certain region. In addition, the quantities in the above description can be modified by adding a positive or negative tolerance x, so that, for example, the binarization threshold Bh can be replaced by Bh+x. The dither threshold may also be chosen differently from the dot dispersion type, for example, to be the dot concentration type.

Moreover, although in this embodiment the characterizing quantity to distinguish between the letter images and the picture images, namely between the two level images and non two level images, out of the image information as well as the judging thresholds are chosen to be the image signals picked by the scanner, that is, the quantity proportional to the reflectivity of the images, these may be chosen to be the image concentration, that is, the logarithm of the inverse of the reflectivity, or transformed signals in accordance with the human visual characteristics.

As explained above, according to this embodiment, the two level images and non two level images in the image information are distinguished from each other by means of the comparison of the normalized value with a predetermined reference value, the normalized value being obtained by normalizing one of the maximum value and the minimum value in the image information related to the image concentration such as the maximum image concentration and the minimum image concentration with respect to the other, so that it is possible to perform image processing preserving the resolution even of poorly contrasted letters such as blurred letters which cause the poor resolution in the prior art as they are identified as pictures, and thereby to improve the quality of images as well as the efficiency of the image processing.

Referring now to FIG. 21, there is shown the third embodiment of an image processing device according to the present invention. In FIG. 21, a distinguishing circuit 2 distinguishes between letters including poorly contrasted letters and non letters, i.e., pictures by utilizing the fact that poorly contrasted letters are conventionally identified as pictures because their maximum neighboring image concentration differences are small, but they possess rather large minimum neighboring image concentration differences. In this image processing device, image signals from a line buffer 1 are fed to a smoothing circuit 40 in which noise components of the image signals are removed. The smoothing circuit 40 feeds the smoothed image signals with noise components removed to an edge accentuator 41. The edge accentuator 41 which utilizes Laplacian filters extracts edges of the smoothed image signals from the smoothing circuit 40, and produces edge accentuated image signals. These edge accentuated image signals are fed to the subtractor 43 which calculates concentration differences of neighboring picture elements within a block, i.e., a neighboring image concentration difference signals, from the edge accentuated image signals. The neighboring image concentration difference signals are fed to the max min detector 42 which detects the maximum neighboring image concentration difference $\Delta Dmax$ and the minimum neighboring image concentration difference $\Delta Dmin$ within the block, and feeds these maximum neighboring image concentration difference $\Delta Dmax$ and minimum neighboring image concentration difference $\Delta Dmin$ to the divider 44.

. The divider 44 calculates a normalized image characterizing quantity signal F given by the equation:

$$F = \Delta Dmin / \Delta Dmax \qquad (5)$$

from the maximum neighboring image concentration difference $\Delta Dmax$ and the minimum neighboring image concentration difference $\Delta Dmin$. The calculated image characterizing quantity signal F is fed to a comparator 45 in which it is compared with a judging threshold Th stored in advance in a register not shown. The comparator 45 produces the distinguishing signal 12 which is either '1' when the image characterizing quantity signal F is greater than the judging threshold Th indicating that the image signal is of letters, or '0' when the image characterizing quantity signal F is less than or equal to the judging threshold Th indicating that the image signal is of non letters, i.e., of pictures. That is, $F > Th \rightarrow$ letters $F \leq Th \rightarrow$ pictures Now, the binarization of each image signal identified by means of the distinguishing circuit 2 above as either one of letters or pictures will be explained.

In this image processing device, the image signals from the line buffer 1 are fed to a second max min detector 20, and this second max min detector 20 detects the maximum image concentration Dmax and the minimum image concentration Dmin within a window of 16 picture elements in the form of 4×4 matrix and feeds these maximum image concentration Dmax and minimum image concentration Dmin to a variable threshold calculator 33. The variable threshold calculator 33 calculates a binarization threshold given by the equation:

$$Bh = (Dmax + Dmin)/2 \qquad (3)$$

from the maximum image concentration Dmax and the minimum image concentration Dmin within the window detected by the second max min detector 20. This binarization threshold Bh is fed to a first threshold generator 5, and the first threshold generator 5 feeds a first threshold signal 15a in accordance with this binarization threshold Bh to a selector 8. Also, a second threshold generator 6 generates a binarization threshold for pictures and feeds a second threshold signal 15b in accordance with the dither threshold shown in FIG. 17 to the selector 8.

The selector 8 determines a selected threshold signal 16 from the first and second threshold signals 15a and 15b using the distinguishing signal 12 as a control signal according to the following rule:

| Case | Condition (Type of image) | Selected threshold signal 16 (Type of threshold signal) |
|---|---|---|
| 1 | The distinguishing signal 12 = 1 (Letters) | The 1st threshold signal 15a (Straightforward binarization threshold) |
| 2 | The distinguishing signal 12 = 0 (Pictures) | The 2nd threshold signal 15b (Threshold for pictures) | and feeds the selected threshold signal 16 to a comparator 9.

The comparator 9 compares the selected threshold signal 16 determined above with the image signal 17 for the picture element fed through the delay 10, and produces the output signal 18, so that it is possible to perform image processing in which the resolution of letters including poorly contrasted letters such as blurred letters as well as the tone of pictures can be preserved.

Now a detail configuration of the distinguishing circuit 2 will be explained.

Figure 22:
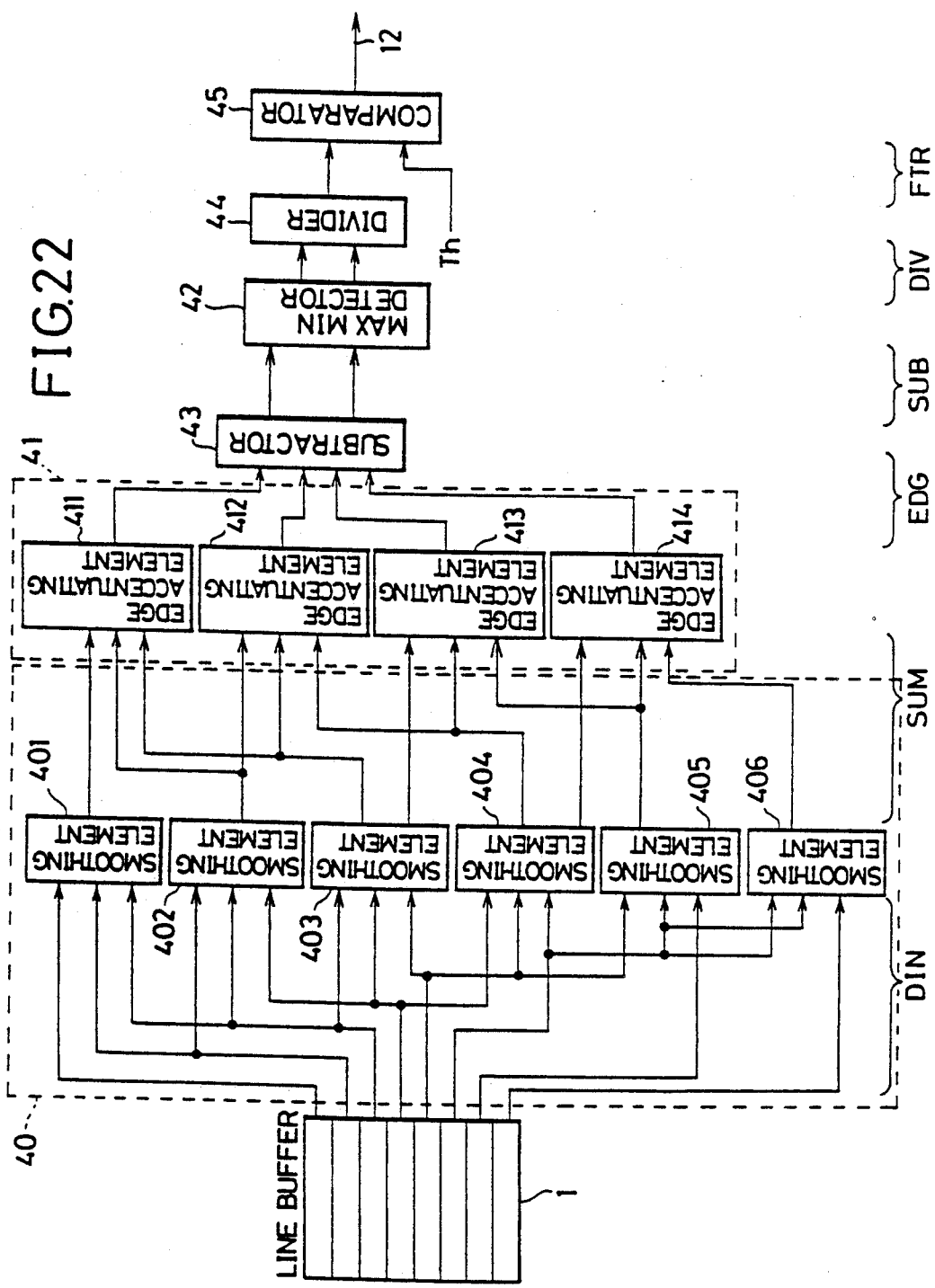
FIG. 22 is a detailed block diagram of a distinguishing circuit of the image processing device shown in FIG. 21.
Figure 23:
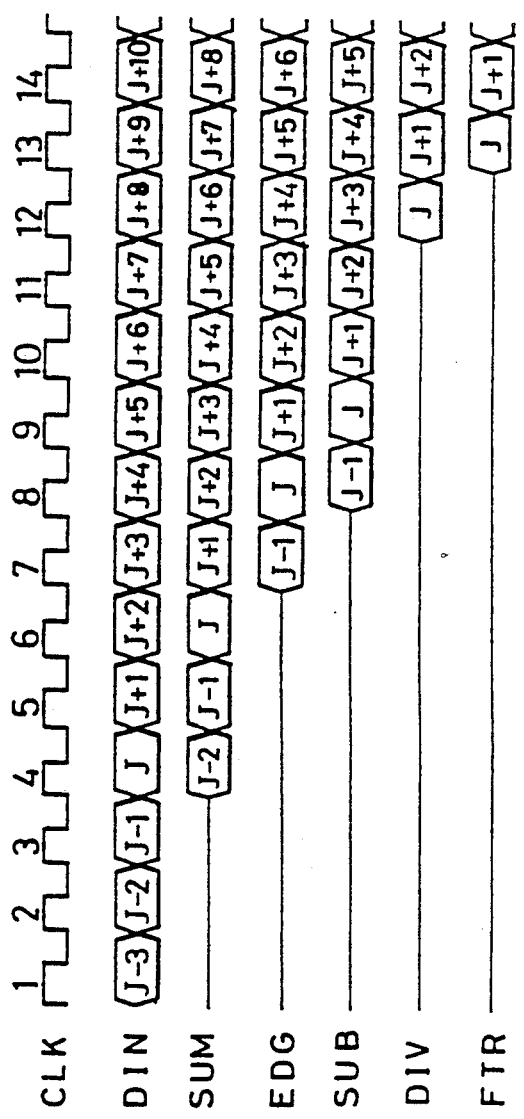
FIG. 23 is a timing chart for the distinguishing circuit shown in FIG. 22.

FIG. 22 shows a detail configuration of the distinguishing circuit 2, and FIG. 23 shows a timing chart for this distinguishing circuit 2. In FIG. 22, smoothing elements 401-406 constitute the smoothing circuit 40, and edge accentuating elements 411-414 constitute the edge accentuator 41. In FIG. 23, the line CLK shows a clock signal CLK, the line DIN shows the timing for feeding the image signals from the line buffer 1 to the smoothing elements 401-406. The smoothings by the smoothing elements 401-406 are carried out for 3×3 matrix block of 9 pictures elements with the picture element of interest at the center. (J−3) at the first clock signal is the timing at which the image signals of the 8 picture elements in the (J−3)th column from the (I−3)th row to the (I+4)th row shown in FIG. 14 are fed to the smoothing elements 401-406. The smoothing element 401 is fed with the image signals of 3 picture elements belonging to the (I−3)th row to the (I−1)th row, the smoothing element 402 is fed with the image signals of 3 picture elements belonging to the (I−2)th row to the Ith row, and similarly the other smoothing elements 403-406 are fed with the image signals of 3 picture elements each. Then, at the second and third clock signals, the image signals of 8 picture elements belonging to the (J−2)th and the (J−1)th columns, respectively, are fed, and the smoothings of the (J−2)th column from the (I−2)th row to the (I+3)th row are carried out. That is, at the third clock signal the smoothing element 401 carries out the smoothing of picture elements in the (I−2)th row of the (J−2)th column, the smoothing element 402 carries out the smoothing of picture elements in the (I−1)th row of the (J−2)th column, and similarly for the other smoothing elements 403-406. Likewise, at the fourth clock signal, the image signals of 8 picture elements belonging to the Jth column are fed, and the smoothings of the (J−1)th column from the (I−2)th row to the (I+3)th row are carried out, and so on.

The line SUM shows the timing from feeding the smoothed image signals from the smoothing elements 401-406 to the edge accentuating elements 411-414. The edge accentuations by the edge accentuating elements 411-414 are also carried out for 3×3 matrix block of 9 picture elements with the picture element of interest at the center. (J−2) at the fourth clock signal is the timing at which the smoothed image signals of the 6 picture elements in the (J−2)th column from the (I−2)th row to the (I+3)th row shown in FIG. 14 are fed to the edge accentuating elements 411-414. The edge accentuating element 411 is fed with the smoothed image signals of 3 picture elements belonging to the (I−2)th row to the Ith row of the (J−2)th column, the edge accentuating element 412 is fed with the smoothed image signals of 3 picture elements belonging to the (I−1)th row to the (I−1)th row of the (J−2)th column, and similarly the other edge accentuating elements 413 and 414 are fed with the smoothed image signals of 3 picture elements each. Then, at the fifth and sixth clock signals, the smoothed image signals of 6 picture elements belonging to the (J−1)th and Jth columns, respectively, are fed, and the edge accentuations of the (J−1)th column from the (I−1)th row to the (I+2)th row are carried out. That is, at the sixth clock signal the edge accentuating element 411 carries out the edge accentuation of picture elements in the (I−1)th row of the (J−1)th column, the edge accentuating element 412 carries out the edge accentuation of picture elements in the Ith row of the (J−1)th column, and similarly for the other edge accentuating elements 413 and 414. Likewise, at the seventh clock signal, the smoothed image signals of 6 picture elements belonging to the (J+1)th column are fed, and the edge accentuations of the Jth column from the (I−1)th row to the (I+2)th row are carried out, and so on.

The line EDG shows the timing for feeding the edge accentuated image signals from the edge accentuating elements 411-414 to the subtracter 43. (J−1) at the seventh clock signal is the timing at which the edge accentuated image signals of the 4 picture elements in the (J−1)th column from the (I−1)th row to the (I−2)th row shown in FIG. 14 are fed to the subtrator 43, and the subtractor 43 calculates the concentration differences between neighboring picture elements in the 4 picture elements belonging to the (J−1)th column. Then at the eighth clock signal the edge accentuated image signals of 4 picture elements belonging to the Jth column from the (I−1)th row to the (I+2)th row are fed, and the concentration differences between neighboring picture elements in the 4 picture elements belonging to the Jth column as well as the concentration differences between neighboring picture elements in the 8 picture elements belonging to the (J−1)th column fed at the seventh clock signal and the Jth column are calculated.

The line SUM shows the timing for feeding the calculated neighboring image concentration difference signals from the subtractor 43 to the first max min detector 42. (J−1) at the eighth clock signal is the timing at which the neighboring image concentration difference signals of the 4 picture elements in the (J−1)th column from the (I−1)th row to the (I+2)th row shown in FIG. 14 are fed to the first max min detector 42. Then at the ninth and tenth clock signals the neighboring image concentration difference signals from the Jth and (J−1)th columns, respectively, are fed, and at the seventh clock signal the maximum value ΔDmax and the minimum value ΔDmin of the neighboring image concentration difference signals within the window of 4×4 picture element matrix enclosed by the dotted line in FIG. 14 are detected.

The line DIV shows the timing for feeding the maximum value ΔDmax and the minimum value ΔDmin of the neighboring image concentration differences within the block detected by the first max min detector 42 to the divider 44. J at the twelfth clock signal is the timing at which the image characterizing quantity signal F is calculated for the picture element belonging to the Ith row of the Jth column. Also, the line FTR shows the timing for feeding the calculated image characterizing quantity signal F from the divider 44 to the comparator 45. J at the thirteenth clock signal is the timing at which the image characterizing quantity signal f is compared with the judging threshold Th and the distinguishing signal 12 indicating whether the picture element belonging to the Ith row of the Jth column is of letters or of pictures is produced.

As explained, according to this embodiment, the two level image and non two level images in the image information are distinguished from each other by means of the comparison of the normalized value with a predetermined reference value, the normalized value being obtained by normalizing one of the maximum value and the minimum value of the difference between neighboring picture elements of the image information related to the image concentration with respect to the other, so that it is possible to perform image processing preserving the resolution even of poorly contrasted letters such as blurred letters written in pencil which caused the poor resolution in the prior art as they are identified as pictures, and thereby to improve the quality of images as well as the efficiency of the image processing.

Figure 24:
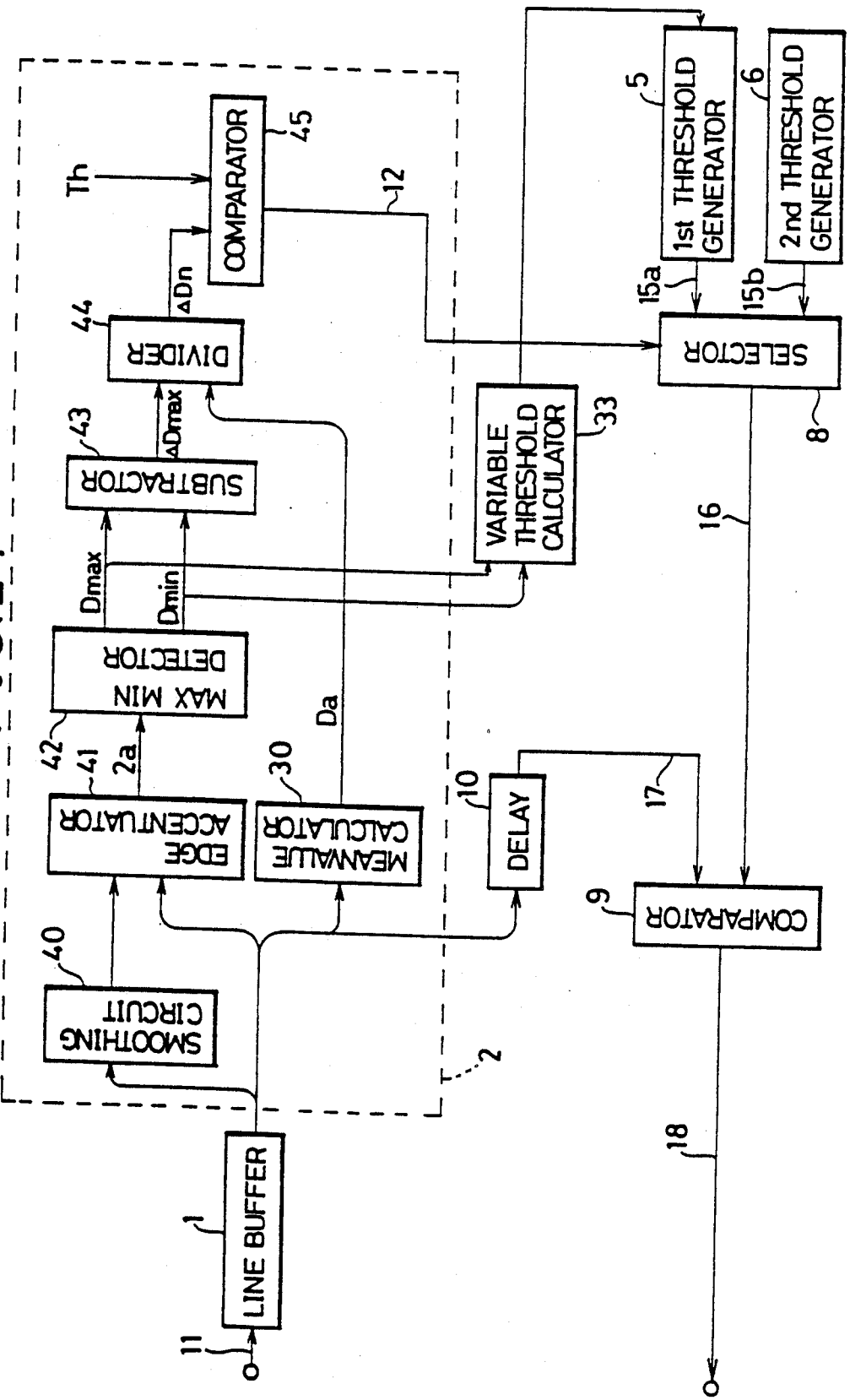
FIG. 24 is a block diagram of a fourth embodiment of an image processing device according to the present invention.

Referring now to FIG. 24, there is shown the fourth embodiment of an image processing device according to the present invention. In FIG. 24, a distinguishing circuit 2 distinguishes between two level images i.e. letters and non two level images i.e. pictures in the image information by means of the comparison of a normalized value obtained as the difference between the maximum and the minimum values related to the image concentration normalized by the mean value related to the image concentration with a predetermined reference value.

In this image processing device, image signals from a line buffer 1 are fed to a smoothing circuit 40. The smoothing circuit 40 feeds the smoothed image signals with noise components removed to an edge accentuator 41 including Laplacian filters. The edge accentuator 41 feeds the edge accentuated image signal 47 to the max min detector 42. The max min detector 42 detects the maximum image concentration Dmax and the minimum image concentration Dmin within the window in accordance with the edge accentuated image signals 47. The detected maximum image concentration Dmax and minimum image concentration Dmin are fed to the subtractor 43 and the subtractor 43 calculates the maximum concentration difference ΔDmax within the window.

The max min detector 42 detects the maximum image concentration Dmax and the minimum image concentration Dmin within the window of 16 picture elements in the form of 4×4 matrix in the image signals. The detected maximum image concentration Dmax and minimum image concentration Dmin are fed to the subtracter 43 in which the maximum concentration difference ΔDmax given by the equation:

$$\Delta Dmax = Dmax - Dmin \quad (1)$$

is calculated.

The calculated maximum concentration difference ΔDmax is fed to the divider 44 in which it is divided by the mean image concentration Da within the window from the mean value calculator 30 to yield the normalized maximum concentration difference ΔDn given by the equation:

$$\Delta Dn = \Delta Dmax / Da \quad (2)$$

The calculated normalized maximum concentration difference ΔDn is fed to the comparator 45 in which it is compared with the judging threshold Th stored in advance at a register not shown. The comparator 45 produces the distinguishing signal 12 which is either '1' when the normalized maximum concentration difference ΔDn is greater than the judging threshold Th indicating that the image signal is of letters, or '0' when the normalized maximum concentration difference ΔDn is less than or equal to the judging threshold Th indicating that the image signal is of pictures. That is, $$\Delta Dn > Th \rightarrow \text{Letters}$$

$$\Delta Dn \leq Th \rightarrow \text{Pictures}$$

Thus, the distinguishing circuit 2 determines that the image signal is of letters when the normalized maximum concentration difference ΔDn is greater than the judging threshold Th, and that the image signal is of pictures otherwise.

Now, the binarization of each image signal identified by means of the distinguishing circuit 2 above as either one of letters or pictures will be explained.

In FIG. 24, there is provided a variable threshold calculator 33 to which the maximum image concentration Dmax and the minimum image concentration Dmin are fed from the max min detector 42, and the output signal of this variable threshold calculator is fed to the first threshold generator 5. The variable threshold calculator 33 calculates a binarization threshold Bh to be used in the straightforward binarization to be performed for the image signal identified as letters. Namely, the variable threshold calculator 33 calculates from the maximum image concentration Dmax and the minimum image concentration Dmin within the window detected at the max min detector 42 the binarization threshold Bh given by the equation:

$$Bh = (Dmax + Dmin) / 2 \quad (3)$$

This binarization threshold Bh is fed to the first threshold generator 5, and the first threshold generator 5 feeds the first threshold signal 15a in accordance with the binarization threshold Bh to the selector 8.

Also, the second threshold generator 6 generates a binarization threshold for pictures and feeds a dither threshold shown in FIG. 20 to the selector 8 as the second threshold signal 15b.

The selector 8 determines the selected threshold signal 16 from the first and second threshold signals 15a and 15b using the distinguishing signal 12 as a control signal according to the following rule:

| Case | Condition (Type of image) | Selected threshold signal 16 (Type of threshold signal) |
| --- | --- | --- |
| 1 | The distinguishing (Letters) | The 1st threshold signal 15a (Straightforward binarization threshold) |
| 2 | The distinguishing signal 12 = 0 (Pictures) | The 2nd threshold signal 15b (Threshold for pictures) | and feeds the selected threshold signal 16 to a comparator 9.

The comparator 9 compares the selected threshold signal 16 determined above with the image signal 17 for the picture element fed through the delay 10, and produces the output signal 18, so that it is possible to perform image processing in which the resolution of letters including poorly contrasted letters such as blurred letters as well as the tone of pictures can be preserved.

Now a detail configuration of the distinguishing circuit 2 will be explained.

Figure 25:
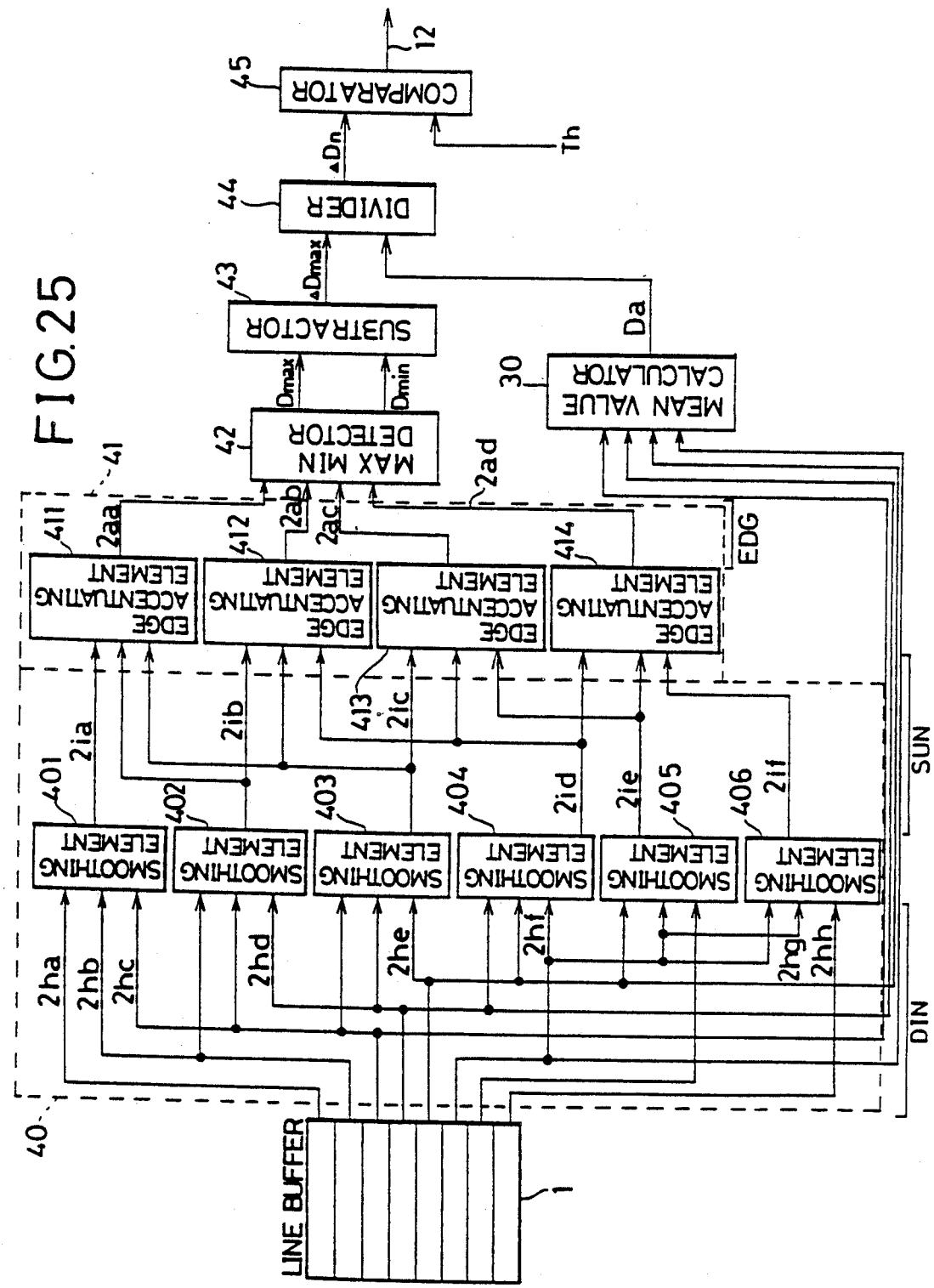
FIG. 25 is a detailed block diagram of a distinguishing circuit of the image processing device shown in FIG. 24.
Figure 26:
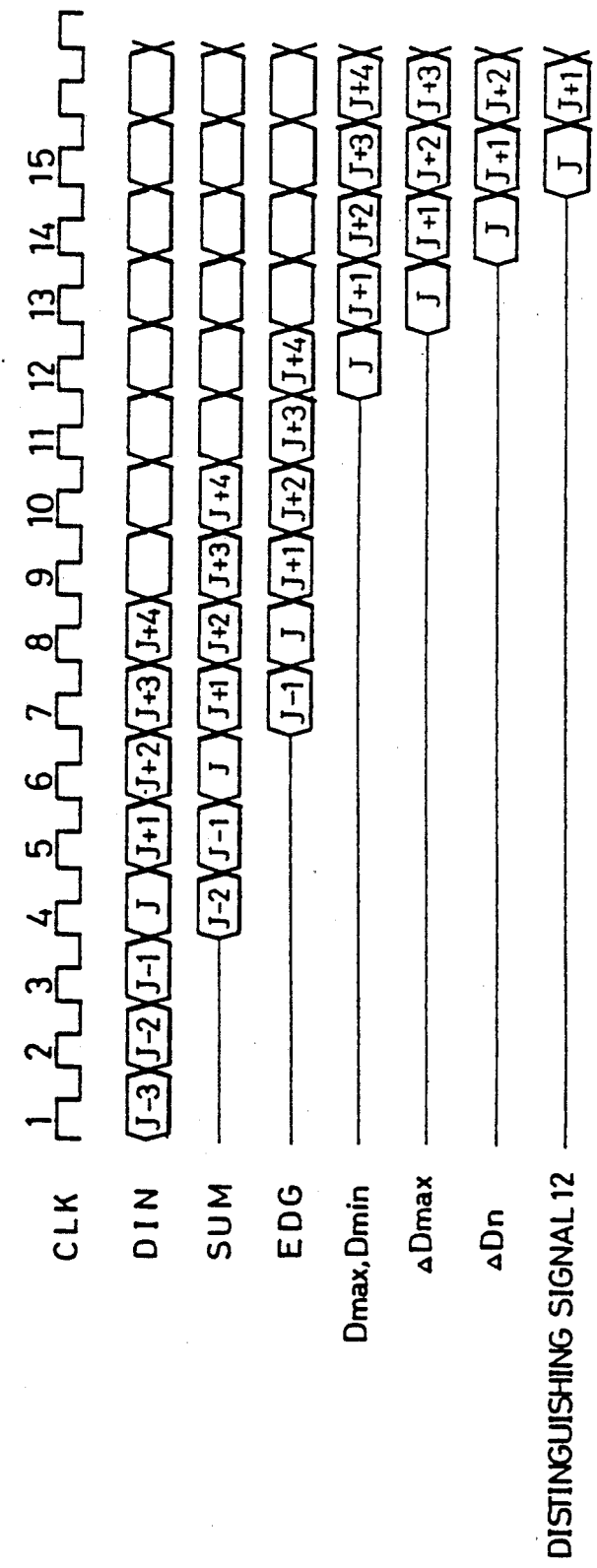
FIG. 26 is a timing chart for the distinguishing circuit shown in FIG. 25.
Figure 27:
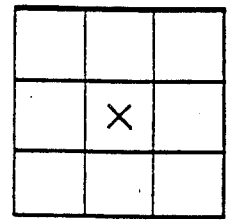
FIG. 27 is an illustration of a region of picture elements to be used in smoothing in the image processing device shown in FIG. 24.

FIG. 25 shows a detail configuration of the distinguishing circuit 2, and FIG. 26 shows a timing chart for this distinguishing circuit 2. In FIG. 25, smoothing elements 401-406 constitute the smoothing circuit 40, and edge accentuating elements 411-414 constitute the edge accentuator 41. In FIG. 26, the line CLK shows a clock signal CLK. The 8 bit image signals 2ha-2hh, each for one picture element, stored in the line buffer 1 comprised of 8 line buffers are fed to the smoothing elements 401-406, 3 picture elements at a time synchronized by the clock signal CLK. The smoothing elements 401-406 utilizes 3×3 median filters and, for 9 picture elements of 3×3 matrix form shown in FIG. 27 arranged in order of their image concentrations, produce the fifth image concentration of the picture element at the center marked by a cross in FIG. 27. The smoothed image signals 2ia-2if are fed to the edge accentuating elements 411-414. The edge accentuating elements 411-414 utilizes Laplacian filters and calculates the value given by the equation:

$$G(I,J) = F(I,J) - \nabla^2 F(I,J) \quad (6)$$

where $G(I,J)$ is the edge accentuated image signal, $F(I,J)$ is the input image signal of the Ith row of the Jth column, and $\nabla^2 F(I,J)$ is the Laplacian which is a second derivative of the input image signal $F(I,J)$ defined by the expression:

$$\nabla^2 F(I,J) = F(I+1, J) + F(I-1, J) + F(I,J+1) + F(I,J-1) - 4 \times F(I,J) \quad (7)$$

The edge accentuated image signals 2aa-2ad from the edge accentuating elements 411-414 are fed to the max min detector 42.

Also, in FIG. 26, the line DIN shows the timing for feeding the image signal from the line buffer 1 to the smoothing elements 401-406, so that (J−3) at the first clock signal is the timing at which the image signals of the 8 picture elements belonging to the (J−3)th column from the (I−3)th row to the (I+4)th row shown in FIG. 14 are fed to the smoothing elements 401-406. Similarly, (J−2) at the second clock signal and (J−1) at the third clock signal are the timings at which the image signals of the 8 picture elements belonging to the (J−2)th column and the (J−1)th column, respectively, from the (I−3)th row to the (I+4)th row are fed to the smoothing elements 401-406.

Also, in FIG. 26, the line SUM shows the timing for feeding the smoothed image signals from the smoothing elements 401-406 to the edge accentuating elements 411-414. (J−2) at the fourth clock signal is the timing at which the smoothed image signals of the 6 picture elements belonging to the (J−2)th column from the (I−2)th row to the (I+3)th row shown in FIG. 14 are fed to the edge accentuating elements 411-414. Similarly, (J−1) at the fifth clock signal and J at the sixth clock signal are the timings at which the smoothed image signals of the 6 picture elements belonging to the (J−1)th column and Jth column respectively, from the (I−3)th row to the (I+4)th row are fed to the edge accentuating elements 411-414. The line EDG shows the timing for feeding the edge accentuated image signals from the edge accentuating elements 411-414 to the max min detector 42. (J+1) at the seventh clock signal is the timing at which the edge accentuated image signals of the 4 picture elements belonging to the (J−1)th column from the (I−1)th row to the (I+2)th row shown in FIG. 14 are fed to the max min detector 42. Similarly, J at the eight clock signal, (J+1) at the ninth clock signal, and (J+2) at the tenth clock signal are the timings at which the edge accentuated image signals of the 4 picture elements belonging to the Jth column, the (J+1)th column, and the (J+2)th column, respectively, from the (I−1)th row to the (I+2)th row are fed to the max min detector 42.

The max min detector 42 detects the maximum and the minimum values of image concentrations of the 4 picture elements of each of the (J−1)th, the Jth, the (J+1)th, and the (J+2)th columns from the (I−1)th row to the (I+2)th row at the eleventh clock signal. Then at the twelfth clock signal the maximum image concentration Dmax and the minimum image concentration Dmin within the window of 4×4 matrix enclosed by the dotted line in FIG. 14 are detected from the maximum values and the minimum values of image concentrations for each columns and fed to the subtractor 43. The subtractor 43 calculates the maximum concentration difference ΔDmax from the maximum image concentration Dmax and the minimum image concentration Dmin and feeds this to the divider 44 at the thirteenth clock signal. The divider 44 divides the maximum concentration difference ΔDmax by the mean image concentration Da within the window obtained by the mean value calculator 30 to produce the normalized maximum concentration difference ΔDn and feeds this to the comparator 45 at the fourteenth clock signal. The comparator 45 compares the normalized maximum concentration difference ΔDn with the judging threshold Th to produce the distinguishing signal 12.

Figure 28:
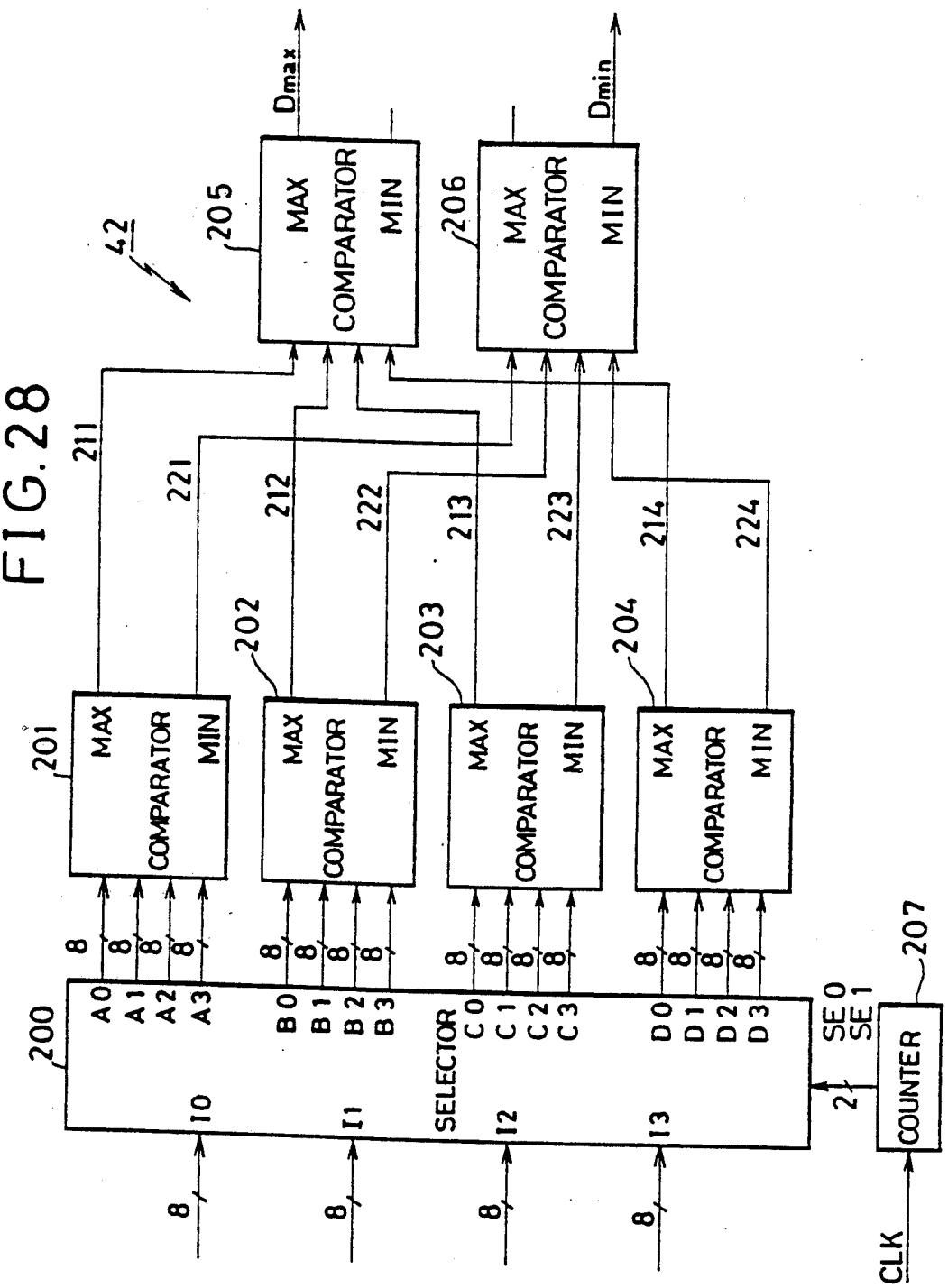
FIG. 28 is a detailed block diagram of a max min detector of the image processing device shown in FIG. 24.
Figure 29:
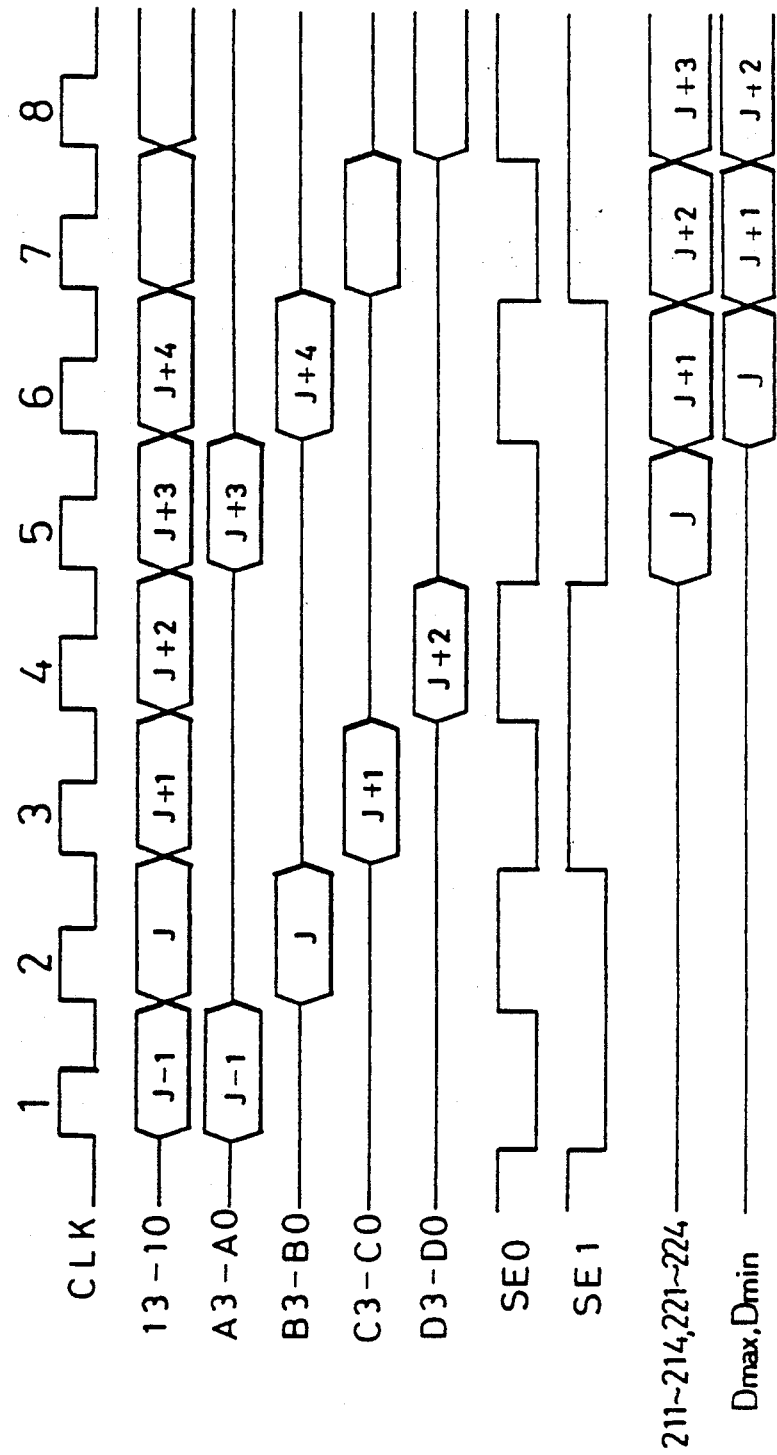
FIG. 29 is a timing chart for the max min detector shown in FIG. 28.

FIG. 28 shows a detailed configuration of the max min detector 42 and FIG. 29 shows a timing chart for this max min detector 42. In this max min detector 42, the edge accentuated signals 2aa-2ad from the edge accentuator 41 are fed through the selector 200 to the comparator 201-204, 4 picture elements at a time synchronized by the clock signal CLK. For instance, for the 16 picture elements enclosed by the dotted line in FIG. 14, the 4 picture elements of each of the (J−1)th, the Jth, the (J+1)th, and the (J+2)th columns are fed to the comparator 201-204, respectively. The counter 207 is a 2 bit counter which counts the clock signal CLK, and produces the output signals SE0 and SE1 of the form shown in FIG. 29. The selector 200 distributes the image signals at its input ports I0-I3 to one of its output ports A0-A3, B0-B3, C0-C3, and D0-D3 in accordance with the output signals SE0 and SE1 of the counter 207. In FIG. 29 the line I0-I3 shows the input signals at the input ports I0-I3 of the selector 200, and the lines A0-A3, B0-B3, C0-C3, and D0-D3 show the output signals at the output ports A0-A3, B0-B3, C0-C3, and D0-D3, respectively, of the selector 200.

The comparators 201-204 detect the maximum concentrations 211-214 and the minimum concentrations 221-224 of 4 picture elements in each column. The maximum concentrations 211-214 are fed to the comparator 205 while the minimum concentrations 221-224 are fed to the comparator 206. The comparator 205 detects the maximum image concentration Dmax within the window from the maximum concentrations 211-214 of 4 picture elements in each column, while the comparator 206 detects the minimum image concentration Dmin within the window from the minimum concentrations 221-224 of 4 picture elements in each column.

For the (I, J)th picture element in the window shown in FIG. 14, the image signals of the 4 picture elements belonging to the (J−1)th column from the (I−1)th row to the (I+2)th row in the window shown in FIG. 14 are fed through the output parts A0-A3 of the selector 200 to the comparator 201 at the first clock signal, and the comparator 201 detects the maximum concentration 211 and the minimum concentration 221 of these 4 picture elements belonging to the (J−1)th column. Similarly, the image signals of the 4 picture elements belonging to the Jth column in the window are fed through the output parts B0-B3 of the selector 200 to the comparator 202 at the second clock signal, the image signals of the 4 picture elements belonging to the (J+1)th column in the window are fed through the output parts C0-C3 of the selector 200 to the comparator 203 at the third clock signal, the image signals of the 4 picture elements belonging to the (J+2)th column in the window are fed through the output ports D0-D3 of the selector 200 to the comparator 204, and the comparators 202-204 detect the maximum concentrations 212-214 and the minimum concentrations 222-224 of the 4 picture elements in the Jth, the (J+1)th, and the (J+2)th columns, respectively, at the fourth clock signal. At the fifth clock signal, the maximum concentrations 211-214 of the 4 picture elements in each column are fed to the comparator 205, and the minimum concentrations 221-224 of the 4 picture elements in each column are fed to the comparator 206. The comparator 205 detects the maximum image concentration Dmax within the window from the maximum concentrations 211-214 of the 4 picture elements in each column, and the comparator 206 detects the minimum image concentration Dmin within the window from the minimum concentrations 221-224 of the 4 picture elements in each columns. At the sixth clock signal, the maximum image concentration Dmax and the minimum image concentrations Dmin within the window detected by the comparators 205 and 206 are fed to the subtractor 43.

Figure 30:
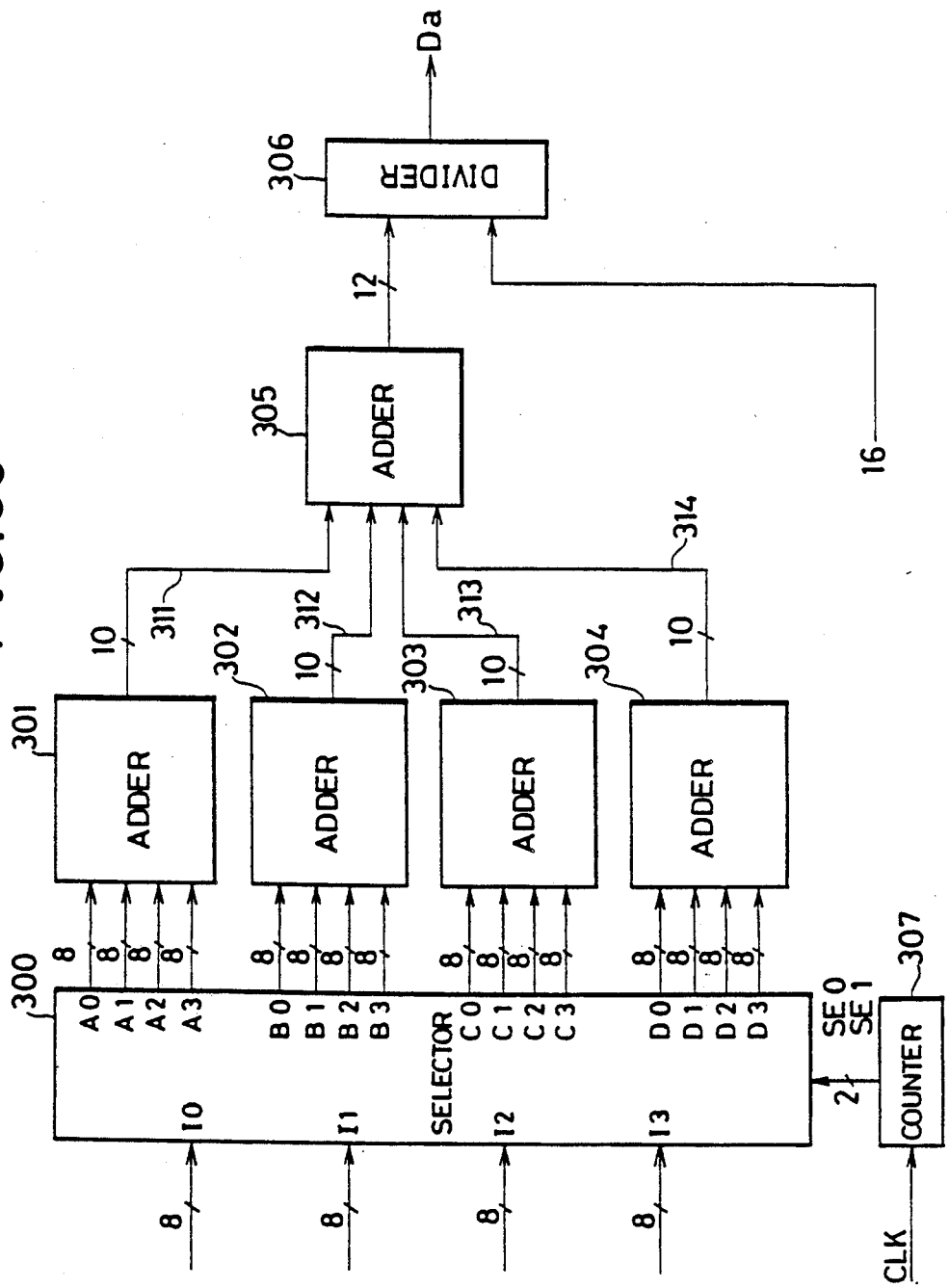
FIG. 30 is a detailed block diagram of a mean value calculator of the image processing device shown in FIG. 24.
Figure 31:
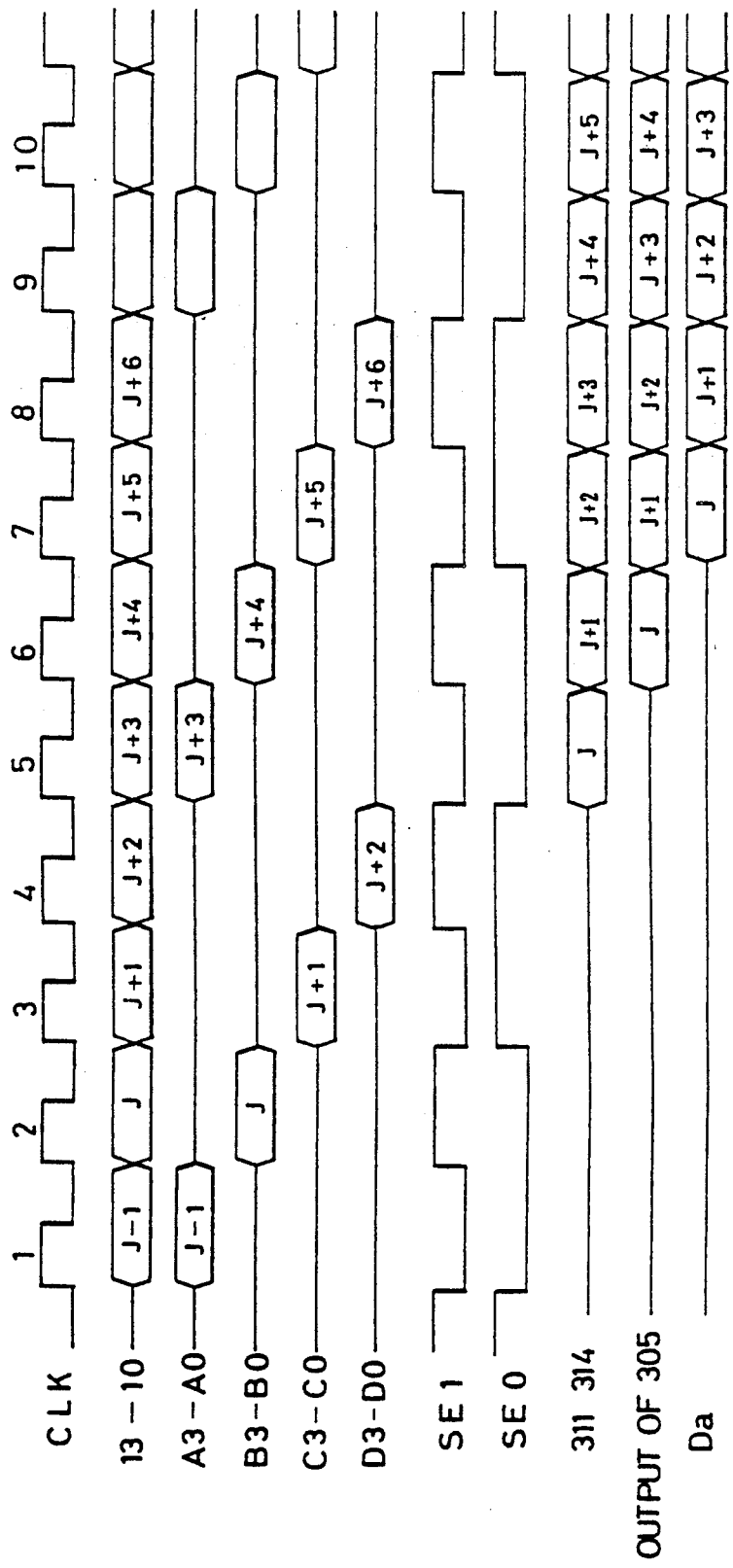
FIG. 31 is a timing chart for the mean value calculator shown in FIG. 30.

FIG. 30 shows a detail configuration of the mean value calculator 30, and FIG. 31 shows a timing chart for this mean value calculator 30. In FIG. 30, a selector 300 and a counter 307 are ones identical in their configurations and functions to the selector 200 and the counter 207 of 28. Each of the adders 301-304 calculates the sum 311-314 of 4 input signals fed to each of them by the selector 300, and these sums are summed again by the adder 305. The input signals of the adders 301-304 are of 8 bit while the output signals of these adders are of 10 bit, and the input signal of the adder 305 is of 10 bit while the output signal of this adder is of 12 bit.

In FIG. 31, the line CLK shows the clock signal, the line I shows the input signal at the input part I of the selector 300, the lines A, B, C, and D show the output signals at the output parts A, B, C, and D, respectively, of the selector 300, and the lines SE0 and SE1 show the output signals SE0 and SE1 of the counter 307. As for the max min detector 42, for the (I, J)th picture elements in the window of 4×4 matrix enclosed by the dotted lines in FIG. 14, the image signals of the 4 picture elements in the (J−1)th row to the (I+2)th row shown in FIG. 14 are fed to the adder 301 at the first clock signal. Similarly, the image signals of the 4 picture elements in the Jth column are fed to the added 302 at the second clock signal, the image signals of the 4 picture elements in the (J+1)th column are fed to the adder 303 at the third clock signal, the image signals of the 4 picture elements in the (J+2)th column are fed to the adder 304 at the fourth clock signal, and the adders 302-304 calculate the total concentration signals 311-314 of the 4 picture elements of each column. At the fifth clock signal, the total concentration signals 311-314 of the 4 picture elements of each column from the adders 301-304 are fed to the adder 305, and the adder 305 calculates the sum of these total concentration signals 311-314. Thus the adder 305 calculated the sum of all 16 picture elements within the window shown in FIG. 14. At the sixth clock signal, this sum of 16 picture elements are fed to the divider 306, and the divider 306 divides this sum of 16 picture elements by the total number of the picture elements, 16, to yield the mean image concentration Da within the window. At the seventh clock signal, this mean image concentration Da is fed to the divider 44.

As explained, according to this embodiment, two level image and non two level image in the image information are distinguished from each other by means of the comparison of the normalized value obtained as the difference of the maximum and the minimum values of the information related to the image concentrations normalized by the mean value of the information related to the image concentration with a predetermined reference value, so that it is possible to perform image processing preserving the resolution even of poorly contrasted letters such as blurred letters written in pencil which causes the poor resolution in the prior art as they are identified as pictures, and thereby to improve the quality of images as well as the efficiency of the image processing.

Figure 32:
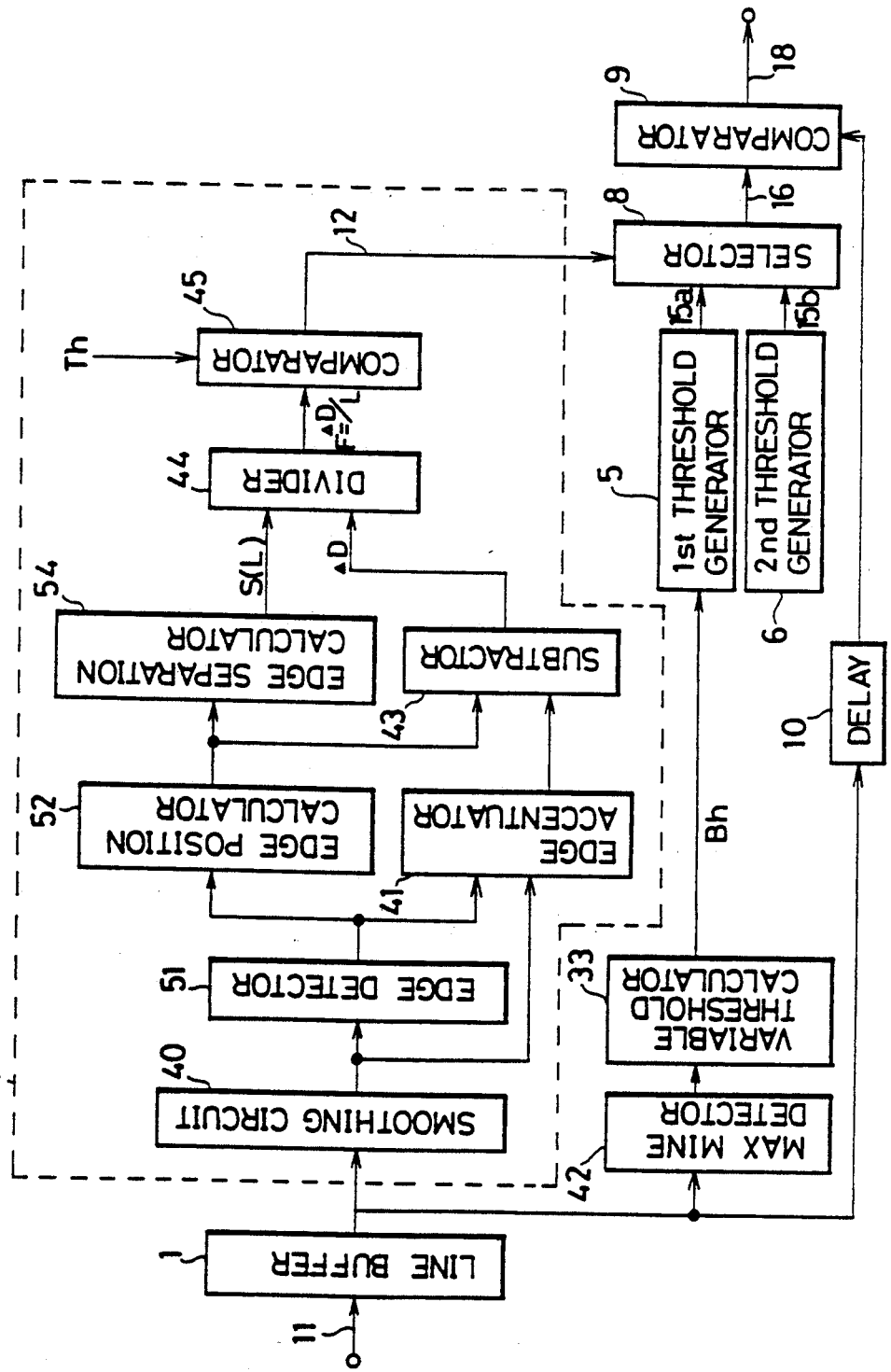
FIG. 32 is a block diagram of a fifth embodiment of an image processing device according to the present invention.

Referring now to FIG. 32, there is shown the fifth embodiment of an image processing device according to the present invention.

In FIG. 32, a distinguishing circuit 2 distinguishes between two level images i.e. letters and non two level images i.e. pictures in the image information by means of the comparison of a gradient value obtained as the difference between the maximum and the minimum values related to the charge of the image concentration divided by the distance between the locations of the maximum value and the minimum value with a predetermined reference value.

Figure 33:
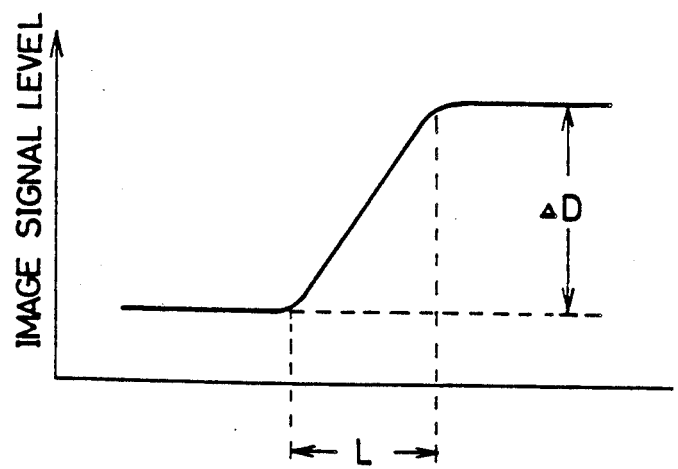
FIG. 33A and 33B are graphs for explaining an edge position detecting image with respect to an original image.
Figure 33:
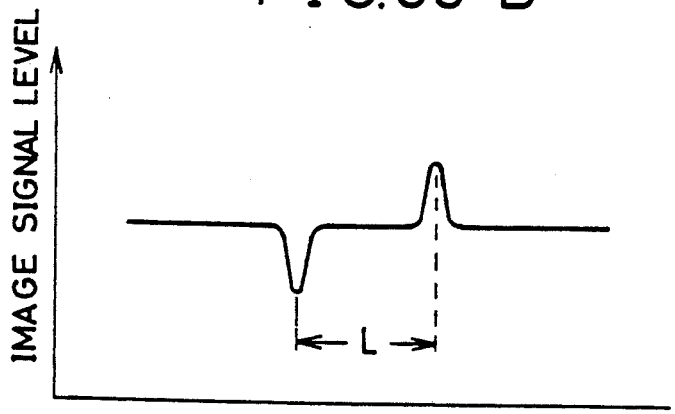

In this image processing device, image signals from a line buffer 1 are fed to a smoothing circuit 40. The smoothing circuit 40 removes the noise components from the image signals and feeds the smoothed image signals of the form shown in FIG. 33A to an edge accentuator 41 and an edge detector 51. The edge detector 51 using the Laplacian filters detects the edges of the smoothed image signals from the smoothing circuit 40 and feeds the edge image signals of the form shown in FIG. 33B to the edge accentuator 41 and an edge position detector 52. The edge position detector 51 determines the edge positions from the edge image signals and feeds the edge position signals to a subtractor 43 and an edge separation calculator 54. The edge separation calculator 54 produces the edge separation signal S(L) in accordance with the edge position signals from the edge position detector 52. This edge separation signal S(L) corresponds to the edge separation L show in FIG. 33B and is fed to a divider 44. On the other hand, the edge accentuator 41 produces the edge accentuated image signals in accordance with the smoothed image signals from the smoothing circuit 40 and the edge image signals from the edge detector 1, and feeds this edge accentuated image signals to the subtractor 43. The subtractor 43 calculates the concentration difference $\Delta D$ of the image information at the locations of or edges from the edge accentuated image signals produced by the edge accentuator 41 in accordance with the edge position signals produced by the edge position detector 52, and feeds this concentration difference $\Delta D$ to the divider 44.

The divider 44 calculates a normalized image characterizing quantity signal F', that is, the gradient value, given by the equation $$F' = \Delta D/L \qquad (8)$$

from the concentration difference $\Delta D$ calculated by the subtractor 43 and the edge separation signal S(L) produced by the edge separation calculator 54.

The image characterizing quantity signal F' is fed from the divider 44 to the comparator 45 in which it is compared with the judging threshold Th stored in advance at a registor not shown. The comparator 45 produces the distinguishing signal 12 which is either '1' when the image characterizing quantity signal F' is greater than the judging threshold Th indicating that the image signal is of letters, or '0' when the image characterizing quantity signal f' is less than or equal to the judging threshold Th indicating that the image signal is of pictures. That is, F' > Th → Letters F' ≤ Th → Pictures Now, the binarization of each image signal identified by means of the distinguishing circuit 2 above as either one of letters or pictures will be explained.

In FIG. 32, the image signals from the line buffer 1 are also fed to the max min detector 42. The max min detector 42 detects the maximum image concentration Dmax and the minimum image concentration Dmin from the image concentrations of 16 picture elements in the window of the 4×4 matrix form, and feeds these maximum image concentration Dmax and minimum image concentration Dmin to the variable threshold calculator 33. The variable threshold calculator 33 calculates the binarization threshold Bh given by the equation:

$$Bh = (Dmax + Dmin)/2 \qquad (3)$$

from the maximum image concentration Dmax and the minimum image concentration Dmin within the window detected by the max min detector 42. This binarization threshold Bh is fed to the first threshold generator 5. The first threshold generator 5 generates the first threshold signal 15a in accordance with the binarization threshold Bh to the selector 8. Also, the second threshold generator 6 generates the binarization threshold for pictures and feeds the second threshold signal 15b in accordance with the dither threshold shown in FIG. 20 to the selector 8.

The selector 8 determines the selected threshold signal 16 from the first and second threshold signals 15a and 15b using the distinguishing signal 12 as a control signal according to the following rule:

| Case | Condition (Type of image) | Selected threshold signal 16 (Type of binarization signal) |
|---|---|---|
| 1 | The distinguishing signal 12 = 1 (Letters) | The 1st threshold signal 15a (Straight forward binarization threshold) |
| 2 | The distinguishing signal 12 = 0 (Pictures) | The 2nd threshold signal 15b (Threshold for pictures) | and feeds the selected threshold signal 16 to a comparator 9.

The comparator 9 compares the selected threshold signal 16 determined above with the image signal 17 for the picture elements fed through the delay 10, and produces the output signal 18, so that it is possible to perform image processing in which the resolution of letters including poorly, contrasted letters such as blurred letters as well as the tone of pictures can be preserved.

Figure 34:
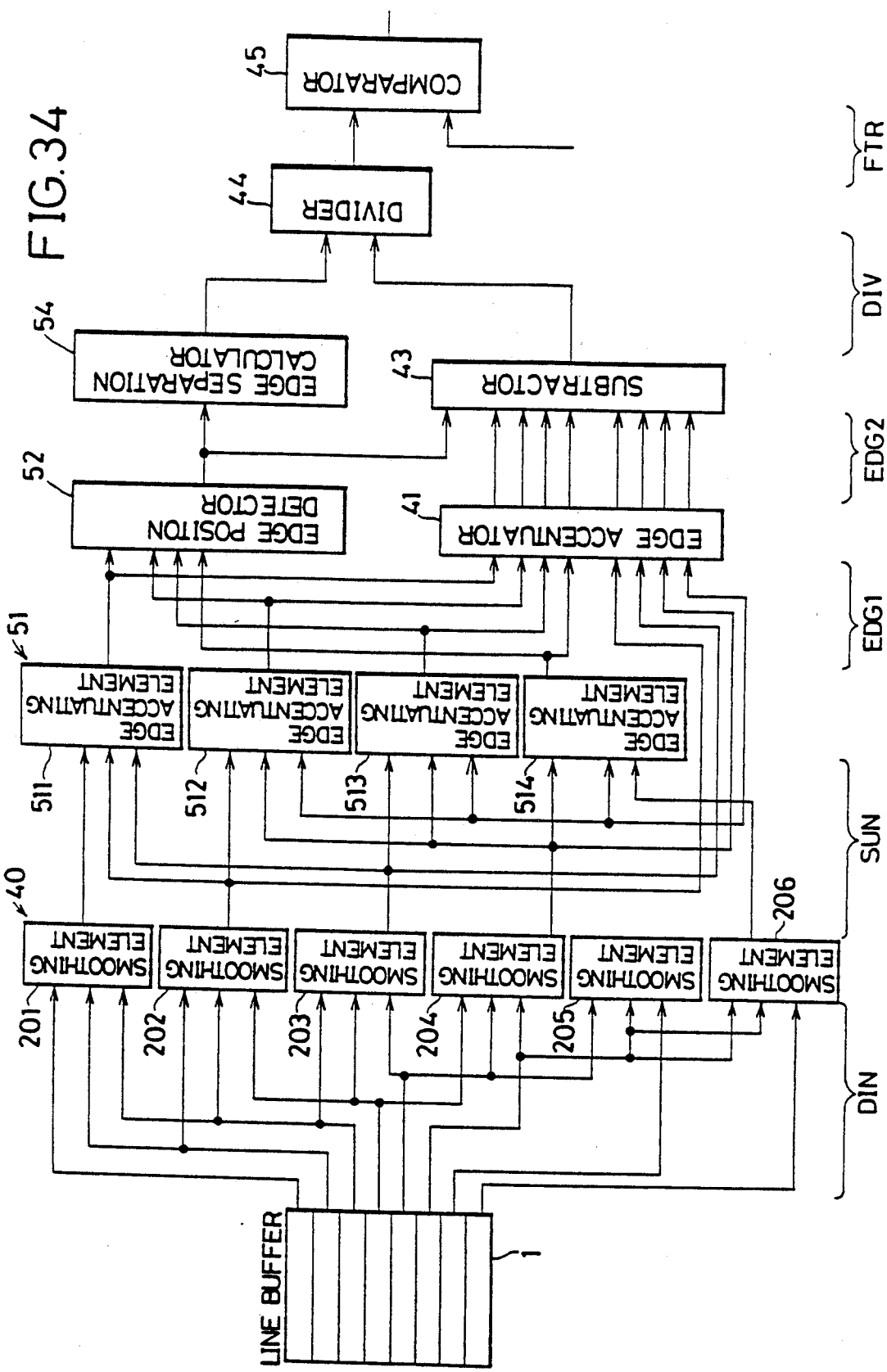
FIG. 34 is a detailed block diagram of a distinguishing circuit of the image processing device shown in FIG. 32.
Figure 35:
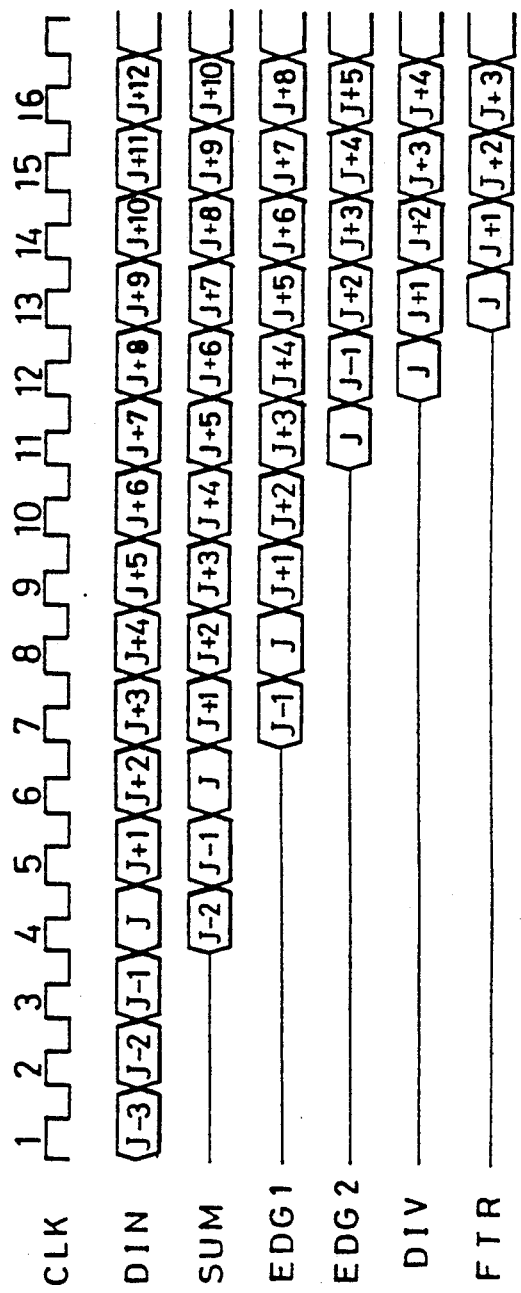
FIG. 35 is a timing chart for the distinguishing circuit shown in FIG. 34.

FIG. 34 shows a detail configuration of the distinguishing circuit 2, and FIG. 35 shows a timing chart for this distinguishing circuit 2. In FIG. 34, the smoothing elements 201-206 constitute the smoothing circuit 40, and the edge detecting elements 511-514 constitute the edge detector 51. In FIG. 35, the line CLK shows the clock signal CLK, and the line DIN shows the timing for feeding the image signals from the lines buffer 1 to the smoothing elements 201-206. The smoothing are carried out with respect to the 9 picture elements within a block of 3×3 matrix form with the picture element of interest at the center. (J−3) at the first clock signal is the timing at which the image signals of 8 picture elements in the (J−3)th column from the (I−3)th row to the (I+4)th row. The image signals of 3 picture elements for the (I−3)th row to the (I−1)th row shown in FIG. 14 are fed to the smoothing element 201, the image signals of 3 picture elements from the (I−2)th row to the Ith row are fed to the smoothing element 202, and similarly the image signals of 3 picture elements are fed to each of the other smoothing elements. Then at the second and third clock signals, the image signals of 8 picture elements in the (J−2)th and (J−1)th columns, respectively, are fed, and the smoothing of the (J−2)th column from the (I−2)th row to the (I+3)th row is carried out. That is, at the third clock signal, the smoothing of the picture elements in the (I−2)th row of the (J−2)th column carried out by the smoothing element 201, the smoothing of the picture elements in the (I−1)th row of the (J−2)th column is carried out by the smoothing element 202, and similarly for the other smoothing elements 203-206. Likewise, at the fourth clock signal, the Jth column is fed and the smoothing of the (I−2)th row to the (I+3)th row of the (J−1)th column is carried out.

The line SUM shows the timing for feeding the smoothed image signals from the smoothing elements 201-206 to the edge detecting elements 511-514. The edge detections are carried out with respect to the 9 picture elements within a block of 3×3 matrix form with the picture element of interest at the center. (J−2) at the fourth clock signal is the timing at which the smoothed image signals of 6 picture elements in the (J−2)th column from the (I−2)th row to the (I+3)th row are fed to the edge detecting elements 511-514. The smoothed image signals of 3 picture elements in the (J−2)th column from the (I−2)th row to the Ith row are fed to the edge detecting element 511, the smoothed image signals of 3 picture elements in the (J−2)th column from the (I−1)th row to the (I+1)th row are fed to the edge detecting element 512, and similarly the smoothed image signals of 3 picture elements are fed to each of the other edge detecting elements. Then at the fifth and sixth clock signals, the smoothed image signals of 6 picture elements in the (J−1)th and Jth column, respectively, are fed, and the edge detection of the (J−1)th column from the (I−1)th row to the (I+2)th row is carried out. That is, the edge detection of the picture elements in the (I−1)th row of the (J−1)th column is carried out by the edge detecting element 511, the edge detection of the picture elements in the (I−1)th row of the (J−1)th column is carried out by the edge detecting elements 512, and similarly for the other edge detecting elements 513 and 514. Likewise, at the seventh clock signal, the (J+1)th column is fed and the edge detection of the (I−1)th row to the (I+2)th row of the Jth column is carried out.

The line EDG1 shows the timing for feeding the edge image signals from the edge detector 51 to the edge accentuator 41 and the edge position detector 52. (J−1) at the seventh clock signal is the timing at which the edge image signals of 4 picture elements in the (J−1)th column from the (I−1)th row to the (I+2)th row are fed to the edge accentuator 41 and the edge position dectector 52. The edge position detector 52 determines the positions of the edges for 4 picture elements of the (J−1)th column from the edge image signals fed by the edge detector 51 at the seventh clock signal. Then at eighth clock signal, the edge image signals of 4 picture elements in the Jth column from the (I−1)th row to the (I+2)th row are fed, and the edge positions for the 4 picture elements in the Jth row are determined. The similar processes are repeated at the subsequent clock signals. On the other hand, the edge accentuator 41 carries out the edge accentuation of the 4 picture elements in the (J−1)th column from the (I−1)th row to the (I+2)th row by subtracting the edge image signals from the image signals. Then at the eighth clock signals, the edge image signals of the 4 picture elements in the Jth column from the (J−1)th row to the (I+2)th row are fed, and the edge accentuation of the 4 picture elements in the Jth column is carried out. The similar processes are repeated at the subsequent clock signals.

The line EDG2 shows the timing for feeding the edge position signals from the edge position detector 52 and the edge accentuated image signals for the edge accentuator 41 to the edge separation calculator 54 and the subtracter 43. J at the eleventh clock signal is the timing at which the edge position signals and the edge accentuated image signals within the window of 4×4 matrix form from the (J−1)th column to the (J+2)th column and from the (I−1)th row to the (I+2)th row enclosed by the dotted line is FIG. 14 are fed to the subtracter 43 and the edge separation calculator 54. At the twelfth clock signal, the edge position signals and the edge accentuated image signals within the window of the Jth column to the (J+3)th column, the (I−1)th row to the (I+2)th row are fed to the subtracter 43 and the edge separation calculator 54. The similar processes repeat at the subsequent clock signals.

The line DIV shows the timing for feeding the edge separation L for the edge separation calculator 54 and the concentration difference ΔD from the subtracter 43 to the divider 44. J at the twelfth clock signal is the timing at which the image characterizing quantity signal F for the picture element of the Jth column and the Ith row is calculated. Also, the line FTR shows the timing for feeding the image characterizing quantity signal F' from the divider 44 to the comparator 45.

As explained, according to this embodiment, two level image and non two level image in the image information are distinguished from each other by means of the comparison if the gradient value obtained as the difference between the maximum and the minimum values related to the change of the image concentration divided by the distance between the locations of the maximum value and the minimum value with a predetermined reference value, so that it is possible to perform image processing preserving the resolution even of poorly contrasted letters such as blurred letters written in pencil which caused the poor resolution is the prior art as they are identified as pictures, and thereby to improve the quality of images as well as the efficiency of the image processing.

Figure 36:
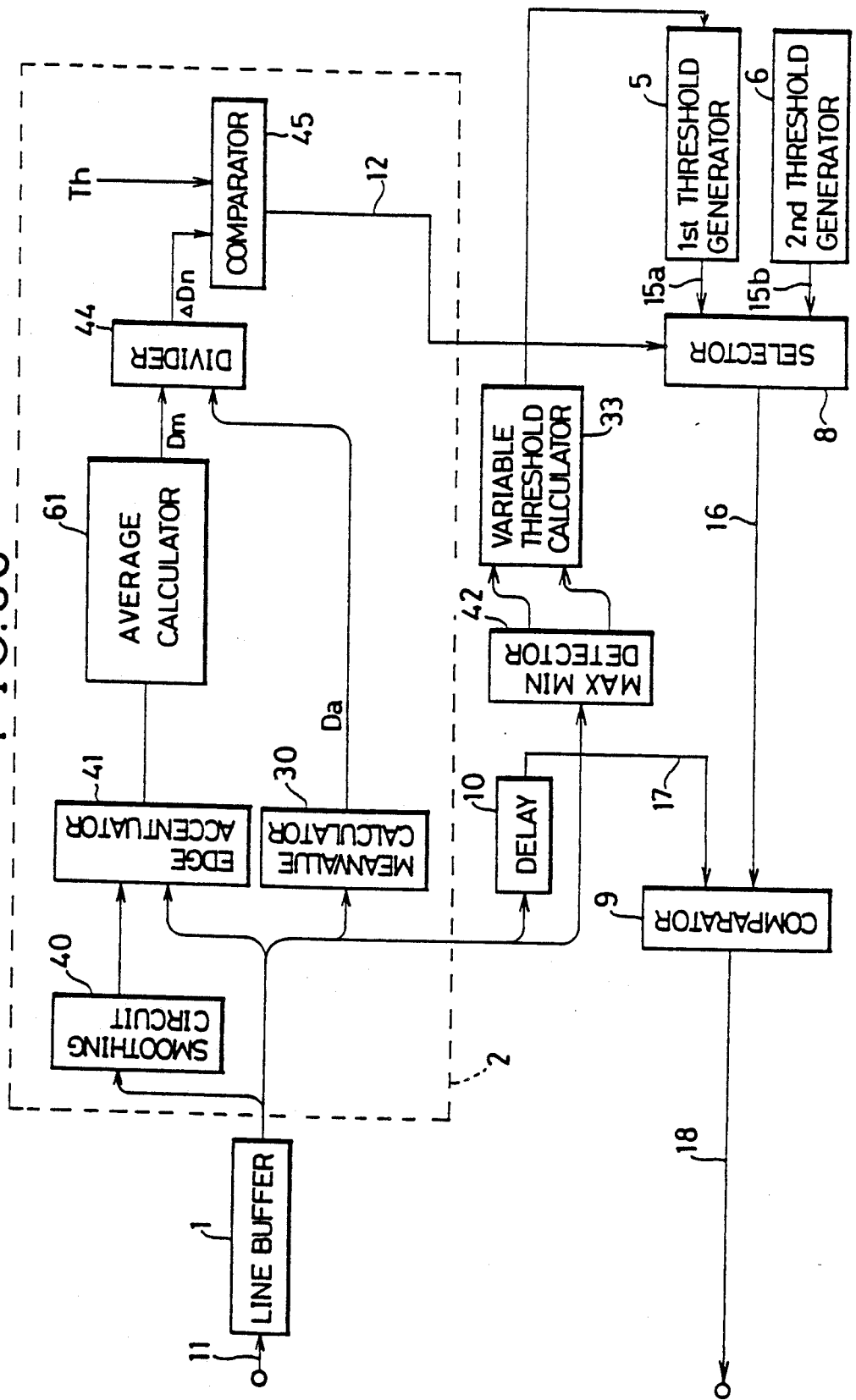
FIG. 36 is a block diagram of a sixth embodiment of an image processing device according to the present invention.

Referring now to FIG. 36, there is shown the sixth embodiment of an image processing device according to the present invention.

In FIG. 36, a distinguishing circuit 2 distinguishes between two level images i.e. letters and non two level images i.e. pictures in the image information by means of the comparison of a normalized value obtained as the neighboring image concentration difference square sum average related to the image concentration normalized by the mean value related to the image concentration with a predetermined reference value. In other words, the distinguishing circuit 2 distinguishes between letters including poorly contrasted letters and non letters i.e. pictures by utilizing the fact that poorly contrasted letters are conventionally identified as pictures because their mean concentration is small within a localized region, but they possess rather large maximum concentration difference, so that they can be correctly identified as letters by emphasizing the concentration differences in terms of the neighboring image concentration difference square sum average normalized by the mean concentration within a relevant region.

In this image processing device, image signals from a line buffer 1 are fed to a smoothing circuit 40 and an edge accentuator 41 including Laplacian filter. The smoothing circuit 40 feeds smoothed image signals with noise components removed to the edge accentuator 41. The edge accentuator 41 feeds edge accentuated image signals to a neighboring image concentration difference square sum average calculator 61. The neighboring image concentration difference square sum average calculator 61 calculates the neighboring image concentration difference square sum average Dm to be explained in detail below within a window in accordance with the edge accentuated image signals. The neighboring image concentration difference square sum average is fed to the divider 44 in which it is divided by the mean image concentration Da within the window provided by a mean value calculator 30 to yield a normalized neighboring image concentration difference square sum average $\Delta Dn'$ given by the equation:

$$\Delta Dn' = Dm/Da \tag{9}$$

The normalized neighboring image concentration difference square sum average $\Delta Dn'$ is fed to a comparator 45 in which it is compared with a judging threshold th stored in advance at a register not shown. The comparator 45 produces the distinguishing signal 12 which is either '1' when the normalized neighboring image concentration difference square sum average $\Delta Dn'$ is greater than the judging threshold Th indicating that the image signal is of letters, or '0' when the normalized neighboring image concentration difference square sum average $\Delta Dn'$ is less than or equal to the judging threshold Th indicating that the image signal is of pictures. That is, $$\Delta Dn' > Th \rightarrow \text{Letters}$$

$$\Delta Dn' \geq Th \rightarrow \text{Pictures}$$

Thus, the distinguishing circuit 2 determines that the image signal is of letters when the normalized neighboring image concentration difference square sum average $\Delta Dn'$ is greater than the judging threshold Th, and that the image signal is of pictures otherwise.

Now, the binarization of each image signal identified by means of the distinguishing circuit 2 above as either one of letters or pictures will be explained.

In FIG. 36, the image signals from the line buffer 1 are also fed to the max min detector 42. The max min detector 42 detects the maximum image concentration Dmax and the minimum image concentration Dmin from the image concentrations of picture elements within the window, and feeds these maximum image concentration Dmax and minimum image concentration Dmin to a variable threshold calculator 33. The variable threshold calculator 33 calculates a binarization threshold Bh given by the equation:

$$Bh = (Dmax + Dmin)/2 \tag{3}$$

from the maximum image concentration Dmax and the minimum image concentration Dmin within the window detected by the max min detector 42. This binarization threshold Bh is fed to a first threshold generator 5. The first threshold generator 5 generates the first threshold signal 15a in accordance with the binarization threshold Bh to a selector 8. Also, a second threshold generator 6 generates the binarization threshold for pictures and feeds the dither threshold shown in FIG. 20 as a second threshold signal 15b to the selector 8.

The selector 8 determines the selected threshold signal 16 from the first and second threshold signals 15a and 15b using the distinguishing signal 12 as a control signal according to the following rule:

| Case | Condition (Type of image) | Selected threshold signal 16 (Type of threshold signal) |
| --- | --- | --- |
| 1 | The distinguishing signal 12 = 1 (Letters) | The 1st threshold signal 15a (Straightforward binarization threshold) |
| 2 | The distinguishing signal 12 = 0 (Pictures) | The 2nd threshold signal 15b (Threshold for pictures) | and feeds the selected threshold signal 76 to a comparator 9.

The comparator 9 compares the selected threshold signal 16 with the image signal 17 for the picture element fed through a delay 10, and produces the output signal 18, so that it is possible to perform image processing in which the resolution of letters including poorly contrasted letters such as blurred letters as well as the tone of pictures can be preserved.

Figure 37:
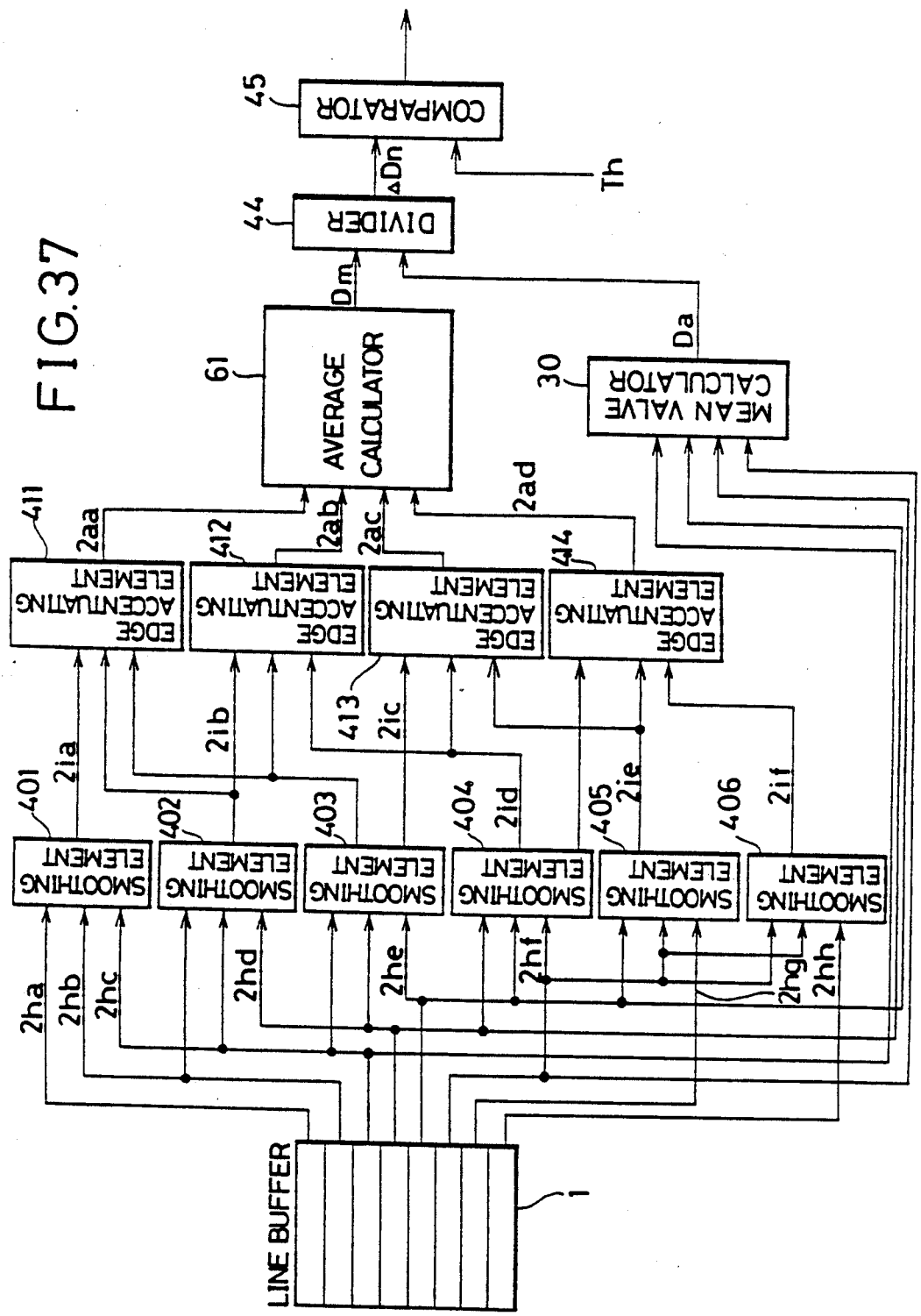
FIG. 37 is a detailed block diagram of a distinguishing circuit of the image processing device shown in FIG. 36.

FIG. 37 shows a detail configuration of the distinguishing circuit 2. In FIG. 37, smoothing elements 401-406 constitute the smoothing circuit 40, and edge accentuating elements 411-414 constitute the edge accentuator 41. 8 bit image signals 2ha-2hh, each for one picture element, stored in the line buffer 1 comprised of 8 line buffers are fed to the smoothing elements 401-406, 3 picture elements at a time synchronized by a clock signal CLK. The smoothing elements 401-406 utilizes 3×3 median filters and, for 9 picture elements of 3×3 matrix form shown in FIG. 27 arranged in order of their image concentrations, produces the fifth image concentration of the picture element at the center marked by a cross in FIG. 27. The smoothed image signals 2ia-2if are fed to the edge accentuating elements 411-414. The edge accentuating elements 411-414 utilizes Laplacian filters and calculates the value given by the equation:

$$G(I,J) = F(I,J) - \nabla^2 F(I,J) \tag{6}$$

where G(I,J) is the edge accentuated image signal, F(I,J) is the input image signal of the Ith row of the Jth column, and $\nabla^2 F(I,J)$ is the Laplacian which is a second derivative of the input image signal F(I,J) defined by the equation:

$$\nabla^2 F(I,J) = F(I+1,J) + F(I-1,J) + F(I,J+1) + F(I,J-1) - 4 \times F(I,J) \tag{7}$$

Figure 38:
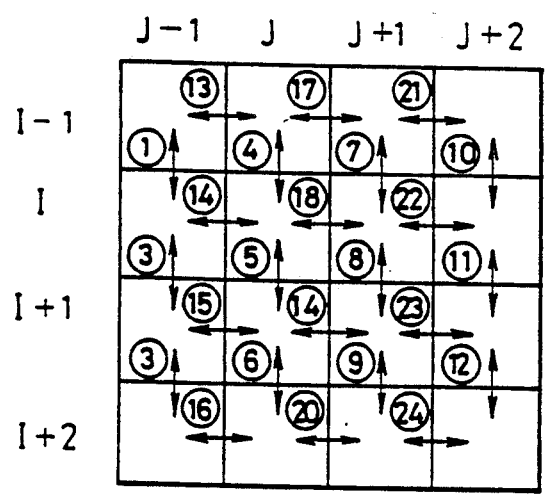
FIG. 38 is an illustration of a window of picture elements used in the image processing device shown in FIG. 36 for explaining a neighboring image concentration difference.

The edge accentuated image signals 2aa-2ad from the edge accentuating elements 411-414 are fed to the neighboring image concentration difference square sum average calculator 61. Here, neighboring image concentration differences mean the concentration differences between the neighboring picture elements both along the row and column directions of the window of matrix form, such as the window of 4×4 matrix form shown in FIG. 38 where the neighboring image concentration differences are indicated by arrows.

Figure 40:
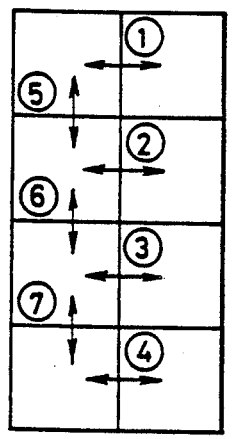
FIG. 40 is an illustration of picture elements for explaining the neighboring image concentration difference calculated by a neighboring image concentration difference calculator of the image processing device shown in FIG. 36.
Figure 39:
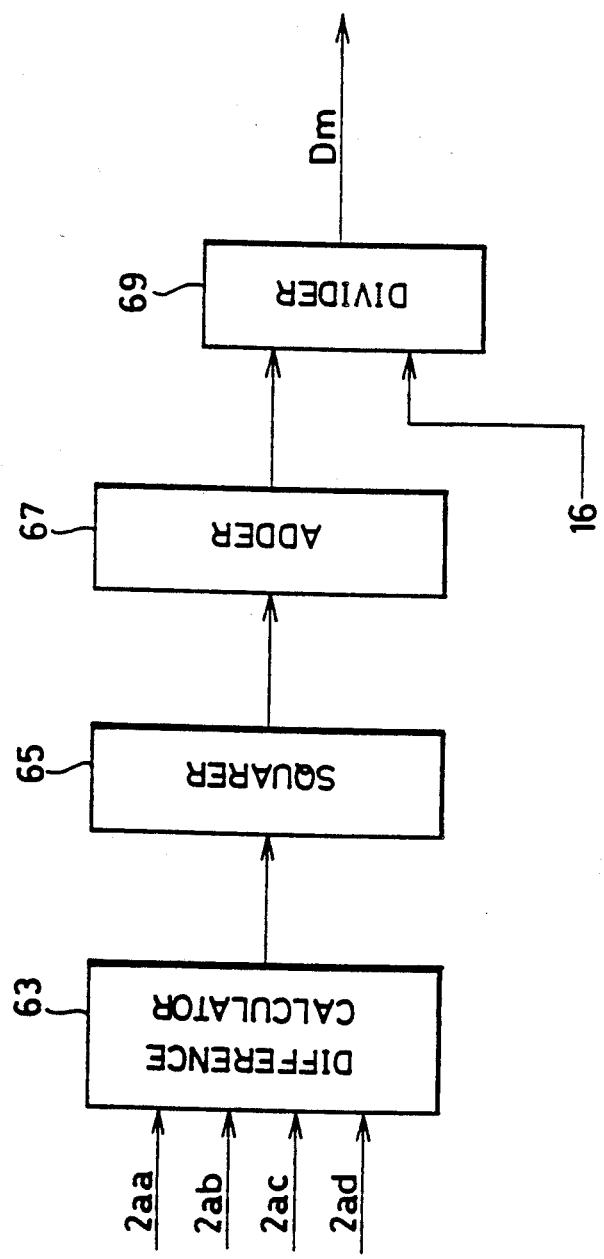
FIG. 39 is a detailed block diagram of an average calculator of the distinguishing circuit shown in FIG. 37.
Figure 41:
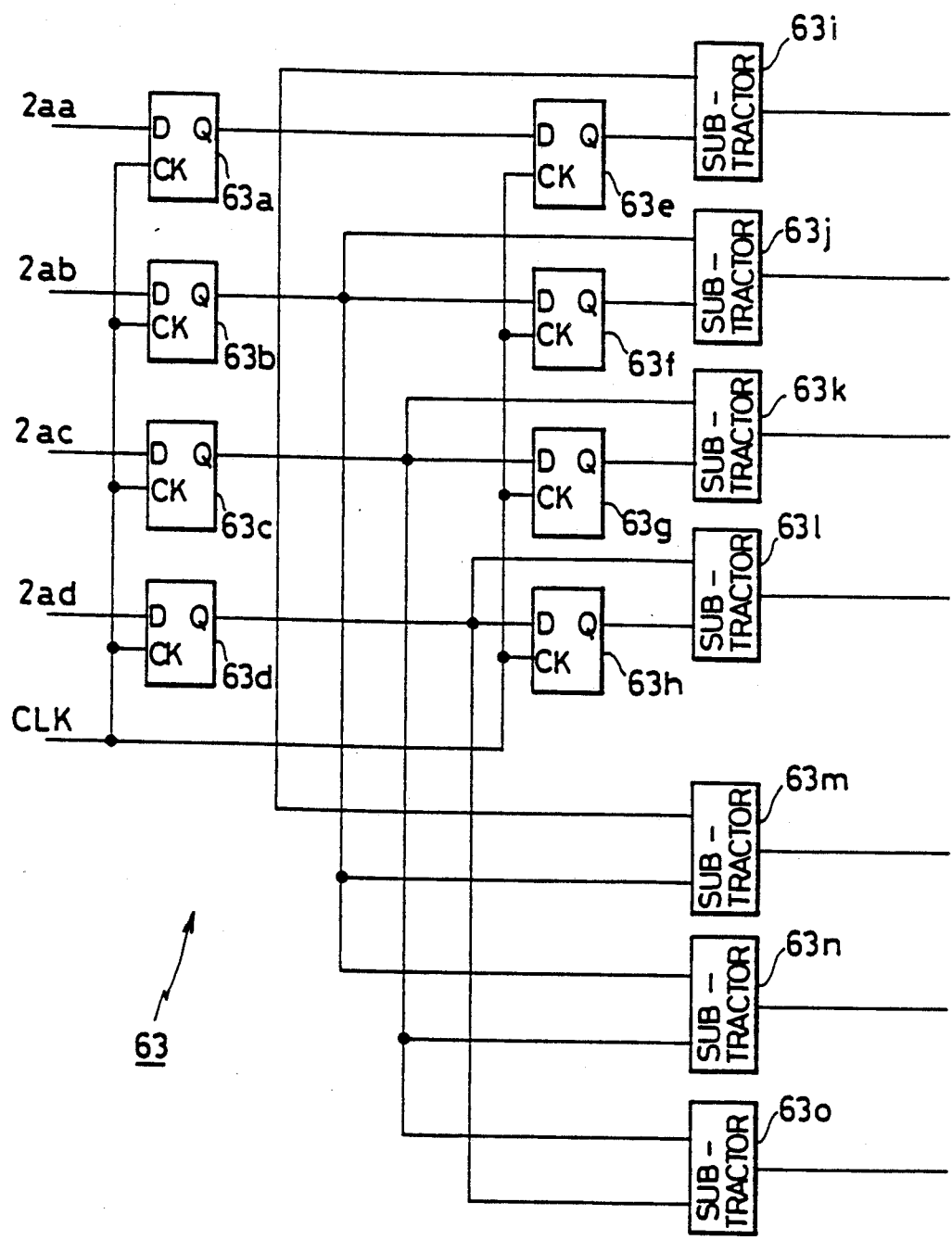
FIG. 41 is a detailed block diagram of the neighboring image concentration difference calculator of the average calculator shown in FIG. 39.
Figure 42:
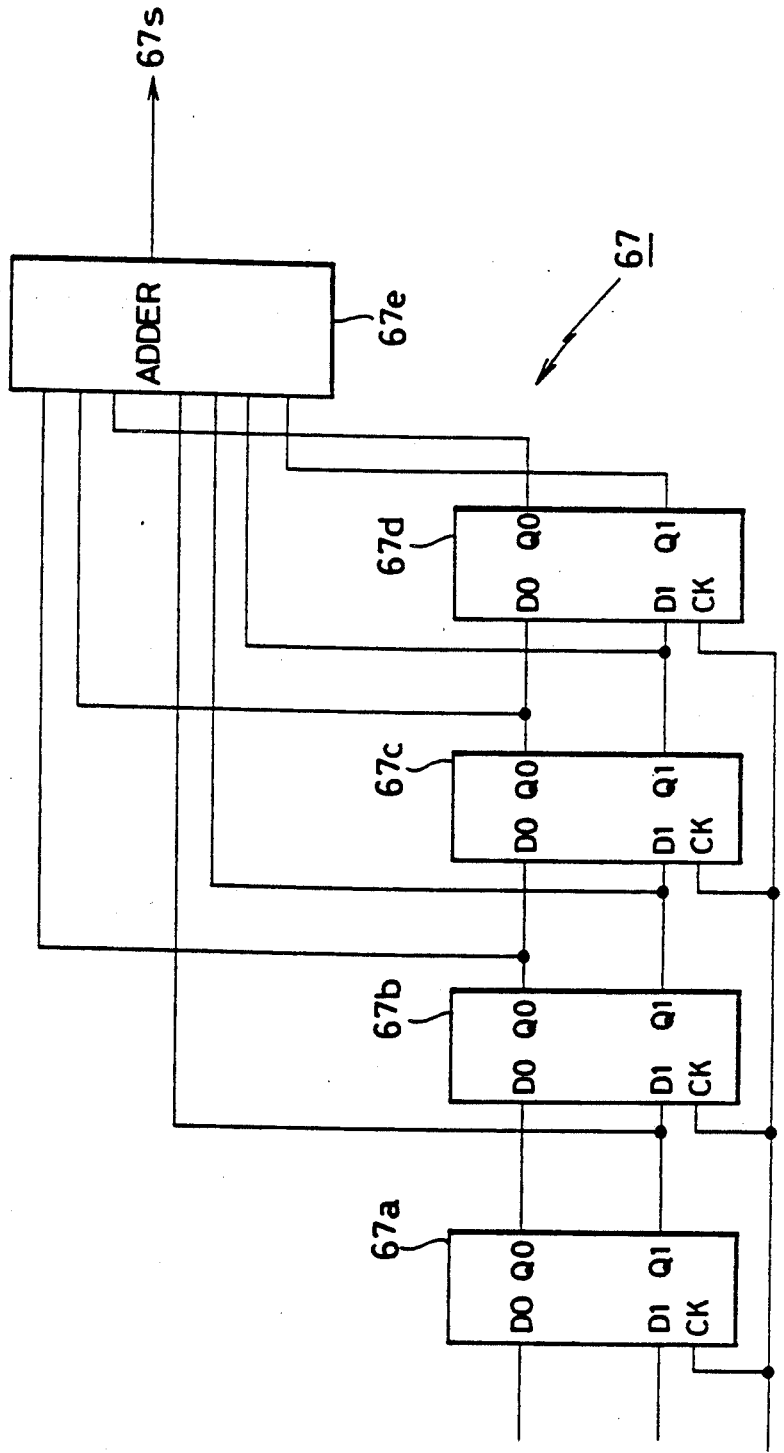
FIG. 42 is a detailed block diagram of an adder of the average calculator shown in FIG. 39.

FIG. 39 shows a detail configuration of the neighboring image concentration difference square sum average calculator 61. The neighboring image concentration difference square sum average calculator 61 is comprised of a neighboring image concentration difference calculator 63, a squarer 65, an adder 67, and a divider 69. The neighboring image concentration difference calculator 63 calculates 7 concentration differences indicated by arrows among 2×4 picture elements as shown in FIG. 40, simultaneously. FIG. 41 shows a detail configuration of the neighboring image concentration difference calculator 63. In FIG. 41, there is provided 8 bit flip-flops 63a–63h and subtractors 63i–63o. The squarer 65 is comprised of 7 multipliers to calculates squares of 7 neighboring image concentration differences obtained by the neighboring image concentration difference calculator 63, and feeds the results of the calculations to the adder 67. The adder 67 is comprised of flip-flops 67a–67d arranged in 4 steps and an adding element 67e which can add 24 data at once, as shown in FIGS. 42. Each of the flip-flops 67a–67d latches 7 data at a time. An input terminal D0 of each flip-flop latches 4 data at a time, and another input terminal D1 of each flip-flop latches 3 data at a time. The 4 data fed to the input terminal D0 correspond to the squares of the 4 concentration differences ①-④ along the column direction shown in FIG. 40. The 3 data fed to the input terminal D1 correspond to the square of the 3 concentration differences ⑤-⑦. All outputs of the flip-flops 67a–67d except an output Q0 of the flip-flop 67a are fed to the adding element 67e. They correspond to the squares of the 24 neighboring image concentration differences ①-㉔ indicated by arrows in FIG. 38. The adding element 67e calculates a square sum of these neighboring image concentration differences, and feeds the result of the calculation to the divider 69 as a neighboring image concentration difference square sum signal 67S. The divider 69 divides the neighboring image concentration difference square sum signal 67S by the total number of picture elements in the window, 16, to obtain the neighboring image concentration difference square sum average Dm. This neighboring image concentration difference square sum average Dm is fed to the divider 44 in which it is normalized by the mean image concentration Da from the mean value calculator 30.

Figure 43:
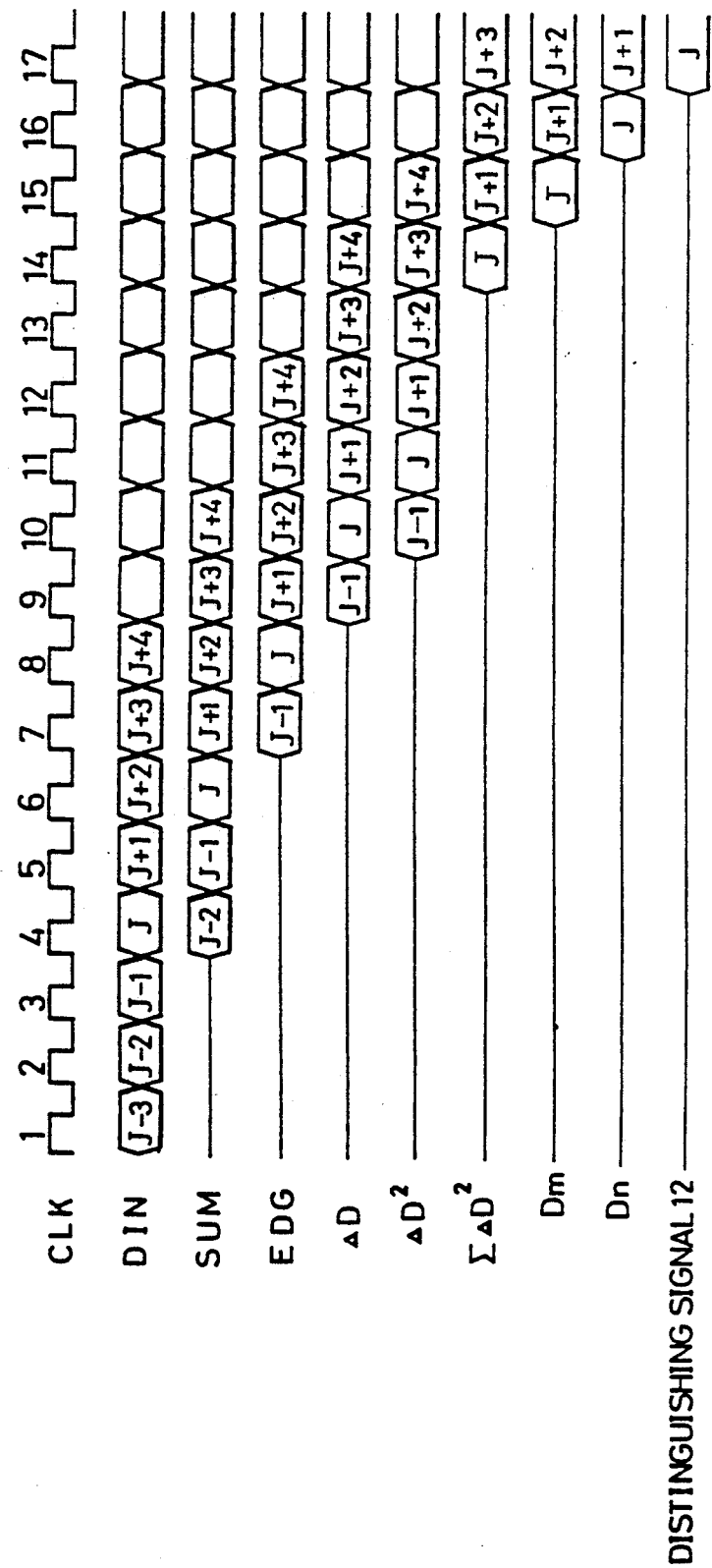
FIG. 43 is a timing chart for the distinguishing circuit shown in FIG. 37.

FIG. 43 shows a timing chart for the distinguishing circuit 2. In FIG. 43, the line CLK shows the clock signal CLK, and the line DIN shows the timing for feeding image signals from the line buffer 1 to the smoothing elements 401–406. (J−3) at the first clock signal is the timing at which the image signals of 8 picture elements in the (J−3)th column from the (I−3)th row to the (I+4)th row are fed to the smoothing elements 401–406. Similarly, (J−2) at the second clock signal and (J−1) at the third clock signal are the timings at which the image signals of 8 picture elements from the (I−3)th row to the (I+4)th row in the (J−2)th column and (J−1)th column, respectively, are fed to the smoothing elements 401–406.

In FIG. 43, the line SUM shows the timing for feeding the smoothed image signals from the smoothing elements 401–406 to the edge accentuating elements 411–414. (J−2) at the fourth clock signal is the timing at which the smoothed image signals of 6 picture elements in the (J−2)th column from the (I−2)th row to the (I+3)th row shown in FIG. 14 are fed to the edge accentuating elements 411–414. Similarly, (J−1) at the fifth clock signal and (J) at the sixth signals are the timings at which the smoothed image signals of 6 picture elements in the (J−1)th and the Jth columns, respectively, from the (I−3)th row to the (I+4)th row are fed to the edge accentuating elements 411–414.

The line EDG shows the timing for feeding the edge accentuated image signals from the edge accentuating elements 411–414 to the neighboring image concentration difference square sum average calculator 61. (J−1) at the seventh clock signal is the timing at which the edge accentuated image signals of 4 picture elements in the (J−1)th column from the (I−1)th row to the (I+2)th row are fed to the neighboring image concentration difference square sum average calculator 61. Similarly, J at the eight clock signal, (J+1) at the ninth clock signal, and (J+2) at the tenth clock signal are the timings at which the edge accentuated image signals of 4 picture elements in the (J)th, the (J+1)th, and the (J+2)th columns, respectively, from the (I−1)th row to the (I+2)th row are fed to the neighboring image concentration difference square sum average calculator 61.

The neighboring image concentration difference calculator 63 of the neighboring image concentration difference square sum average calculator 61 is fed with the 4 picture elements of the (J−1)th column at the seventh clock signal and the 4 picture elements of the Jth column at the eighth clock signal, then calculates the 7 neighboring image concentration differences ①-⑦ shown in FIG. 40 with respect to these 8 picture elements, and sends out the results at the ninth clock signal. At the sum with clock signal, the 4 picture elements of the (J+1)th column are fed, then the 7 neighboring image concentration differences for the 8 picture elements of the Jth and the (J+1)th columns are calculated and the results are sent out at the tenth clock signal. Similar processes of producing the 7 neighboring image concentration differences at each clock signal repeat in the subsequent clock signals according to the timing shown in the line ΔD in FIG. 43.

The squarer 65 is fed with the 7 neighboring image concentration differences for the (J−1)th and the Jth columns at the ninth clock signal, then calculates the squares of each of these neighboring image concentration differences, and sends out the results at the tenth clock signal. At the same tenth clock signal, the 7 neighboring image concentration differences for the Jth and the (J+1)th columns are fed, then the squares of each these neighboring image concentration differences are calculated, and the results are sent out at the eleventh clock signal. Similar processes of producing the 7 neighboring image concentration difference squares at each clock signal repeat in the subsequent clock signals according to the timing shown in the line $\Delta D^2$ in FIG. 43. In the following, the 7 neighboring image concentration differences of the Jth and the (J+1)th columns, for example, will be referred to as the neighboring image concentration differences of the Jth column.

The adder 67 is fed with the neighboring image concentration difference squares of the (J−1)th, the Jth, the (J+1)th, and the (J+2)th columns at the tenth, the eleventh, the twelfth, and the thirteenth clock signals, respectively, then calculates the Jth sum of its 24 input neighboring image concentration difference squares at the thirteenth clock signal, and sends out the result as the neighboring image concentrations difference square sum signal 67S at the fourteenth clock signal. At the same fourteenth clock signal, the neighboring image concentration difference squares of the (J+3)th column and fed, and the (J+1)th sum of the neighboring image concentration difference squares for 4×4 picture elements of the Jth, the (J−1)th, the (J+2)th, and the (J+3)th columns is calculated, then the result is sent out as the neighboring image concentration difference square sum signal 67S. Similar processes of producing the neighboring image concentration difference square sum signal 67S at each clock signal repeat in the subsequent clock signals according to the timing shown in the line $\Sigma\Delta D^2$ in FIG. 43.

The divider 69 is fed with the neighboring image concentration difference square sum signal 67S for $4\times 4$ picture elements of the (J−1)th, the Jth, the (J+1)th, and the (J+2)th columns at the fourteenth clock signal, then divides it by the window size which is equal to 16 for $4\times 4$ picture elements, and sends out the results as the neighboring image concentration difference square sum average Dm at the fifteenth clock signal. At the same fifteenth clock signal, the neighboring image concentration difference square sum signal 67S for the $4\times 4$ picture elements of the Jth, the (J+1)th, the (J+2)th, and the (J+3)th columns is fed, and the neighboring image concentration difference square sum average Dm for the $4\times 4$ picture elements of the Jth, the (J+1)th, the (J+2)th, and the (J+3)th columns is calculated, then the results is sent out at the sixteenth clock signal. Similar processes of producing the neighboring image concentration difference square sum average Dm at each clock signal repeat in the subsequent clock signals according to the timing shown in the line Dm in FIG. 43.

The divider 44 is fed with the neighboring image concentration difference square sum average Dm for the $4\times 4$ picture elements of the (J−1)th, the Jth, the (J+1)th, and the (J+2)th columns at the fifteenth clock signal, then divides it by the mean image concentration Da obtained by the mean value calculator 30 for the window of the $4\times 4$ picture elements of the (J−1)th, the Jth, the (J+1)th, and the (J+2)th columns, and feeds the result as the normalized neighboring image concentration difference square sum average $\Delta Dn'$ to the comparator 45 at the sixteenth clock signal. The comparator 45 compares the normalized neighboring image concentration difference square sum average $\Delta Dn'$ with the judging threshold Th, and produces the distinguishing signals 72 at the seventeenth clock signal as explained above.

Figure 44:
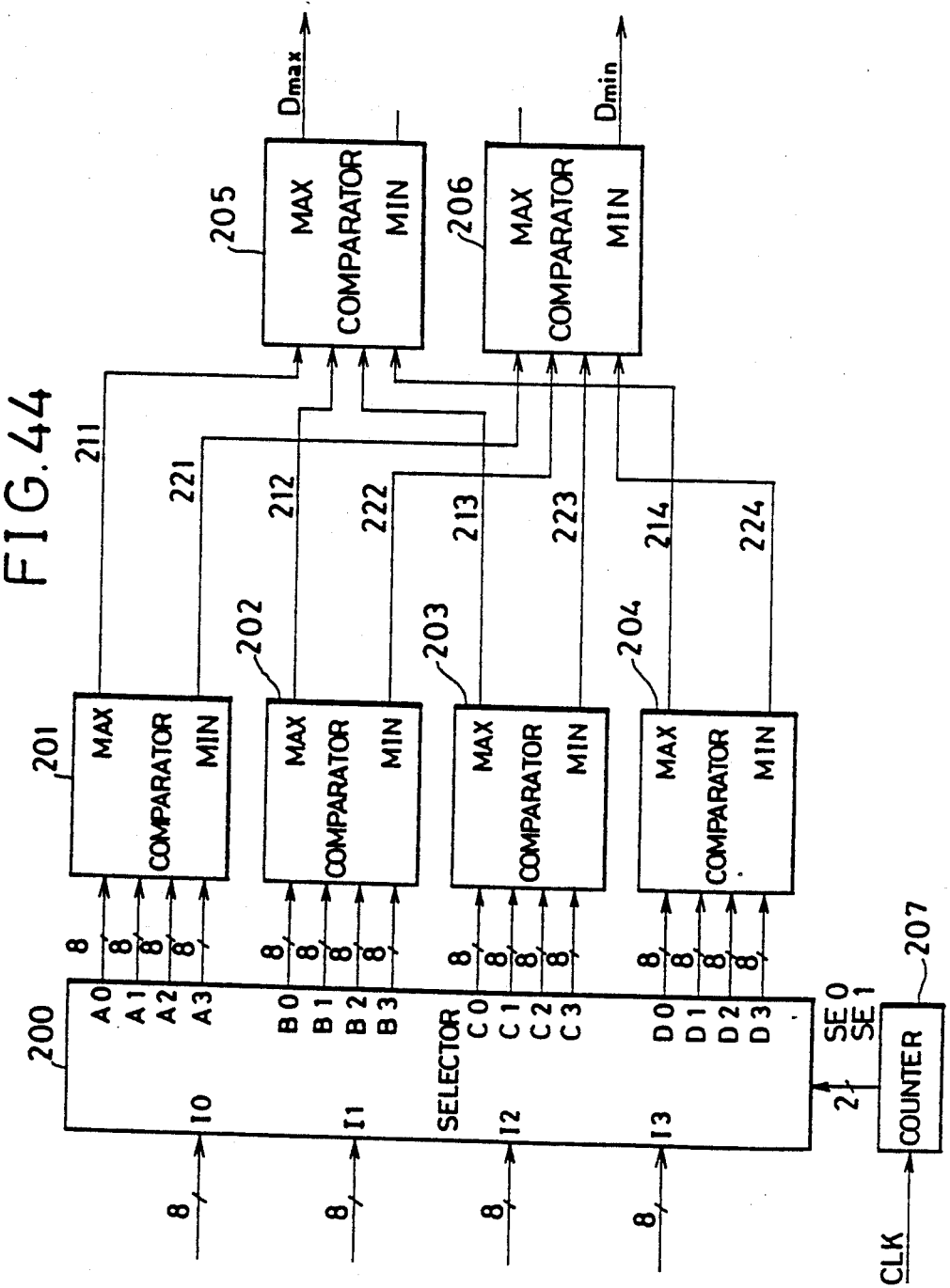
FIG. 44 is a detailed block diagram of a max min detector of the image processing device shown in FIG. 36.
Figure 45:
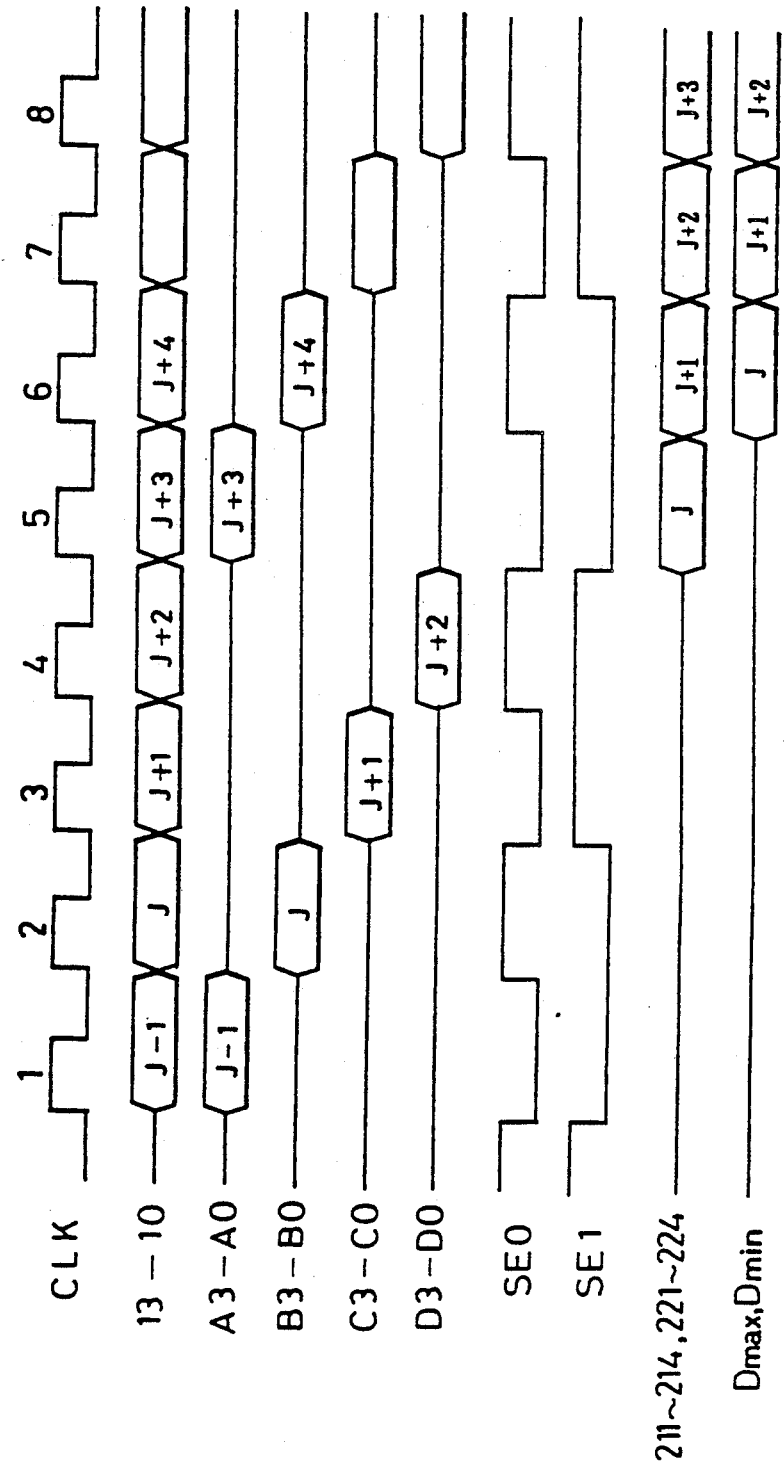
FIG. 45 is a timing chart for the max min detector shown in FIG. 44.

FIG. 44 shows a detail configuration of the max min detector 42, and FIG. 45 shows a timing chart for this max min detector 42. In FIG. 44, the image signals from the line buffer 1 are fed through the selector 200 to the comparators 201-204, signals for 4 picture elements at a time synchronized by a clock signal CLK. For example, for 16 picture elements shown enclosed by the dotted line in FIG. 14, 4 picture elements of the (J−1)th, the Jth, the (J+1)th, the (J+2)th columns are fed to the comparator 201, 202, 203, and 204, respectively. The counter 207 is a 2 bit counter which counts the clock signal CLK, and feeds the output signals SE0 and SE1 to the selector 200. The selector 200 distributes the image signals at the input ports I0-I3 to one of the output ports A0-A3, B0-B3, C0-C3, and D0-D3 in accordance with the output signals SE0 and SE1 of the counter 207. In FIG. 45, the line I0-I3 shows the input signals at the input ports I0-I3, of the selector 200, the lines A0-A3, B0-B3, C0-C3, and D0-D3 show the output signals at the output ports A0-A3, B0-B3, C0-C3, and D0-D3, respectively, of the selector 200.

The comparator 201-204 detects the maximum concentrations signals 211-214 and the minimum concentration signal 221-224 for each of 4 picture elements, and feeds the maximum concentration signals 211-214 to the comparator 205 and the minimum concentration signals 221-224 to the comparator 206. The comparator 205 detects the maximum image concentration Dmax within the window from the maximum concentration signals 211-214 for the 4 picture elements of each column, while the comparator 206 detects the minimum image concentration Dmin within the window from the minimum concentration signals 221-224 for the 4 picture elements of each column.

For the (I,J)th picture element in the window shown in FIG. 14, image signals of the 4 picture elements belonging to the (J−1)th column from the (I−1)th row to the (I+2)th row in the window shown in FIG. 14 are fed through the output ports A0-A3 of the selector 200 to the comparator 201 at the first clock signal, and the comparator 201 detects the maximum concentration 211 and the minimum concentration 221 of these 4 picture elements belonging to the (J−1)th column. Similarly, the image signals of the 4 picture elements belonging to the Jth column in the window are fed through the output ports B0-B3 of the selector 200 to the comparator 202 at the second clock signal, the image signals of the 4 picture elements belonging to the (J+1)th column in the window are fed through the output ports C0-C3 of the selector 200 to the comparator 203 at the third clock signal, the image signals of the 4 picture elements belonging to the (J+2)th column in the window are fed through the output ports D0-D3 of the selector 200 to the comparator 204, and the comparators 202-204 detect the maximum concentrations 212-214 and the minimum concentrations 222-224 of the 4 picture elements in the Jth, the (J+1)th, and the (J+2)th columns, respectively, at the fourth clock signal. At the fifth clock signal, the maximum concentrations 211-214 of the 4 picture elements in each column are fed to the comparator 205, and the minimum concentrations 221-224 of the 4 picture elements in each column are fed to the comparator 206. The comparator 205 detects the maximum image concentration Dmax within the window from the maximum concentrations 211-214 of the 4 picture elements in each column, and the comparator 206 detects the minimum image concentration Dmin within the window from the minimum concentrations 221-224 of the 4 picture elements in each column. At the sixth clock signal, the maximum image concentration Dmax and the minimum image concentration Dmin within the window detected by the comparators 205 and 206 are fed to the subtractor 43

Figure 46:
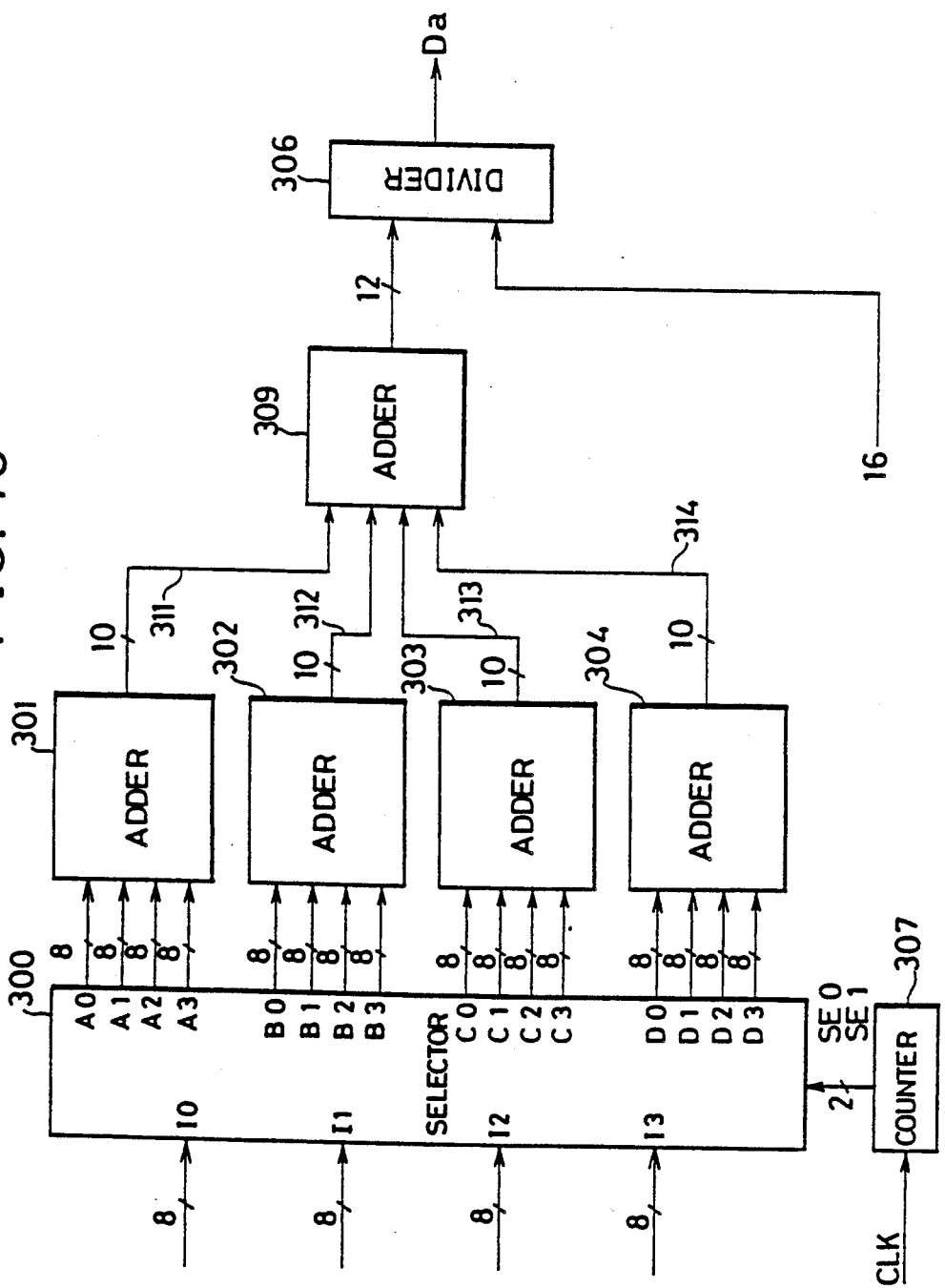
FIG. 46 is a detailed block diagram of a mean value calculator of the distinguishing circuit shown in FIG. 37.
Figure 47:
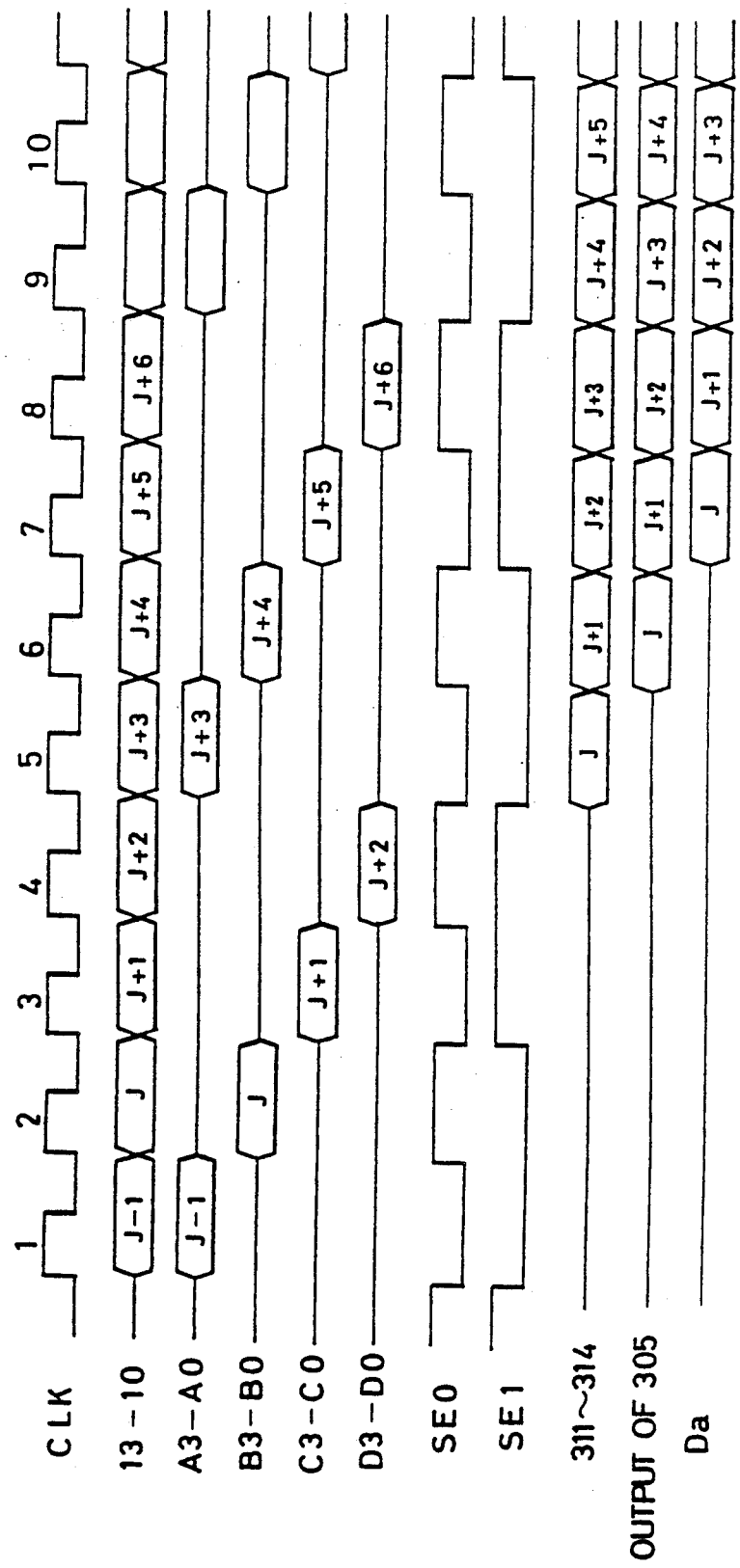
FIG. 47 is a timing chart for the mean value calculator shown in FIG. 46.

FIG. 46 shows a detail configuration of the mean value calculator 30, and FIG. 47 shows a timing chart for this mean value calculator 30. In FIG. 46, a selector 300 and a counter 307 are identical in their configurations and functions to the selector 200 and the counter 207 of FIG. 44. Each of the adder 301-304 calculates the sum 311-314 of 4 input signals fed to each of them by the selector 300, and these sums are summed again by the adder 305. The input signals of the adders 301-304 are of 8 bit while the output signals of these adders are of 10 bit, and the input signal of the adder 305 is of 10 bit while the output signal of this adder is of 12 bit.

In FIG. 46 the line CLK shows the clock signal, the line I shows the input signal at the input port I of the selector 300, the lines A, B, C and D show the output signals at the output ports A, B, C, and D, respectively, of the selector 300, and the lines SE0 and SE1 show the output signals SE0 and SE1 of the counter 307. As for the max min detector 42, for the (I,J)th picture elements in the window of 4×4 matrix enclosed by the dotted lines in FIG. 14, the image signals of the 4 picture elements in the (J−1)th column from the (I−1)th row to the (I+2)th row shown in FIG. 14 are fed to the adder 301 at the first clock signal. Similarly, the image signals of the 4 picture elements in the Jth column are fed to the adder 302 at the second clock signal, the image signals of the 4 picture elements in the (J+1)th column are fed to the adder 303 at the third clock signal, the image signals of the 4 picture elements in the (J+2)th column are fed to the adder 304 at the fourth clock signal, and the adders 302–304 calculate the total concentration signals 311–314 of the 4 picture elements of each column. At the fifth clock signal, the total concentration signals 311–314 of the 4 picture elements of each column from the adders 301–304 are fed to the adder 305, and the adder 305 calculates the sum of these total concentration signals 311–314. Thus the adder 305 calculated the sum of all 16 picture elements within the window shown in FIG. 14. At the sixth clock signal, this sum of 16 picture elements are fed to the divider 306, and the divider 306 divides this sum of 16 picture elements by the total number of the picture elements, 16, to yield the mean image concentration Da within the window. At the seventh clock signal, this mean image concentration Da is fed to the divider 44.

As explained, according to this embodiment, two level image and non two level image in the image information are distinguished from each other by means of the comparison of the normalized value obtained as the square sum average of the differences between the neighboring picture elements of the information related to the image concentrations normalized by the mean value of the information related to the image concentrations with a predetermined reference value, so that it is possible to perform image processing preserving the resolution even of poorly contrasted letters such as blurred letters with in pencil which caused the poor resolution in the prior art as they are identified as pictures, and thereby to improve the quality of images as well as the efficiency of the image processing.

It is to be noted that many modifications and variations of the embodiments described above may be made without departing from the novel and advantageous features of the present invention. Accordingly, all such modifications and variations are intended to be included within the scope of the appended claims.

What is claimed is:

1. An image processing device, comprising:
    first means for distinguishing first type images specified by two levels from second type images specified by other levels different from the two levels in accordance with first information related to image concentrations in image information, including letter distinguishing means for distinguishing the letter-like images as the first type images from the picture-like images as the second type images by comparing a maximum-minimum image concentration difference of the image information with a predetermined reference image concentration;
    second means for distinguishing the second type images into letter-like images and picture-like images in accordance with second information related to the image concentrations in the image information, including:
        bold letter distinguishing means for distinguishing the picture-like images into bold letter-like images and non-bold letter-like images by comparing a mean image concentration of the images with a predetermined reference mean image concentration;
        means for smoothing the non-bold letter-like images;
        means for accentuating edges of the images smoothed by the smoothing means; and
        means for normalizing the maximum-minimum image concentration difference of the images accentuated by the accentuating means with respect to a predetermined mean image concentration; and
    means for processing the images in accordance with distinctions among the images, made by the first and second distinguishing means.

2. The device of claim 1, wherein the second distinguishing means also includes poorly contrasted letter distinguishing means for distinguishing the picture-like images into poorly contrasted letter-like images and non-poorly contrasted letter-like images by comparing the maximum-minimum image concentration difference normalized by the normalizing means with a predetermined reference image concentration.

3. An image processing device, comprising: means for detecting maximum and minimum values of information related to image concentrations in image information;
    means for calculating a normalized value from the maximum and minimum values, including means for normalizing one of the maximum and minimum values of the information related to the image concentrations with respect to the other of the maximum and minimum values;
    difference calculating means for calculating differences in the information related to image concentrations between neighboring picture elements, including:
        means for smoothing the images of the information;
        means for accentuating edges of the images smoothed by the smoothing means; and
        means for deriving maximum and minimum concentration differences of the image concentrations of neighboring picture elements from the accentuated images;
    second detecting means for detecting maximum and minimum values of the differences between neighboring picture elements;
    means for distinguishing letter-like images from picture-like images by comparing the normalized value with a predetermined reference value; and
    means for processing the images in accordance with a distinction among the images, made by the distinguishing means.

4. The device of claim 3, wherein the detecting means includes means for detecting a maximum and minimum image concentrations of the image information as the maximum and minimum values, respectively.

5. The device of claim 3, wherein the distinguishing means includes letter distinguishing means for distinguishing the letter-like images from the picture-like images by comparing the normalized value with a predetermined reference value.

6. The device of claim 3, wherein the processing means includes:
    first means for generating a binarization threshold for the letter-like images;
    second means for generating a binarization threshold for the picture-like images;

means for selecting one of the first and second binarization thresholds in accordance with the selection of the one of the letter-like images and the picture-like images; and means for comparing the selected one binarization threshold with the image information.

7. The device of claim 3, wherein the calculating means includes means for calculating the normalized value as a difference between the maximum and minimum values normalized with respect to a mean of the maximum and minimum values.

8. The device of claim 7, wherein the detecting means includes means for detecting the maximum and minimum image concentrations of the image information as the maximum and minimum values, respectively.

9. The device of claim 7, wherein the distinguishing means includes letter distinguishing means for distinguishing the letter-like images from the picture-like images by comparing the normalized value with a predetermined reference value.

10. The device of claim 9, wherein the processing means includes:

first means for generating a first binarization threshold for letter-like images;

second means for generating a second binarization threshold for picture-like images;

means for selecting one of the first and second binarization thresholds in accordance with the selection of one of the letter-like images and the picture-like images; and means for comparing the selected one binarization threshold with the image information.

11. An image processing device, comprising:

difference calculating means for calculating a difference between maximum and minimum values of changes in information related to the image concentrations in image information, including:
means for smoothing the images of the image information; and
means for accentuating edges of the images smoothed by the smoothing means;

distance calculating means for calculating a distance between points in the image at which the changes in the information reach the maximum and minimum values;

ratio calculating means for calculating a ratio of the difference calculated by the difference calculating means and the distance calculated by the distance calculating means;

means for distinguishing letter-like images from picture-like images by comparing the ratio calculated by the ratio calculating means and a predetermined reference value; and means for processing images in accordance with a distinction among the images, made by the distinguishing means.

12. The device of claim 11, wherein the difference calculating means also includes means for deriving a maximum concentration difference in the accentuated images between points at which the Laplacian operated images corresponding to edges reach the maximum and minimum values.

13. The device of claim 11, wherein the distance calculating means includes:

means for smoothing the images of the image information; and means for accentuating edges of the images smoothed by the smoothing means.

14. The device of claim 13, wherein the distance calculating means also includes means for deriving a distance in the accentuated images between points at which the Laplacian operated images corresponding to edges reach the maximum and minimum values.

15. An image processing device, comprising:

first calculating means for calculating a square sum average of differences in an information related to image concentrations in image information between neighboring picture elements, including:
means for smoothing the images of the image information; and
means for accentuating edges of the images smoothed by the smoothing means;

second calculating means for calculating a mean value of the information related to the image concentrations;

third calculating means for calculating a normalized value as the square sum average normalized with respect to the mean value;

means for distinguishing letter-like images from picture-like images by comparing the normalized value with a predetermined reference value; and means for processing images in accordance with a distinction among the images, made by the distinguishing means.

16. The device of claim 15, wherein the first calculating means also includes means for deriving the square sum average of concentration differences of neighboring images from the accentuated images of the image information.

* * * * *

UNITED STATES PATENT AND TRADEMARK OFFICE
CERTIFICATE OF CORRECTION

PATENT NO. : 5,001,767
DATED : March 19, 1991
INVENTOR(S) : HITOSHI YONEDA ET AL.

It is certified that error appears in the above-identified patent and that said Letters Patent is hereby corrected as shown below:

Title page, Inventors, change "Lamagawa" to --Kanagawa--.

Abstract, line 5, change "includes" to --include--.

Abstract, lines 13 and 14, change "includes" to --include--.

Signed and Sealed this

First Day of June, 1993

Attest:

MICHAEL K. KIRK

Attesting Officer

Acting Commissioner of Patents and Trademarks